(12) United States Patent
Grube et al.

(10) Patent No.: US 9,336,139 B2
(45) Date of Patent: May 10, 2016

(54) SELECTING A MEMORY FOR STORAGE OF AN ENCODED DATA SLICE IN A DISPERSED STORAGE NETWORK

(75) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/291,042

(22) Filed: Nov. 7, 2011

(65) Prior Publication Data

US 2012/0137091 A1    May 31, 2012

Related U.S. Application Data

(60) Provisional application No. 61/417,873, filed on Nov. 29, 2010.

(51) Int. Cl.
| | | |
|---|---|---|
| G06F 12/00 | (2006.01) | |
| G06F 13/00 | (2006.01) | |
| G06F 13/28 | (2006.01) | |
| G06F 12/06 | (2006.01) | |

(52) U.S. Cl.
CPC .................................. G06F 12/0638 (2013.01)

(58) Field of Classification Search
CPC .................................................. G06F 12/0638
USPC ......................................................... 711/158
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |

(Continued)

OTHER PUBLICATIONS

Definition of estimate, Dictionary.com, retrieved from http://dictionary.reference.com/browse/estimate on Oct. 17, 2014 (1 page).*

(Continued)

*Primary Examiner* — Sanjiv Shah
*Assistant Examiner* — Daniel C Chappell
(74) *Attorney, Agent, or Firm* — Garlick & Markison; Timothy W. Markison

(57) ABSTRACT

A method begins by a processing module receiving an encoded data slice for storage. The method continues with the processing module obtaining metadata associated with the encoded data slice and interpreting the metadata to determine whether the encoded data slice is to be stored in a first access speed memory or a second access speed memory, wherein the first access speed memory has a higher data access rate than the second access speed memory. The method continues with the processing module storing the encoded data slice in a memory device of the first access speed memory when the encoded data slice is to be stored in the first access speed memory and storing the encoded data slice in a memory device of the second access speed memory when the encoded data slice is to be stored in the second access speed memory.

12 Claims, 36 Drawing Sheets

(56) References Cited

U.S. PATENT DOCUMENTS

| | | |
|---|---|---|
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,293,133 B1* | 11/2007 | Colgrove et al. ............. 711/111 |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0065961 A1* | 3/2005 | Aguren ........................ 707/102 |
| 2005/0100022 A1* | 5/2005 | Ramprashad ........... H04L 47/10 370/395.42 |
| 2005/0114594 A1 | 5/2005 | Corbett et al. |
| 2005/0125593 A1 | 6/2005 | Karpoff et al. |
| 2005/0131993 A1* | 6/2005 | Fatula .................... G06F 9/5072 709/202 |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0168415 A1* | 7/2006 | Ishii ...................... G06F 3/0605 711/165 |
| 2006/0224603 A1 | 10/2006 | Correll, Jr. |
| 2007/0079081 A1 | 4/2007 | Gladwin et al. |
| 2007/0079082 A1* | 4/2007 | Gladwin et al. ............... 711/154 |
| 2007/0079083 A1* | 4/2007 | Gladwin ............. G06F 21/6227 711/154 |
| 2007/0088970 A1 | 4/2007 | Buxton et al. |
| 2007/0174192 A1* | 7/2007 | Gladwin ............. G06F 21/6227 705/40 |
| 2007/0198797 A1* | 8/2007 | Kavuri .................... G06F 3/061 711/165 |
| 2007/0214285 A1 | 9/2007 | Au et al. |
| 2007/0234110 A1* | 10/2007 | Soran et al. ........................ 714/6 |
| 2007/0260592 A1* | 11/2007 | Anglin .............. G06F 17/30312 |
| 2007/0283167 A1 | 12/2007 | Venters, III et al. |
| 2009/0043971 A1* | 2/2009 | Kim .................. G06F 17/30171 711/150 |
| 2009/0094251 A1* | 4/2009 | Gladwin ........... G06F 17/30067 |
| 2009/0094318 A1* | 4/2009 | Gladwin ............. H04L 67/1097 709/203 |
| 2009/0164790 A1* | 6/2009 | Pogodin .................. G06F 21/64 713/176 |
| 2009/0307448 A1* | 12/2009 | Gokhale .............. G06Q 10/087 711/162 |
| 2010/0011007 A1* | 1/2010 | Bettger ................. H04L 63/105 709/224 |
| 2010/0023524 A1 | 1/2010 | Gladwin et al. |
| 2010/0114829 A1* | 5/2010 | Prahlad ............. G06F 17/30321 707/640 |
| 2010/0161916 A1* | 6/2010 | Thornton ............ G06F 11/1076 711/154 |
| 2010/0169391 A1* | 7/2010 | Baptist .............. G06F 17/30194 707/827 |
| 2010/0281230 A1* | 11/2010 | Rabii ..................... G06F 3/0605 711/165 |
| 2011/0060887 A1* | 3/2011 | Thatcher ............... G06F 3/0604 711/171 |
| 2011/0078375 A1* | 3/2011 | Shepherd ............. G06F 12/0866 711/115 |
| 2011/0093670 A1* | 4/2011 | Cherian ................ G06F 3/0613 711/156 |
| 2011/0119481 A1* | 5/2011 | Auradkar ............... G06F 21/602 713/150 |
| 2011/0145580 A1* | 6/2011 | Auradkar ............. H04L 63/0428 713/170 |
| 2011/0145593 A1* | 6/2011 | Auradkar ............ G06F 21/6218 713/189 |
| 2011/0197046 A1* | 8/2011 | Chiu ..................... G06F 3/0617 711/171 |
| 2011/0213929 A1* | 9/2011 | Baptist ................. G06F 11/1076 711/114 |
| 2011/0231362 A1* | 9/2011 | Attarde ............... G06F 11/3442 707/609 |
| 2012/0054500 A1* | 3/2012 | Dhuse ...................... H04L 9/085 713/189 |
| 2012/0137095 A1* | 5/2012 | Grube ................. G06F 12/0638 711/162 |
| 2012/0166749 A1* | 6/2012 | Eleftheriou ........... G06F 3/0616 711/165 |
| 2012/0266050 A1* | 10/2012 | Cideciyan ............. H03M 13/05 714/773 |
| 2013/0007402 A1* | 1/2013 | Prahlad ................ G06F 3/0605 711/170 |

OTHER PUBLICATIONS

Optical storage What is it?, Miller School of Medicine University of Miami, Sep. 1, 2006, retrieved from http://it.med.miami.edu/x980.xml on Oct. 17, 2014 (2 pages).*

Review: Hard disk vs. solid-state drive—is an SSD worth the money?, Lucas Mearian, Jun. 18, 2009, retrieved from http://www.computerworld.com/article/2525605/computer-hardware/review-hard-disk-vs-solid-state-drive-is-an-ssd-worth-the-money.html on Oct. 17, 2014 (3 pages).*

Definition of metadata, Free Online Dictionary of Computing, retrieved from http://foldoc.org/metadata on Nov. 19, 2013 (1 page).*

Who uses SSDs, and why?, Jim Handy, Feb. 1, 2009, retrieved from http://www.infostor.com/index/articles/display/4386556227/articles/infostor/volume-13/issue_2/features/Who_uses_SSDs_and_why_.html on Apr. 3, 2015 (7 pages).*

Cleversafe's dispersed storage network, Robin Harris, Mar. 3, 2008, retrieved from https://storagemojo.com/2008/03/03/cleversafes-dispersed-storage-network/ on Apr. 2, 2015 (5 pages).*

OceanStore: an architecture for global-scale persistent storage, Kubiatowicz et al, ACM SIGPLAN Notices, vol. 35, iss. 11, Nov. 2000, pp. 190-201 (12 pages).*

T1: Erasure Codes for Storage Applications, James S. Plank, USENIX FAST 2005, Dec. 13-16, 2005, retrieved from http://www.math.uaa.alaska.edu/~ssiewert/a490dmis_doc/papers/Erasure-Code-Overview-FAST-2005.pdf on Apr. 3, 2015 (74 pages).*

Shamir; How to Share a Secret; Communications of the ACM; vol. 22, No. 11; Nov. 1979; pp. 612-613.

(56) References Cited

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

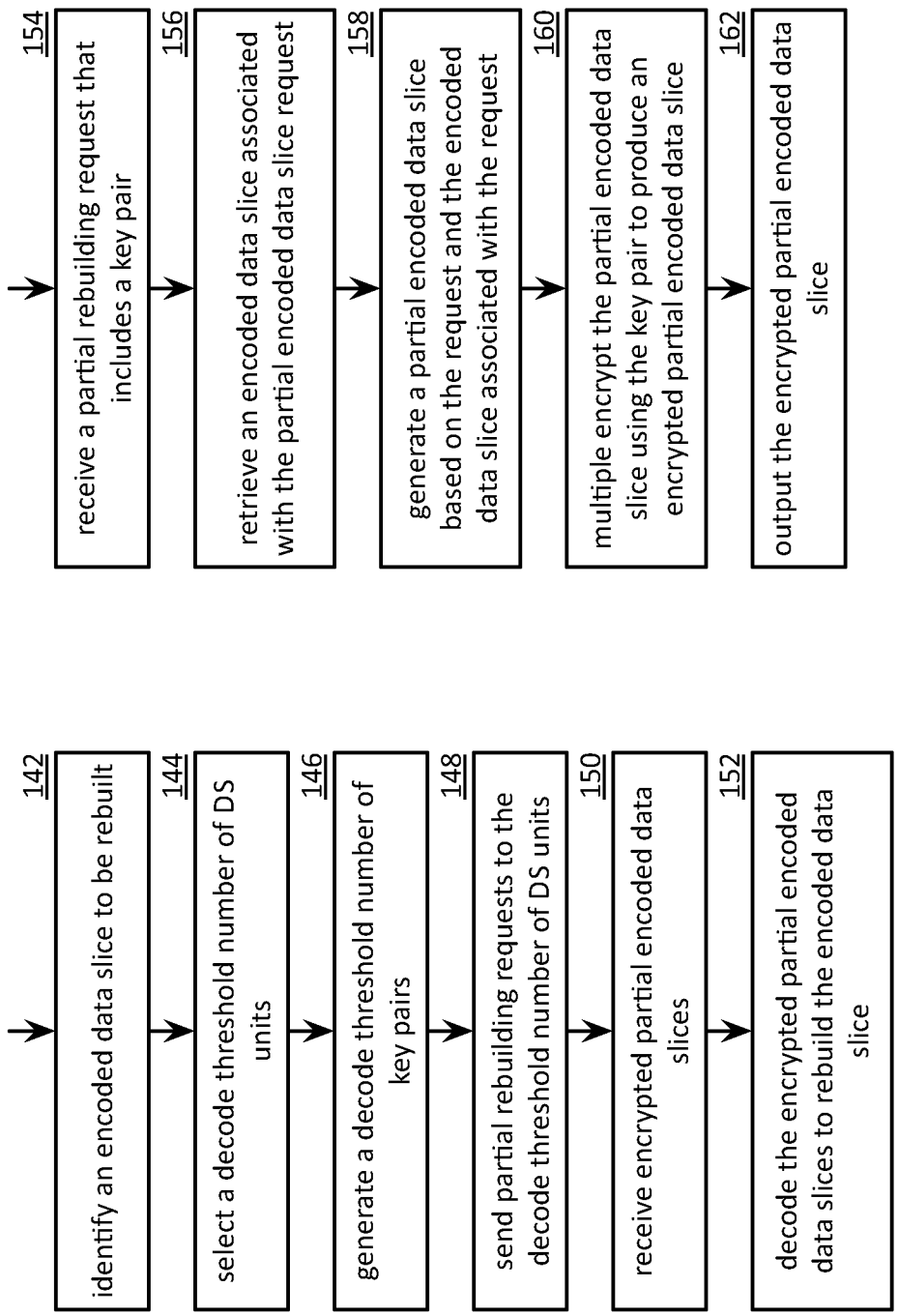

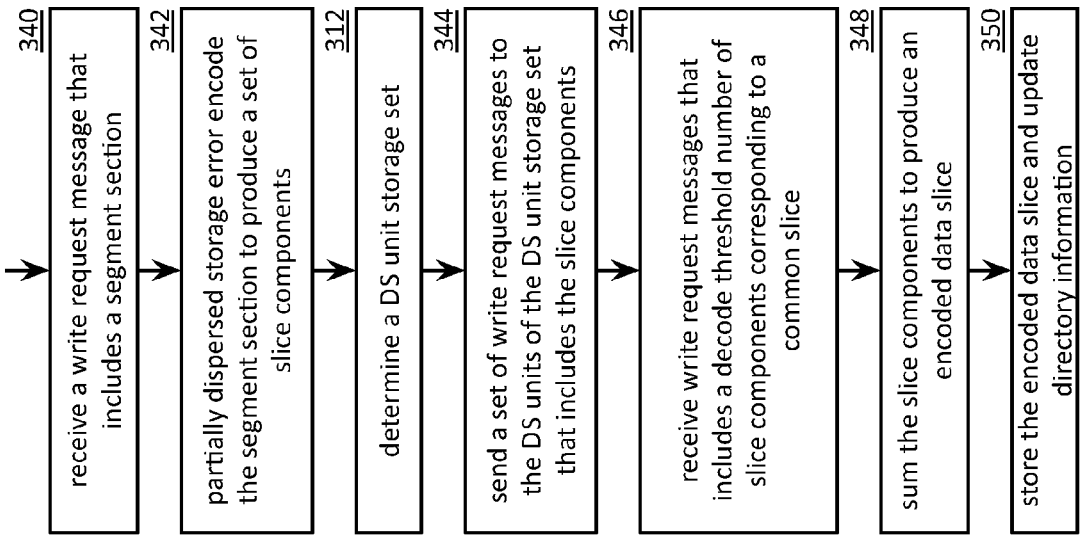

FIG. 16E 340 receive a write request message that includes a segment section
342 partially dispersed storage error encode the segment section to produce a set of slice components
312 determine a DS unit storage set
344 send a set of write request messages to the DS units of the DS unit storage set that includes the slice components
346 receive write request messages that includes a decode threshold number of slice components corresponding to a common slice
348 sum the slice components to produce an encoded data slice
350 store the encoded data slice and update directory information

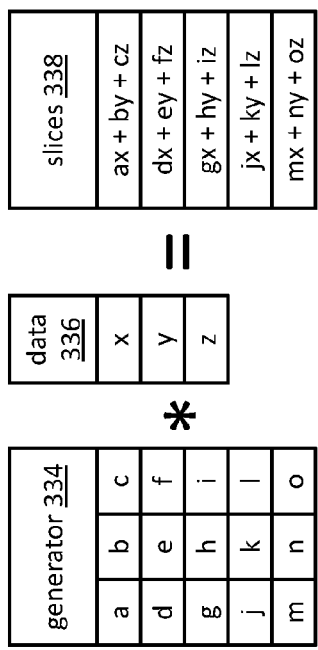

FIG. 16C

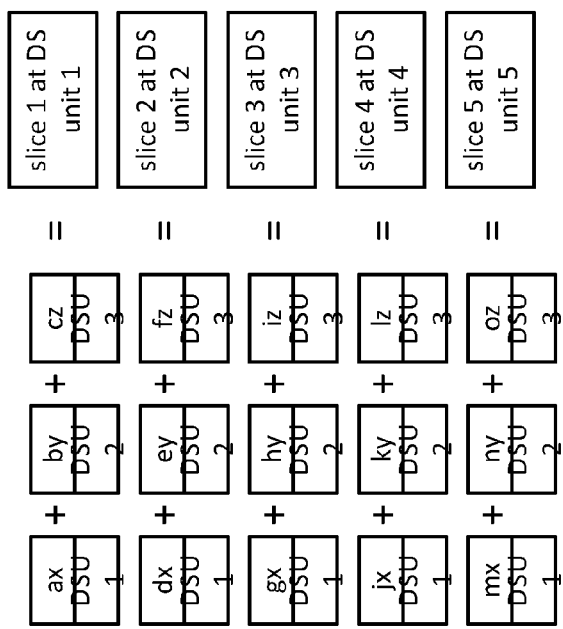

FIG. 16D

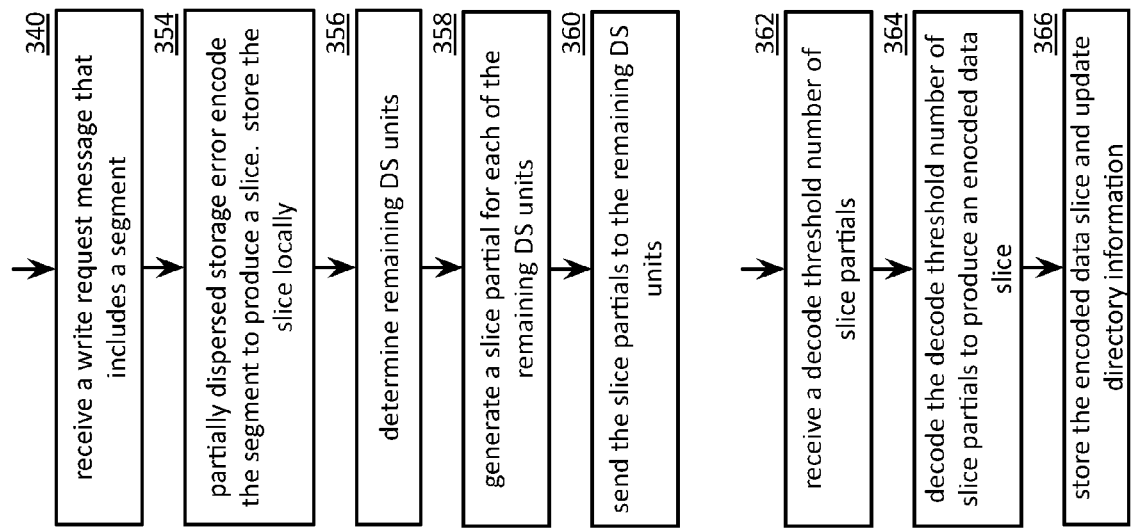
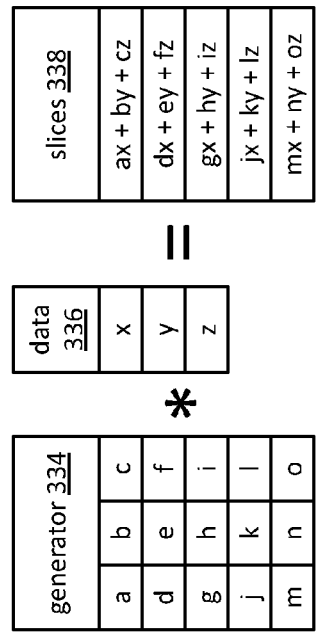
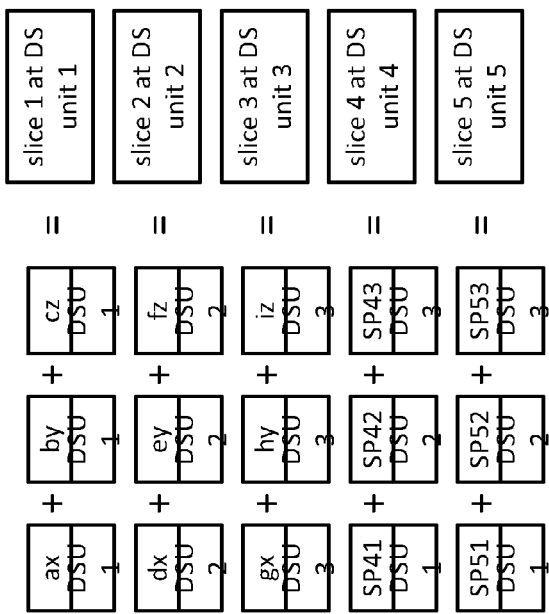

SELECTING A MEMORY FOR STORAGE OF AN ENCODED DATA SLICE IN A DISPERSED STORAGE NETWORK

CROSS REFERENCE TO RELATED PATENTS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

U.S. Provisional Patent Application Ser. No. 61/417,873, entitled "DATA REBUILDING IN A DISPERSED STORAGE NETWORK", having a provisional filing date of Nov. 29, 2010.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone).

For example, smart phones can support telephony communications but they are also capable of text messaging and accessing the internet to perform functions including email, web browsing, remote application access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail, especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 9A is a flowchart illustrating an example of rebuilding an encoded data slice in accordance with the invention;

FIG. 9B is a flowchart illustrating an example of generating an encrypted partial encoded data slice in accordance with the invention;

FIG. 16C is an algorithm illustrating an example of encoding data in accordance with the invention;

FIG. 16D is a processing module task map illustrating an example of determining processing module assignments in accordance with the invention;

FIG. 16E is a flowchart illustrating another example of storing an encoded data slice in accordance with the invention;

FIG. 17C is an algorithm illustrating another example of encoding data in accordance with the invention;

FIG. 17D is a dispersed storage (DS) unit task map illustrating another example of determining DS unit assignments in accordance with the invention;

FIG. 17E is a flowchart illustrating another example of storing an encoded data slice in accordance with the invention;

FIG. 17F is a flowchart illustrating another example of storing an encoded data slice in accordance with the invention;

DETAILED DESCRIPTION OF THE INVENTION

Figure 1:
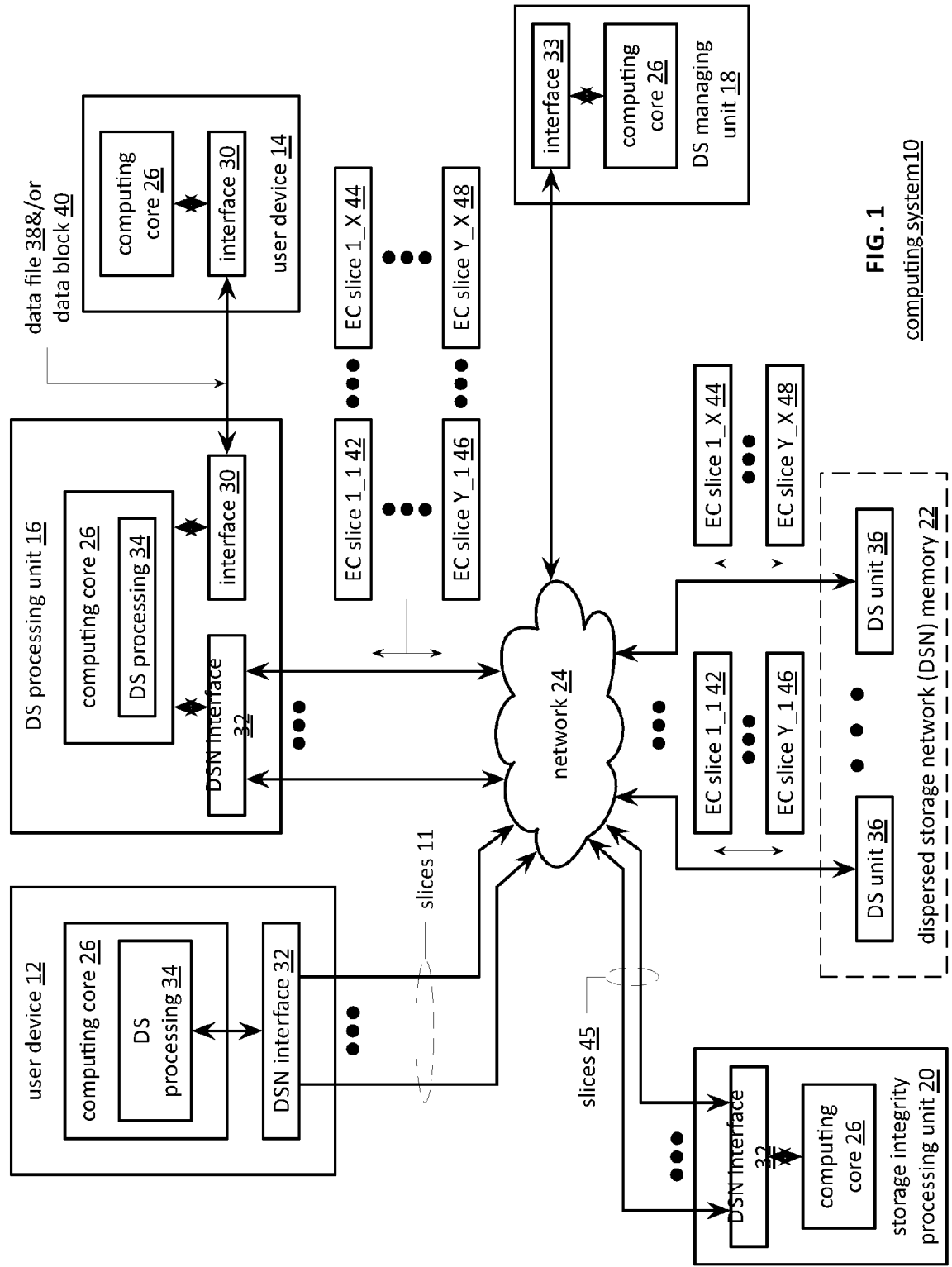
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-9.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
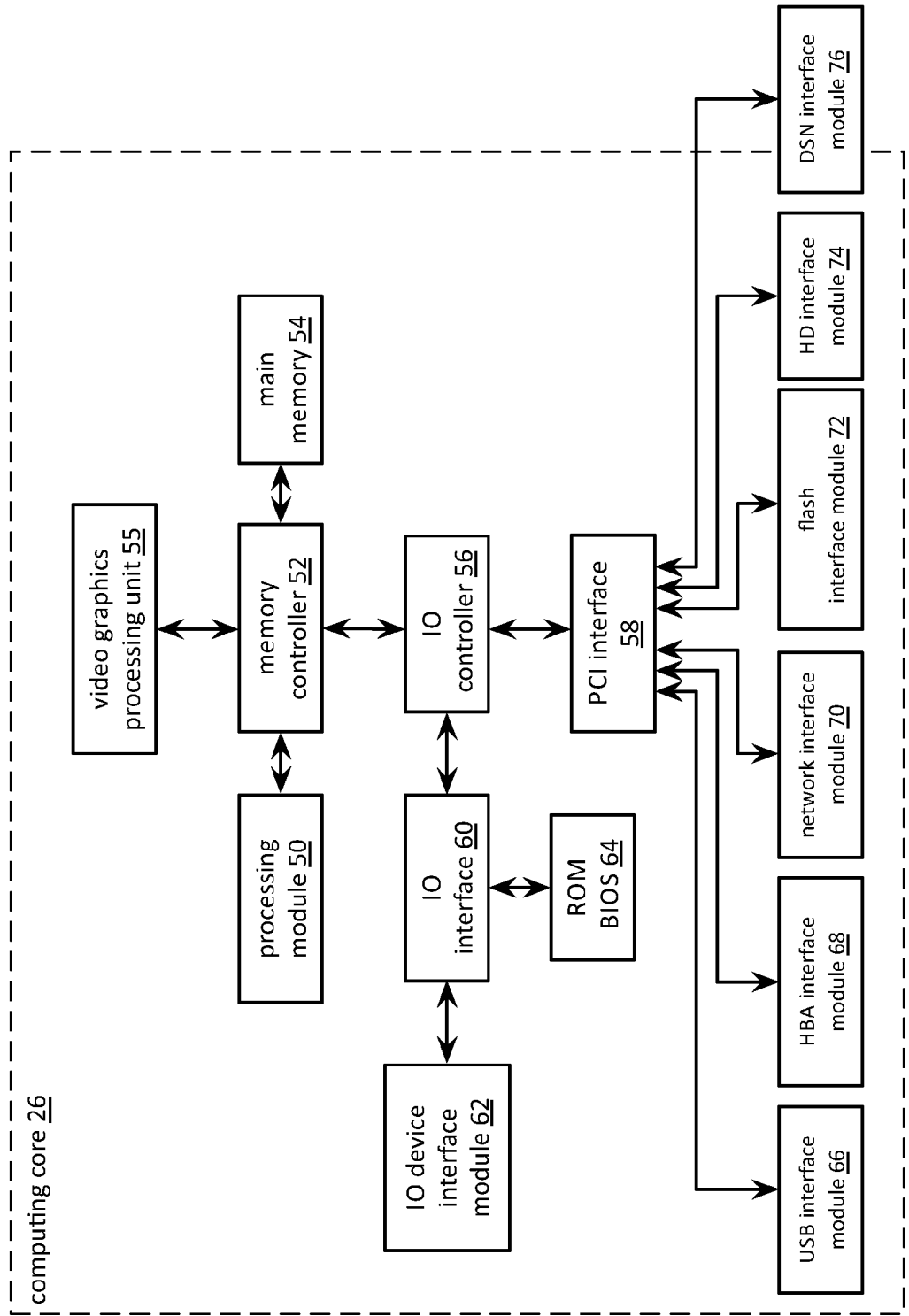
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
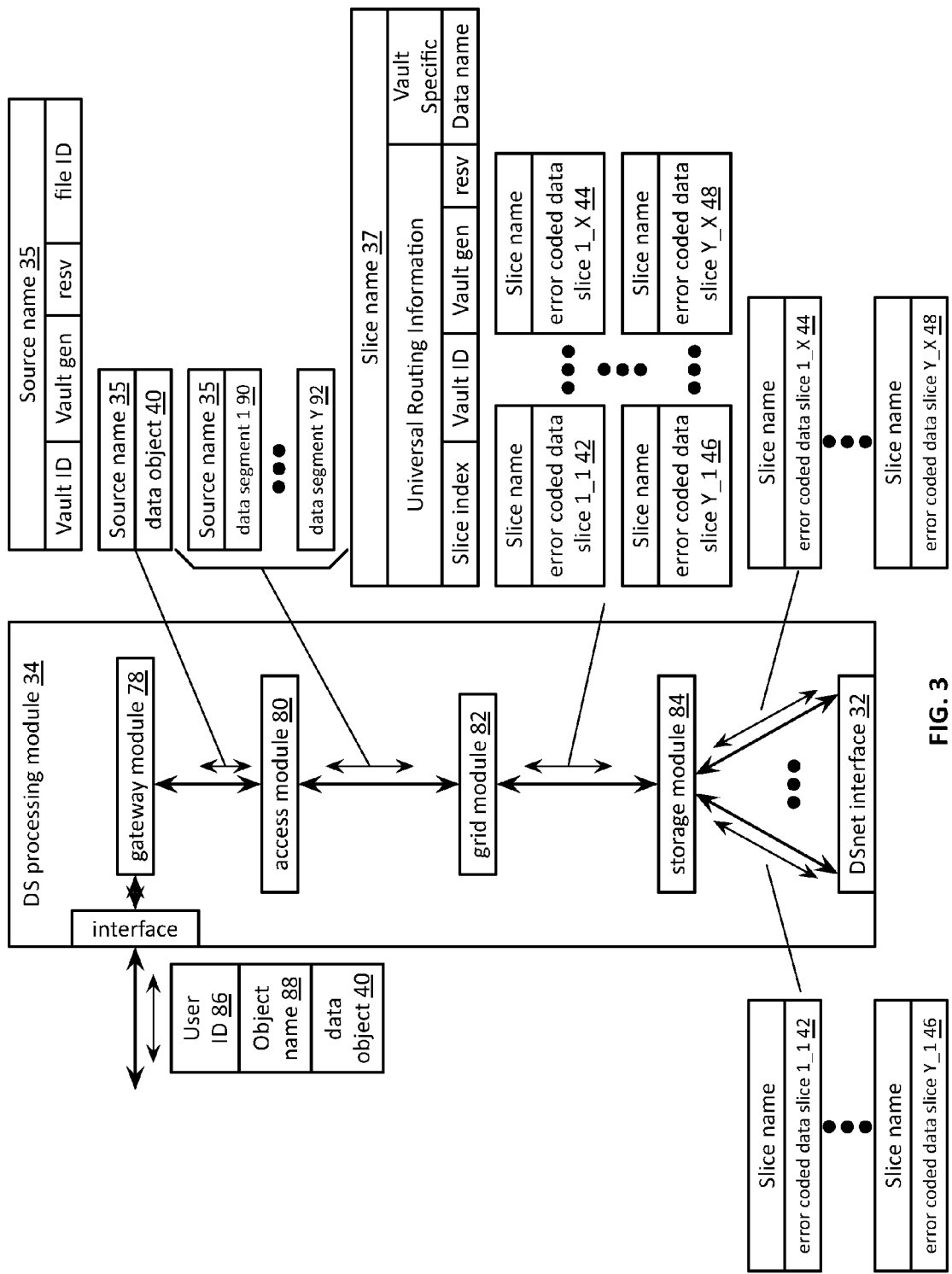
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform a message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131, 072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
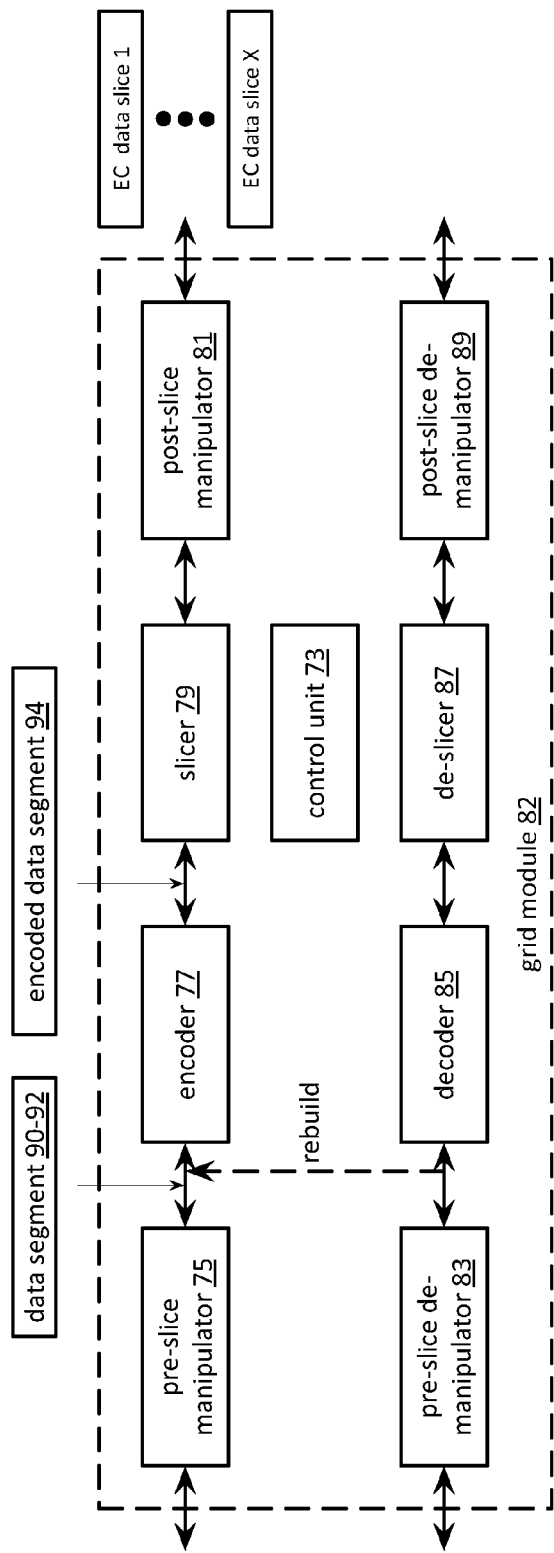
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
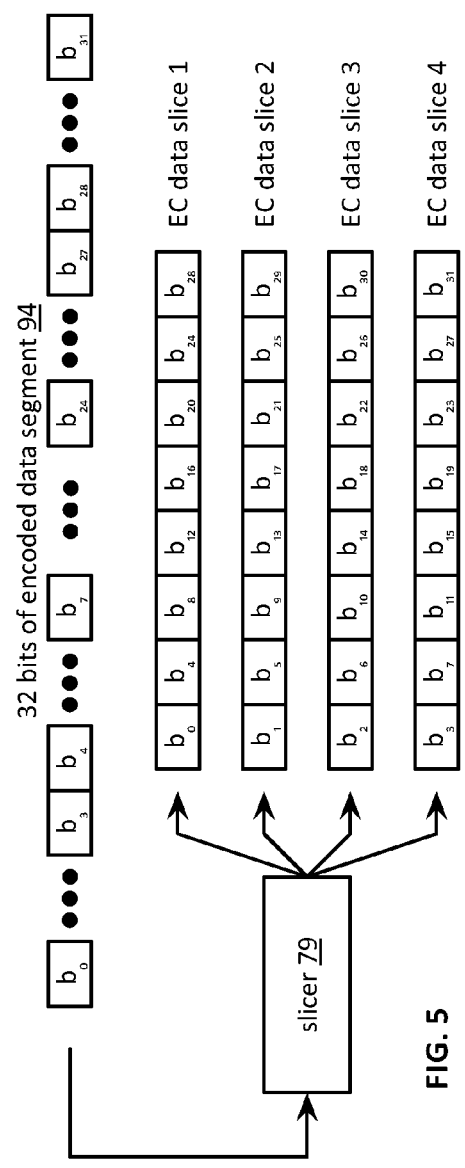
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
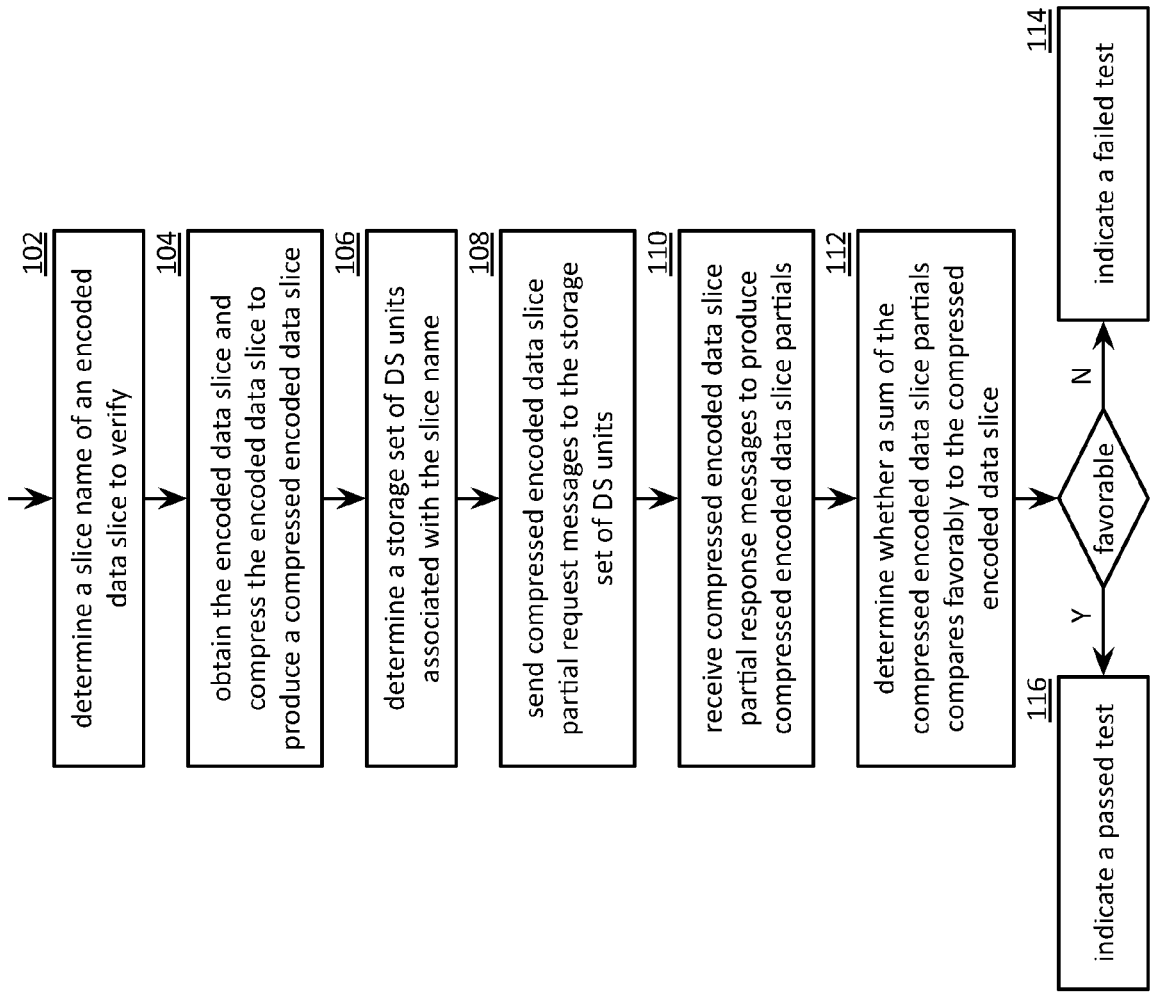
FIG. 6 is a flowchart illustrating an example of verifying encoded data slices in accordance with the invention.

FIG. 6 is a flowchart illustrating an example of verifying encoded data slices. A method begins with step 102 where a processing module (e.g., of a dispersed storage (DS) unit) determines a slice name of an encoded data slice to verify. The determination may be based on one or more of an error message, a request, a next slice name in a test list, a random slice name, a slice name associated with a local DS unit, and a rebuild slice process conclusion indicator. For example, a processing module determines a slice name associated with an encoded data slice to verify when the encoded data slice has been rebuilt.

The method continues at step 104 where the processing module obtains the encoded data slice and compresses the encoded data slice to produce a compressed encoded data slice. The obtaining may be based on one or more of retrieving the encoded data slice from a local memory, receiving the encoded data slice in response to sending a read slice request to a DS unit, and receiving the encoded data slice from a DS processing unit. The compressing may include one or more of determining compression information and compressing the encoded data slice in accordance with the compression information. The compression information may include one or more of a compression algorithm identifier (ID), a portion indicator, and a number of bits indicator. The determining of the compression information may be based on one or more of a lookup, a request, a command, and a data type. The compressing may include selecting a portion of the encoded data slice that includes all the bits of the encoded data slice, less than all of the bits of the encoded data slice, a random portion of the bits of the encoded data slice, and a predetermined portion of the bits of the encoded data slice.

The method continues at step 106 where the processing module determines a storage set of DS units associated with the slice name. The determination may be based on one or more of generating all slice names of all pillars associated with the slice name, a virtual dispersed storage network (DSN) to physical location table lookup, a predetermination, a message, and a command. The method continues at step 108 where the processing module sends compressed encoded data slice partial request messages to the storage set of DS units. The processing module may not send a compressed encoded data slice partial request message to a DS unit affiliated with the slice name (e.g., a current DS unit). The request may include one or more of a slice name corresponding to an encoded data slice affiliated with a recipient DS unit of the stored set of DS units, the compression information, a recipient DS unit ID, an initiator DS unit ID, and the slice name.

The method continues at step 110 where the processing module receives at least a decode threshold number of compressed encoded data slice partial response messages to produce compressed encoded data slice partials. The response messages may include one or more of a slice name corresponding to the encoded data slice associated with a DS unit of the response, the compression information, and a compressed encoded data slice partial associated with a DS unit of the response. The compressed encoded data slice partial is with reference to the encoded data slice and the encoded data slice associated with the DS unit of the response.

The method continues at step 112 where the processing module determines whether a sum (e.g., finite field math utilizing an XOR logical function) of the compressed encoded data slice partials compares favorably to the compressed encoded data slice. The processing module determines that the comparison is favorable when the sum of the compressed encoded data slice partials is substantially the same as the compressed encoded data slice. The method branches to step 116 when the processing module determines that the comparison is favorable. The method continues to step 114 when the processing module determines that the comparison is not favorable.

The method continues at step 114 where the processing module indicates a failed test when the processing module determines that the sum of the compressed encoded data slice partials does not compare favorably to the compressed encoded data slice. The failed test indication may include one or more of sending a failed test message, marking a list, facilitating rebuilding of the encoded data slice, and initiating another verification process. In addition, the method may repeat back to step 102 to verify another encoded data slice.

The method continues at step 116 where the processing module indicates a passed test when the processing module determines that the sum of the compressed encoded data slice partials compares favorably to the compressed encoded data slice. The passed test indication may include one or more of sending a passed test message, marking a list, and initiating another verification process. In addition, the method may repeat back to step 102 to verify another encoded data slice.

Figure 7:
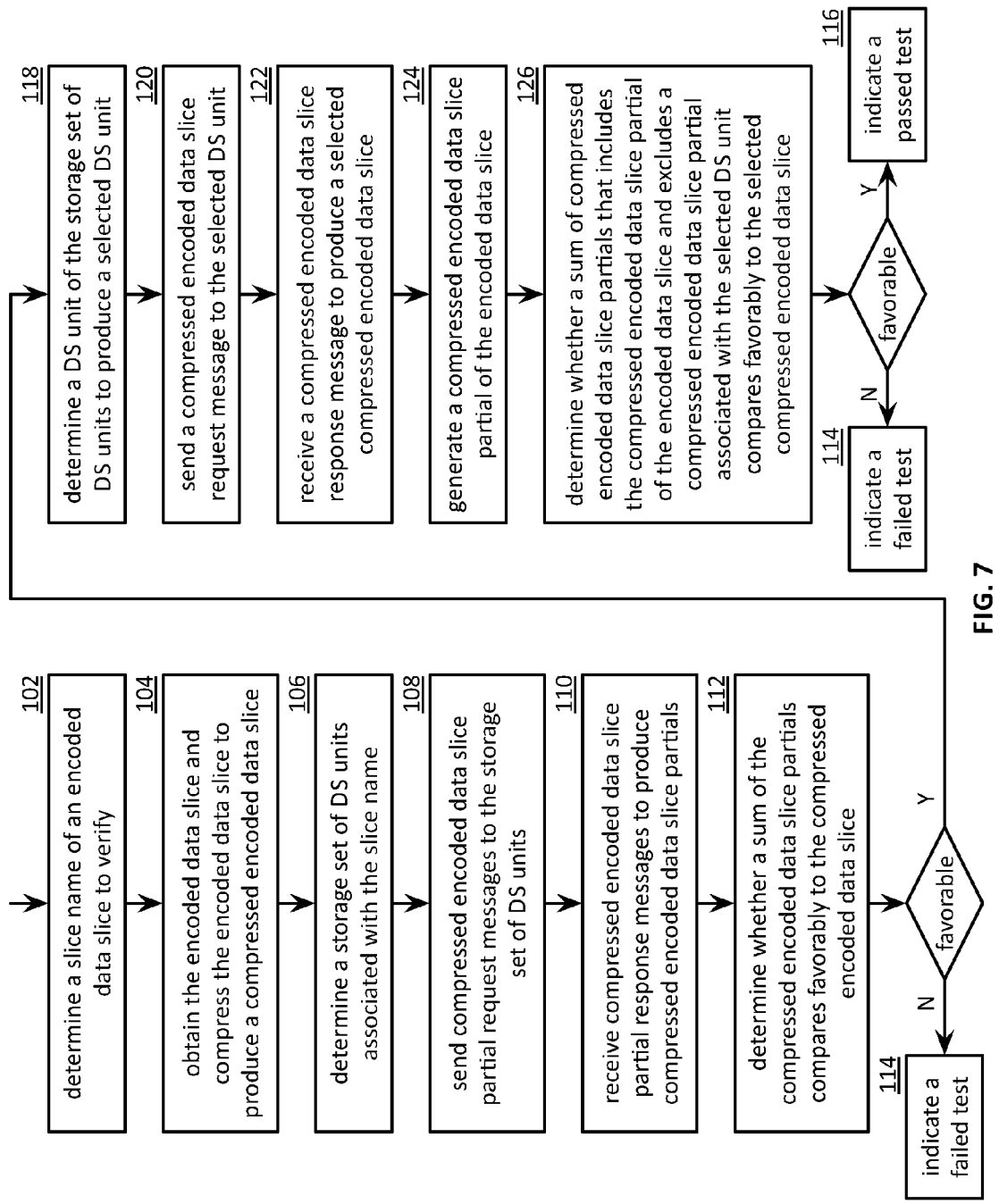
FIG. 7 is a flowchart illustrating another example of verifying encoded data slices in accordance with the invention.

FIG. 7 is a flowchart illustrating another example of verifying encoded data slices, which include similar steps to FIG. 6. The method begins with steps 102-112 of FIG. 6 where a processing module (e.g., of a dispersed storage (DS) unit) determines a slice name of an encoded data slice to verify, obtains the encoded data slice and compresses the encoded data slice to produce a compressed encoded data slice, determines a storage set of DS units associated with the slice name, sends compressed encoded data slice partial request messages to the storage set of DS units, receives at least a decode threshold number of compressed encoded data slice partial response messages to produce compressed encoded data slice partials, and determines whether a sum (e.g., finite field math utilizing an XOR logical function) of the compressed encoded data slice partials compares favorably to the compressed encoded data slice. The method branches to step 118 when the processing module determines that the comparison is favorable. The method continues to step 114 of FIG. 6 when the processing module determines that the comparison is not favorable. The method continues at step 114 of FIG. 6 where the processing module indicates a failed test when the processing module determines that the comparison is not favorable.

The method continues at step 118 where the processing module determines a DS unit of the stored set of DS units to produce a selected DS unit when the processing module determines that the sum of the compressed encoded data slice partials compares favorably to the compressed encoded data slice. The determination may be based on one or more of a random pick, a DS unit with a favorable comparison to selection criteria (e.g., high trust, high reliability, highly available, low latency, etc.), next in a DS unit list, and a DS unit that is not storing the encoded data slice (e.g., rather stores another encoded data slice of a set of encoded data slices wherein the set includes the encoded data). The method continues at step 120 where processing module sends a compressed encoded data slice request message to the selected DS unit. The method continues at step 122 where the processing module receives a compressed encoded data slice response message to produce a selected compressed encoded data slice.

The method continues at step 124 where the processing module generates a compressed encoded data slice partial of the encoded data slice. The generation includes partial decoding the encoded data slice to produce a vector utilizing an inverted square encoding matrix (e.g., dimensionally a decode threshold by the decode threshold) multiplied by the encoded data slice, partial encoding the vector to produce an encoded data slice partial utilizing an encoding matrix (e.g., only utilizing a row affiliated with an encoded data slice associated with the selected DS unit) multiplied by the vector, and compressing the encoded data slice partial to produce the compressed encoded data slice partial in accordance with compression information.

The method continues at step 126 where the processing module determines whether a sum (e.g., finite field math utilizing an XOR logical function) of compressed encoded data slice partials compares favorably to the selected compressed encoded data slice wherein compressed encoded data slice partials of the sum of the compressed encoded data slice partials includes the compressed encoded data slice partial of the encoded data slice and excludes a compressed encoded data slice partial associated with the selected DS unit. The processing module determines that the comparison is favorable when the sum of the compressed encoded data slice partials is substantially the same as the selected compressed encoded data slice. The method branches to step 116 of FIG. 6 when the processing module determines that the comparison is favorable. The method continues to step 114 of FIG. 6 when the processing module determines that the comparison is not favorable. The method continues at step 114 of FIG. 6 where the processing module indicates a failed test when the processing module determines that the sum of the compressed encoded data slice partials does not compare favorably to the selected compressed encoded data slice. In addition, the processing module may keep testing the same encoded data slice utilizing other permutations of the selected DS unit. The method continues at step 116 of FIG. 6 where the processing module indicates a passed test when the processing module determines the comparison is favorable.

Figure 8:
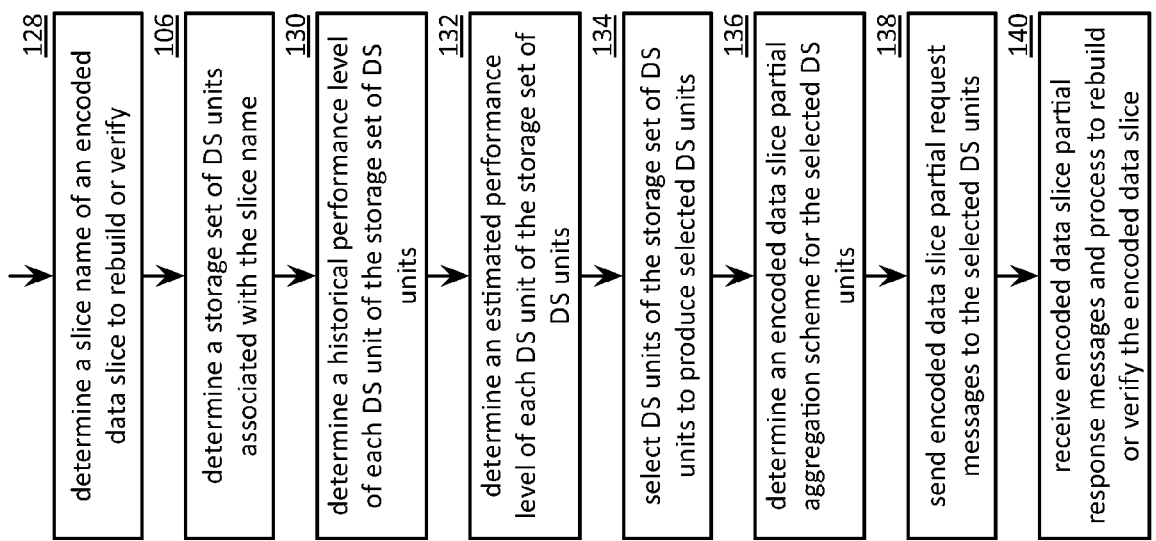
FIG. 8 is a flowchart illustrating an example of selecting dispersed storage (DS) units in accordance with the invention.

FIG. 8 is a flowchart illustrating an example of selecting dispersed storage (DS) units, which include similar steps to FIG. 6. A method begins with step 128 where a processing module (e.g., of a DS unit) determines a slice name of an encoded data slice to rebuild or verify. The determination may be based on one or more of a slice error indicator, an error message, a request, a next slice name in a list of slices to test, a random slice name, a slice name associated with a local DS unit, and a slice rebuild indicator. For example, the processing module determines the slice name based on a rebuild indicator subsequent to an encoded data slice being rebuilt. In such an example, the processing module determines to verify the encoded data slice associated with the slice name. The method continues at step 106 of FIG. 6 where the processing module determines a storage set of DS units associated with the slice name.

The method continues at step 130 where the processing module determines a historical performance level of each DS unit of the storage set of DS units. The determination may be based on one or more of retrieving a historical performance level record, a query, a test, a lookup, and a message. Dimensions of such performance may include one or more of access latency, excess bandwidth, reliability, availability, and cost. The method continues at step 132 where the processing module determines an estimated performance level of each DS unit of the storage set of DS units. The determination may be based on one or more of the historical performance level of each DS unit, an estimation guideline, a query, a test, a lookup, and a message. For example, processing module determines the estimated performance level of DS unit 3 based on the historical performance level of DS unit 3 for the last 30 days and the estimation guideline indicating that future estimated performance may be determined as an average of historical performance levels for the last 30 days.

The method continues at step 134 where the processing module selects at least a decode threshold number of DS units of the storage set of DS units to produce selected DS units. The selection may be based on one or more of system topology information (e.g., sites, number of DS units per site, site locations, etc.), the historical performance level, the estimated performance level, a performance goal, and a selection approach indicator (e.g., select as many DS units co-located with a present DS unit as possible, select the issuance of a remote site with a maximum number of DS units). For example, the processing module selects all three DS units (e.g., DS units 2-4) co-located with a present DS unit 1 (e.g., where the encoded data slice is stored), all four DS units (e.g., DS units 5-8 located at a second site, and DS unit 9 located at a third site in accordance with the selection approach indicator when the decode threshold is 8 and all the selected DS units are included in the storage set of DS units.

The method continues at step 136 where the processing module determines an encoded data slice partial aggregation scheme for the selected DS units. The scheme may include which DS units compute their encoded data slice partial, which DS units aggregate their encoded data slice partial with encoded data slice partials from which other DS units to produce aggregated encoded data slice partials, and which DS units are to be recipients of the aggregated encoded data slice partials. The determination may be based on one or more of the selected DS units, the system topology information, a DS unit capability indicator, the historical performance level, the estimated performance level, a security goal, and a random issued selection per site. In a ring structure example, the processing module determines the encoded data slice partial aggregation scheme to include DS unit 9 sends its encoded data slice partial to DS unit 8, DS unit 8 receives encoded data slice partials from local DS units 5-7, & 9 and aggregates the encoded data slice partials from DS units 5-9 to produce an aggregated encoded data slice partial, DS unit 8 sends the aggregated encoded data slice partial to DS unit 1, DS unit 1 receives the aggregated encoded data slice partial from DS unit 8, DS unit 1 receives encoded data slice partials from local DS units 2-4, and DS unit 1 aggregates the encoded data slice partials from DS units 2-4 and the aggregated encoded data slice partial from DS unit 8 to produce the encoded data slice. In a star structure example, the processing module determines the encoded data slice partial aggregation scheme to include DS unit 9 sends its encoded data slice partial to DS unit 1, DS unit 8 receives encoded data slice partials from local DS units 5-7 and aggregates the encoded data slice partials from DS units 5-8 to produce an aggregated encoded data slice partial, DS unit 8 sends the aggregated encoded data slice partial to DS unit 1, DS unit 1 receives the aggregated encoded data slice partial from DS unit 8, DS unit 1 receives encoded data slice partials from local DS units 2-4, and DS unit 1 aggregates the encoded data slice partials from DS units 2-4, & 9 and the aggregated encoded data slice partial from DS unit 8 to produce the encoded data slice.

The method continues at step 138 where the processing module sends encoded data slice partial request messages to the selected DS units. The request messages may include one or more of the encoded data slice partial aggregation scheme, a slice name corresponding to an encoded data slice associated with the DS unit of associated with the request message, a recipient identifier (ID), and compression information (e.g., as previously discussed). The method continues at step 140 where the processing module receives encoded data slice partial response messages and extracts encoded data slice partials from the messages. Next, the processing module facilitates rebuilding or verifying the encoded data slice utilizing the encoded data slice partials.

FIG. 9A is a flowchart illustrating an example of rebuilding an encoded data slice. A method begins with step 142 where a processing module (e.g., of a dispersed storage (DS) unit, of DS processing unit) identifies an encoded data slice to be rebuilt. The identification may be based on one or more of a slice error indicator, a missing slice indicator, a corrupted slice indicator, an error message, a request, a next slice name in a list of slices to test, a random slice name, a slice name associated with a local DS unit, detecting an error condition associated with the encoded data slice to be rebuilt, receiving a message, and a slice rebuild indicator. The method continues at step 144 where the processing module selects a decode threshold number of dispersed storage (DS) units of a storage set of DS units associated with the encoded data slice to be rebuilt (e.g., a set of encoded data slice is stored in the set of DS units that includes the encoded data slice to be rebuilt). The selecting may be based on one or more of a DS unit availability indicator, a DS unit capability indicator, and a DS unit performance level indicator.

The method continues at step 146 where the processing module generates a decode threshold number of key pairs, wherein a key pair of the decode threshold number of key pairs corresponds to a DS unit of the decode threshold number of DS units. The generating the decode threshold number of key pairs includes generating a decode threshold number of unique keys based on at least one of a random number generator, a random key generator, a predetermined key, a key seed, a key list, a private key, a public key, a received key, a slice name, a slice revision, a DS unit identifier, and a previous key and uniquely pairing keys of the decode threshold number of unique keys to produce the decode threshold number of key pairs. Each key of the decode threshold number of unique keys includes a number of bits substantially the same as a number of bits of the encoded data slice to be rebuilt. For example, the processing module may generate each key of the decode threshold number of unique keys to include the number of bits substantially the same as the number of bits of the encoded data slice to be rebuilt by expanding a random key to a length (e.g. number of bits) of the encoded data slice to produce an expanded key utilizing a stream cipher (e.g., Rivest cipher 4 (RC4)). As another example, the processing module expands the random key to the length of the encoded data slice to produce the expanded key utilizing a block cipher in counter mode to generate a pseudo-random stream of a length that matches the length of the encoded data slice. The unique pairing of the unique keys includes for each key pair of the decode threshold number of key pairs, selecting a first key and a second key from the decode threshold number of unique keys, wherein the second key is substantially different than the first key, and wherein the key pair is unique, and wherein each key of the decode threshold number of unique keys is selected an even number of times.

The method continues at step 148 where the processing module sends partial rebuilding requests to the decode threshold number of DS units, wherein a partial rebuilding request of the partial rebuilding requests includes one or more of the key pair, identity of the corresponding DS unit, a slice name of the encoded data slice to be rebuilt, a slice name corresponding to an encoded data slice associated with the DS unit, pillar identifiers of the decode threshold number of DS units (e.g., participating DS units), an encoding matrix, an inverted matrix, and a row of the encoding matrix corresponding to the encoded data slice to be rebuilt. Alternatively, the processing module sends the key pairs in separate messages. For example, the processing module generates three keys and generates key pairs as k1 & k2 for partial A, k1 & k3 for partial B, and k2 & k3 for partial C when the decode threshold is three. As another example, the processing module generates four keys and generates key pairs as k1 & k3 for partial A, k1 & k4 for partial B, k2 & k3 for partial C, and k2 & k4 for partial D when the decode threshold is four. As yet another example, the processing module generates five keys and generates key pairs as k1 & k3 for partial A, k1 & k4 for partial B, k2 & k5 for partial C, k2 & k4 for partial D, and k3 & k5 for partial E when the decode threshold is five. As a still further example, the processing module generates six keys and generates key pairs as k1 & k4 for partial A, k1 & k5 for partial B, k2 & k4 for partial C, k2 & k6 for partial D, k3 & k5 for partial E, and k3 & k6 for partial F when the decode threshold is six.

The method continues at step 150 where the processing module receives encrypted partial encoded data slices in response to the partial rebuilding requests, wherein an encrypted partial encoded data slice received from the corresponding DS unit includes a multiple encryption, using the key pair, of a partial encoded data slice. The partial encoded data slice includes a result of a partial encoded data slice generation function including obtaining an encoding matrix utilized to generate the encoded data slice to be rebuilt, reducing the encoding matrix to produce a square matrix that exclusively includes rows associated with the decode threshold number of DS units, inverting the square matrix to produce an inverted matrix, matrix multiplying the inverted matrix by an encoded data slice associated with the DS unit to produce a vector, and matrix multiplying the vector by a row of the encoding matrix corresponding to the encoded data slice to be rebuilt to produce the partial encoded data slice.

The method continues at step 152 where the processing module decodes the encrypted partial encoded data slices to rebuild the encoded data slice. The decoding the encrypted partial encoded data slices includes one of performing a logical exclusive OR function between each encrypted partial encoded data slice of the encrypted partial encoded data slices to rebuild the encoded data slice and performing the logical exclusive OR function between each encrypted partial encoded data slice and a corresponding key pair of the decode threshold number of key pairs to produce a decode threshold number of interim slices and performing the logical exclusive OR function between each interim slice of the decode threshold number of interim slices to reproduce the encoded data slice to be rebuilt. The exclusive OR function step will cancel out all the keys leaving the partial encoded data slices summed with each other to reproduce the encoded data slice to be rebuilt since the encrypted partial encoded data slices were previously encrypted with two keys utilized an even number of times (e.g., twice) across all the encrypted partial encoded slices.

FIG. 9B is a flowchart illustrating an example of generating an encrypted partial encoded data slice. The method begins with step 154 where a processing model (e.g., of a participating dispersed storage (DS) unit, of a DS processing unit) receives a partial rebuilding request (e.g., from a requesting entity), wherein the request includes a key pair. Alternatively, the processing module generates the key pair utilizing a Diffie-Hellman key exchange protocol with the requesting entity. The method continues at step 156 where the processing module retrieves (e.g., utilizing a slice name of the request) an encoded data slice associated with the partial encoded data slice request. In addition, the processing module may generate a new key pair based on the key pair. For example, the processing module expands the key pair to be a same number of bits as the encoded slice to produce the new key pair.

The method continues at step 158 where the processing module generates a partial encoded data slice based on the request and the encoded data slice associated with the request. The generating the partial encoded data slice includes one or more of obtaining an encoding matrix utilized to generate the encoded data slice (e.g., extract from the partial rebuilding request, retrieve from a memory), reducing the encoding matrix to produce a square matrix that exclusively includes rows identified in the partial rebuilding request (e.g., slice pillars associated with participating DS units of a decode threshold number of DS units), inverting the square matrix to produce an inverted matrix (e.g. alternatively, may extract the inverted matrix from the partial rebuilding request), matrix multiplying the inverted matrix by the encoded data slice to produce a vector, and matrix multiplying the vector by a row of the encoding matrix corresponding to an encoded data slice to be rebuilt (e.g. alternatively, may extract the row from the partial rebuilding request), to produce the partial encoded data slice (e.g., encoded data slice to be rebuilt identified in the partial rebuilding request).

The method continues at step 160 where the processing module multiple encrypts the partial encoded data slice using the key pair to produce an encrypted partial encoded data slice. The multiple encrypting the partial encoded data slice includes encrypting the partial encoded data slice utilizing a first key of the key pair to produce an interim slice and encrypting the interim slice utilizing a second key of the key pair to produce the encrypted partial encoded data slice. The encrypting the partial encoded data slice utilizing the first key includes at least one of performing a logical exclusive OR function between the partial encoded data slice and the first key to produce the interim slice and encrypting the partial encoded data slice utilizing the first key to produce the interim slice. The encrypting the interim slice utilizing the second key includes at least one of performing a logical exclusive OR function between the interim slice and the second key to produce the encrypted partial encoded data slice and encrypting the interim slice utilizing the second key to produce the encrypted partial encoded data slice. The method continues at step 162 where the processing module outputs the encrypted partial encoded data slice. For example, the processing module sends the encrypted partial encoded data slice to the requesting entity.

Figure 9C:
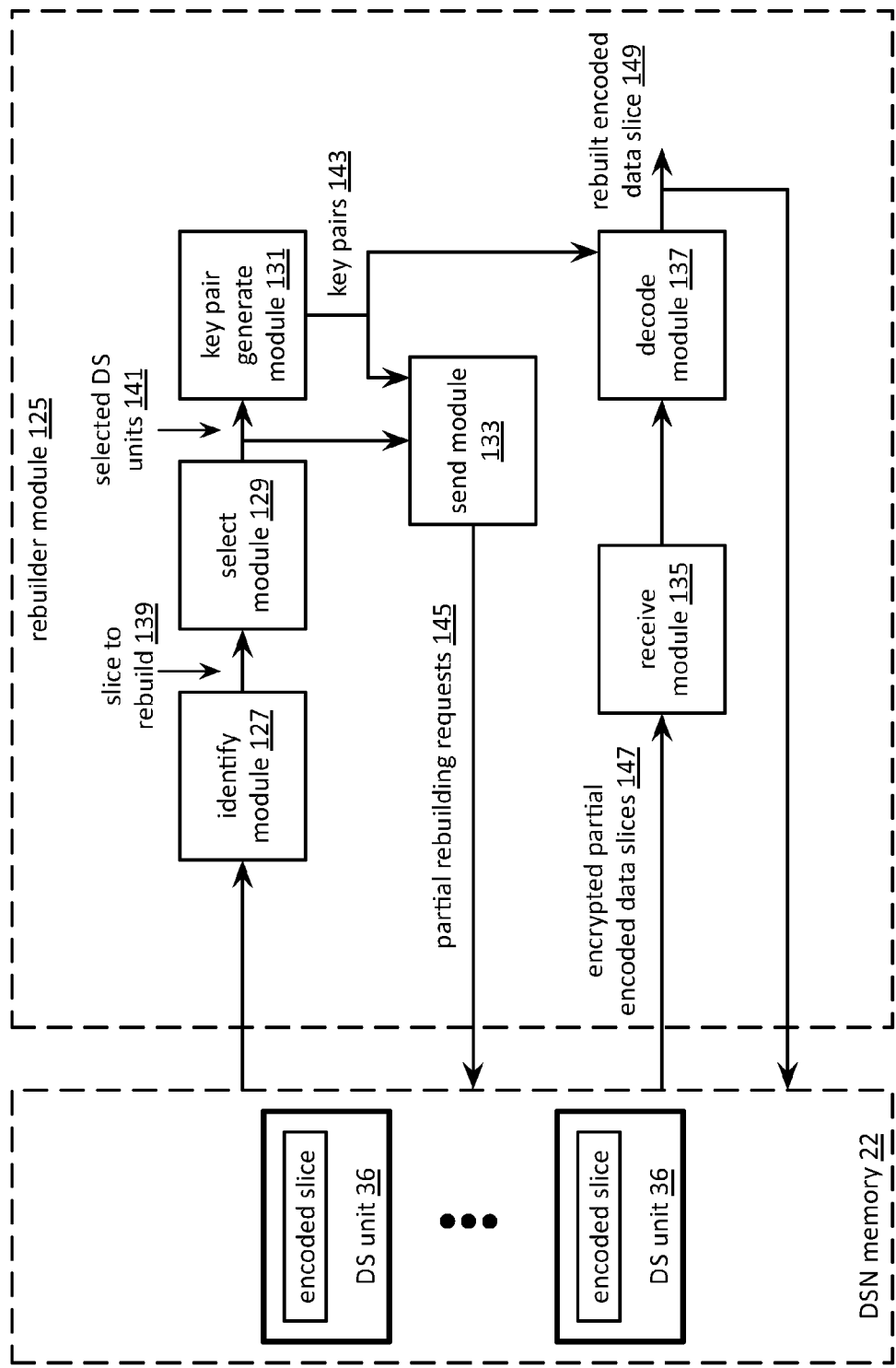
FIG. 9C is a block diagram of a rebuilding module in accordance with the invention.

FIG. 9C is a block diagram of a rebuilding module 125 that operates in accordance with the method described in FIG. 9A. The rebuilder module 125 is a module that includes one or more sub-modules, which include an identify module 127, a select module 129, a key pair generate module 131, a send module 133, a receive module 135, and a decode module 137.

The select module 129 selects a decode threshold number of dispersed storage (DS) units 36 of a storage set of DS units of a dispersed storage network (DSN) memory 22 associated with the encoded data slice to be rebuilt to produce selected DS units 141.

The key pair generate module 131 generates a decode threshold number of key pairs 143, wherein a key pair of the decode threshold number of key pairs 143 corresponds to a DS unit of the decode threshold number of DS units 141. The key pair generate module 131 generates the decode threshold number of key pairs 143 by generating a decode threshold number of unique keys based on at least one of a random number generator, a random key generator, a predetermined key, a key seed, a key list, a private key, and public key, a received key, and a previous key and uniquely pairing keys of the decode threshold number of unique keys to produce the decode threshold number of key pairs 143.

The send module 133 sends partial rebuilding requests 145 to the decode threshold number of DS units 141, wherein a partial rebuilding request of the partial rebuilding requests 145 includes the key pair and identity of the corresponding DS unit. The receive module 135 receives encrypted partial encoded data slices 147 in response to the partial rebuilding requests, wherein an encrypted partial encoded data slice received from the corresponding DS unit includes a multiple encryption, using the key pair, of a partial encoded data slice.

The decode module 137 decodes the encrypted partial encoded data slices 147 to rebuild the encoded data slice 149. The decode module 137 decodes the encrypted partial encoded data slices 147 by one of performing a logical exclusive OR function between each encrypted partial encoded data slice of the encrypted partial encoded data slices to rebuild the encoded data slice and performing the logical exclusive OR function between each encrypted partial encoded data slice and a corresponding key pair of the decode threshold number of key pairs 143 to produce a decode threshold number of interim slices and performing the logical exclusive OR function between each interim slice of the decode threshold number of interim slices to reproduce the encoded data slice 149 to be rebuilt.

Figure 9D:
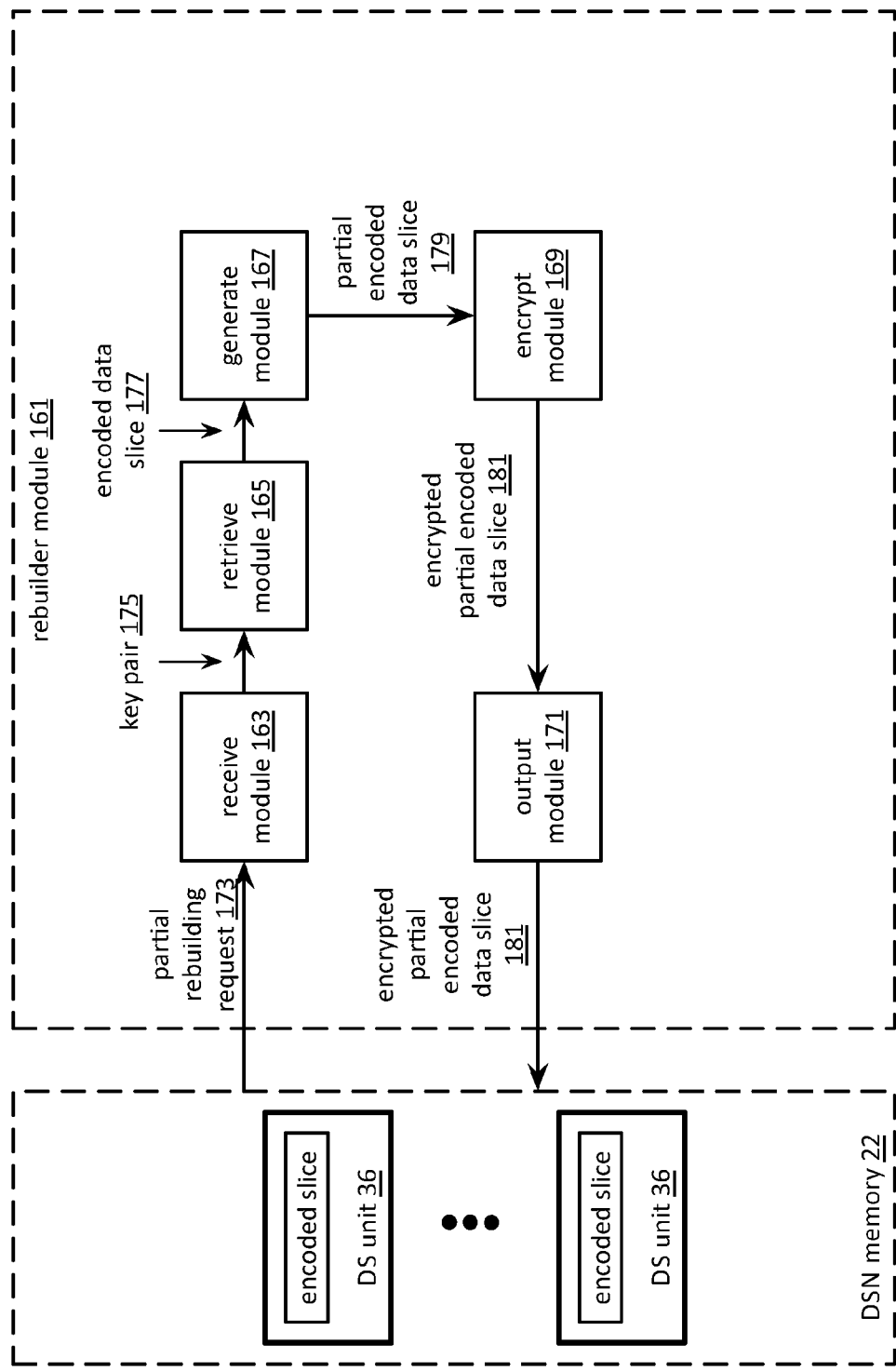
FIG. 9D is a block diagram of another rebuilding module in accordance with the invention.

FIG. 9D is a block diagram of another rebuilding module 161 that operates in accordance with the method described in FIG. 9B. The rebuilder module 161 is a module that includes one or more sub-modules, which include a receive module 163, a retrieve module 165, a generate module 167, an encrypt module 169, and an output module 171. The receive module 163 receives a partial rebuilding request 173 (e.g., from a requesting dispersed storage (DS) unit 36 of a dispersed storage network (DSN) memory 22) wherein the request includes a key pair 175. The retrieve module 165 retrieves an encoded data slice 177 associated with the partial encoded data slice request 173.

The generate module 167 generates a partial encoded data slice 179 based on the request 173 and the encoded data slice 177 associated with the request. The generate module 167 generates the partial encoded data slice 179 by one or more of obtaining an encoding matrix utilized to generate the encoded data slice, reducing the encoding matrix to produce a square matrix that exclusively includes rows identified in the partial rebuilding request, inverting the square matrix to produce an inverted matrix, matrix multiplying the inverted matrix by the encoded data slice to produce a vector, and matrix multiplying the vector by a row of the encoding matrix corresponding to an encoded data slice to be rebuilt to produce the partial encoded data slice 179.

The encrypt module 169 multiple encrypts the partial encoded data slice 179 using the key pair 175 to produce an encrypted partial encoded data slice 181. The encrypt module 169 multiple encrypts the partial encoded data slice 179 by encrypting the partial encoded data slice 179 utilizing a first key of the key pair 175 to produce an interim slice and encrypting the interim slice utilizing a second key of the key pair 175 to produce the encrypted partial encoded data slice 181. Alternatively, the encrypt module 169 encrypts the partial encoded data slice 179 utilizing the first key by at least one of performing a logical exclusive OR function between the partial encoded data slice 179 and the first key to produce the interim slice and encrypting the partial encoded data slice 179 utilizing the first key to produce the interim slice. In addition, the encrypt module 169 may encrypt the interim slice utilizing the second key by at least one of performing a logical exclusive OR function between the interim slice and the second key to produce the encrypted partial encoded data slice 181 and encrypting the interim slice utilizing the second key to produce the encrypted partial encoded data slice 181. The output module 171 out puts the encrypted partial encoded data slice (e.g., to the requesting DS unit 36).

Figure 10A:
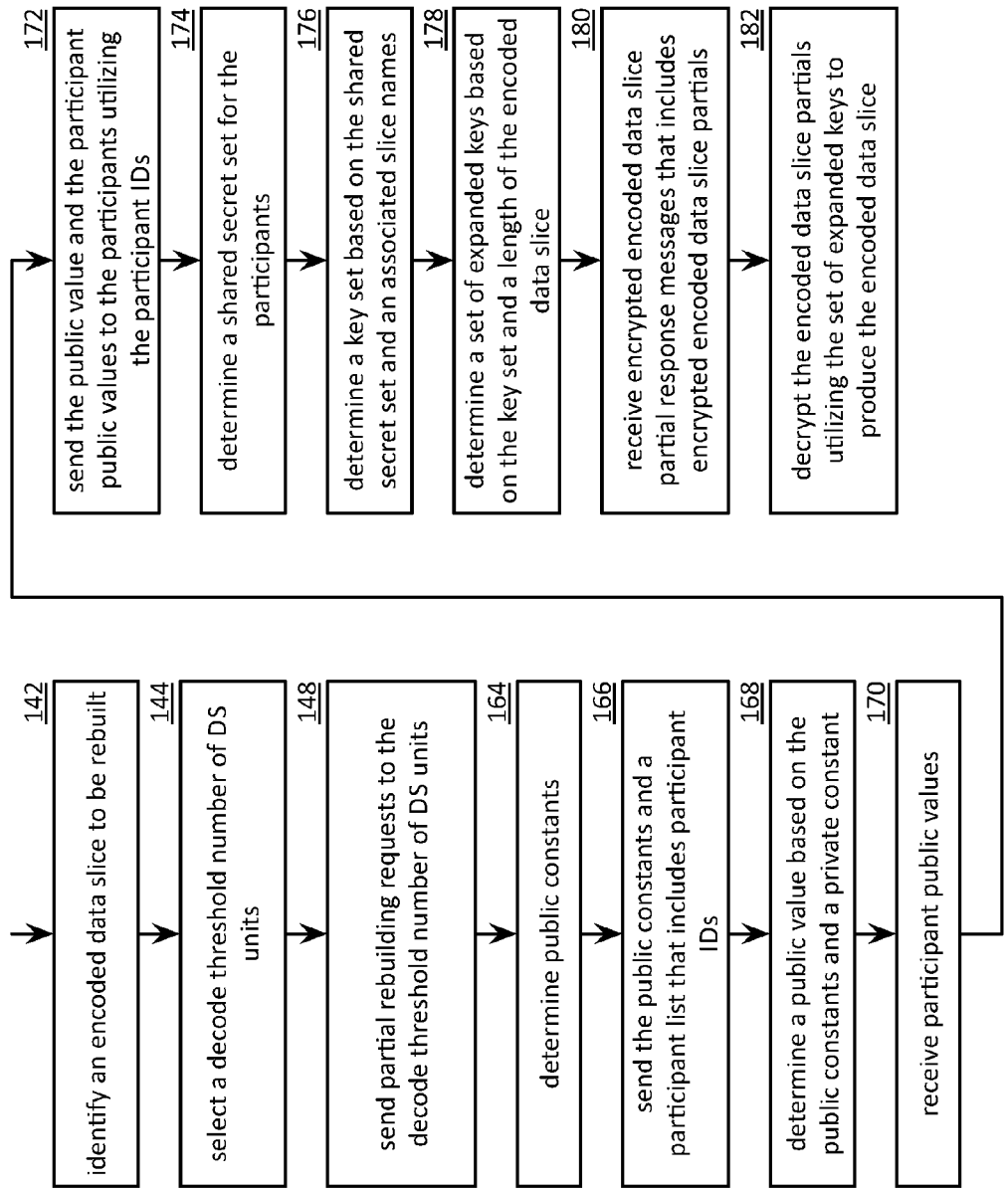
FIG. 10A is a flowchart illustrating another example of rebuilding an encoded data slice in accordance with the invention.

FIG. 10A is a flowchart illustrating another example of rebuilding an encoded data slice, which include similar steps to FIG. 9A. The method begins with steps 142-148 of FIG. 9A where a processing module (e.g. of a dispersed storage (DS) unit initiating a star structure rebuilding process) identifies an encoded data slice to be rebuilt (e.g., identifies a slice name associated with the encoded data slice to be rebuilt), selects a decode threshold number of DS units of a storage set of DS units associated with the encoded data slice to be rebuilt to produce selected DS units and a participant list, and sends partial rebuilding requests to the decode threshold number of DS units. The participant list includes a list of DS unit identifiers (IDs) associated with the selected DS units.

The method continues at step 164 where the processing module determines public constants. The public constants may be subsequently utilized with an associated shared secret approach to determine a shared secret between two DS units. The shared secret approach may include one of a Shamir shared secret method and a Diffie-Hellman shared secret method. The public constants may include one or more of participant IDs, the participant list, a Diffie-Hellman constant g, and a Diffie-Hellman constant p. Note that g may be a small number like 2 or 5 and p may be a large prime number with hundreds of digits.

The method continues at step 166 where the processing module sends the public constants and the participant list to participants of the participant list. For example, the processing module sends the public constants and the participant list to each DS unit of the decode threshold number of DS units. The method continues at step 168 where the processing module determines a public value based on the public constants and a private constant. The private constant may include a large number with hundreds of digits. For example, the processing module generates the public value as y=g^(private constant) mod p when utilizing the Diffie-Hellman shared secret method.

The method continues at step 170 where the processing module receives participant public values (e.g., public values created by each participant DS unit). The method continues at step 172 where the processing module sends the public value and the participant public values to the participants (e.g., utilizing the participants IDs of the participant list). For example, the processing module sends all of the public values to the selected DS units.

The method continues at step 174 where the processing module determines a shared secret set for the participants. In an example utilizing the Diffie-Hellman shared secret method, the processing module generates a shared secret as S=(participant public value)^(private constant) mod p. The processing module determines the shared secret set by calculating a shared secret for each pairing of a present DS unit and a DS unit of the participant list.

The method continues at step 176 where the processing module determines a key set based on the shared secret set and an associated slice name. For example, the processing module determines a key of the key set as key=hash based message authentication code (HMAC) of (the participant list+the participant public values+a recipient ID+an associated slice name) utilizing an associated shared secret as a HMAC key. The processing module may utilize finite field math to sum elements of the HMAC. For instance, the recipient ID corresponds to a DS unit ID of a participant DS unit responding to an initiating DS unit. As another instance, the recipient ID corresponds to a DS unit ID of the initiating DS unit. In an instance, the associated slice name corresponds to a slice name affiliated with the participant DS unit. As yet another instance, the associated slice name corresponds to the slice name (e.g., affiliated with the initiating DS unit).

The method continues at step 178 where the processing module determines a set of expanded keys based on the key set and a length of the encoded data slice. For example, the processing module expands a key to a length (e.g. number of bits) of the encoded data slice to produce an expanded key utilizing a stream cipher (e.g., Rivest cipher 4 (RC4)). As another example, the processing module expands the key to a length of the encoded data slice to produce the expanded key utilizing a block cipher in counter mode to generate a pseudo-random stream of a length that matches the length of the encoded data slice.

The method continues at step 180 where the processing module receives encrypted encoded data slice partial response messages that include encrypted encoded data slice partials. For example, the processing module receives the encrypted encoded data slice partial response messages from the selected DS units. The method continues at step 182 where the processing module decrypts the encoded data slice partials utilizing the set of expanded keys to produce the encoded data slice. For example, the processing module produces an encoded data slice=partial 1 XOR partial 2 XOR partial 3 etc.

Figure 10B:
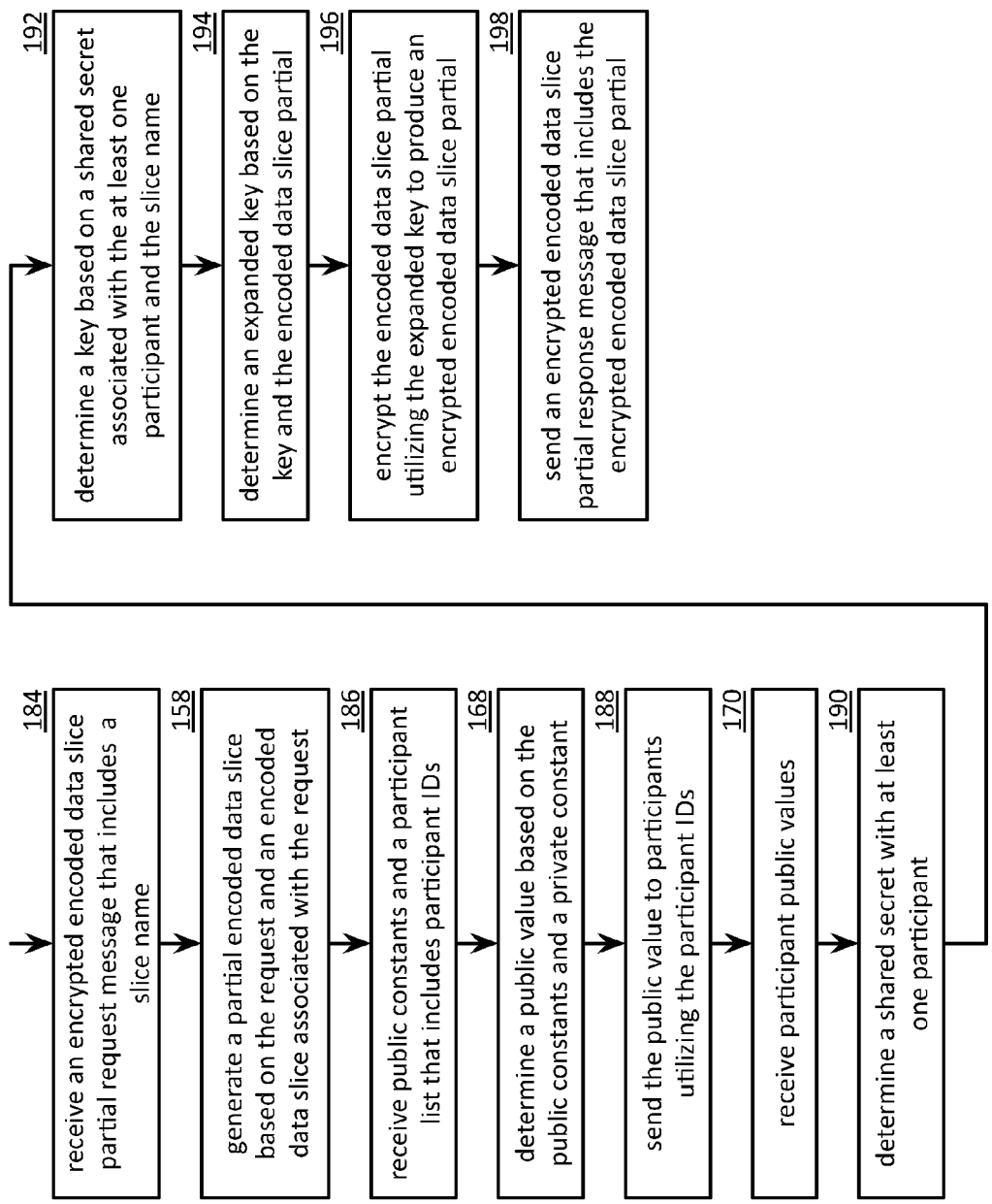
FIG. 10B is a flowchart illustrating an example of encrypting an encoded data slice partial in accordance with the invention.

FIG. 10B is a flowchart illustrating an example of encrypting an encoded data slice partial, which includes similar steps to FIGS. 9B and 10A. The method begins with step 184 where a processing module (e.g. of a participant dispersed storage (DS) unit participating in a star structure rebuilding process) receives an encrypted encoded data slice partial request message that includes a slice name (e.g., from an initiating DS unit). For instance, the slice name is associated with the participant DS unit (e.g., stored in the participant DS unit) and is affiliated with a slice name associated with the initiating DS unit wherein the encoded data slice associated with the slice name associated with the initiating DS unit is being rebuilt or verified. The method continues with step 158 of FIG. 9B where the processing module generates a partial encoded data slice based on the request and an encoded data slice associated with the request.

The method continues at step 186 where the processing module receives public constants and a participant list that includes participant identifiers (IDs). The method continues with step 168 of FIG. 10A where the processing module determines the public value based on the public constants and a private constant. The method continues at step 188 where the processing module sends the public value to participants (e.g., participating DS units) utilizing participants IDs of the participant list. For instance, the processing module sends the public value directly to the participants. As another instance, the processing module sends the public value to the initiating DS unit for publishing to the participants. The method continues with step 170 of FIG. 10A where the processing module receives participant public values. For example, the processing module receives the participant public values from the initiating DS unit. As another example, the processing module receives the participant public values from each of the participants (e.g., participating DS units).

The method continues at step 190 where the processing module determines a shared secret with at least one participant. For example, the processing module generates the shared secret as S=(participant public value)^(private constant) mod p when utilizing the Diffie-Hellman shared secret method. The processing module may utilize the initiating DS unit public value for the participant public value when the processing module determines a shared secret with the initiating DS unit. The processing module may utilize a participant public value associated with another participant (e.g., a different participating DS unit) when the processing module determines a shared secret with the other participant. Alternatively, or in addition to, the processing module determines a shared secret for each pairing of the participating DS unit with all other participants including the initiating DS unit.

The method continues at step 192 where the processing module determines a key based on a shared secret associated with the at least one participant and the slice name. The method continues at step 194 where the processing module determines an expanded key based on the key and the encoded data slice partial. The method continues at step 196 where the processing module encrypts the encoded data slice partial utilizing the expanded key to produce an encrypted encoded data slice partial. For example, the processing module determines the encrypted encoded data slice partial=(the encoded data slice partial) XOR (the expanded key). The method continues at step 198 where the processing module sends an encrypted encoded data slice partial response message that includes the encrypted encoded data slice partial. For example, the processing module sends the encrypted encoded data slice partial response message to the initiating DS unit. As another example, the processing module sends the encrypted encoded data slice partial response message to another participating DS unit.

Figure 11A:
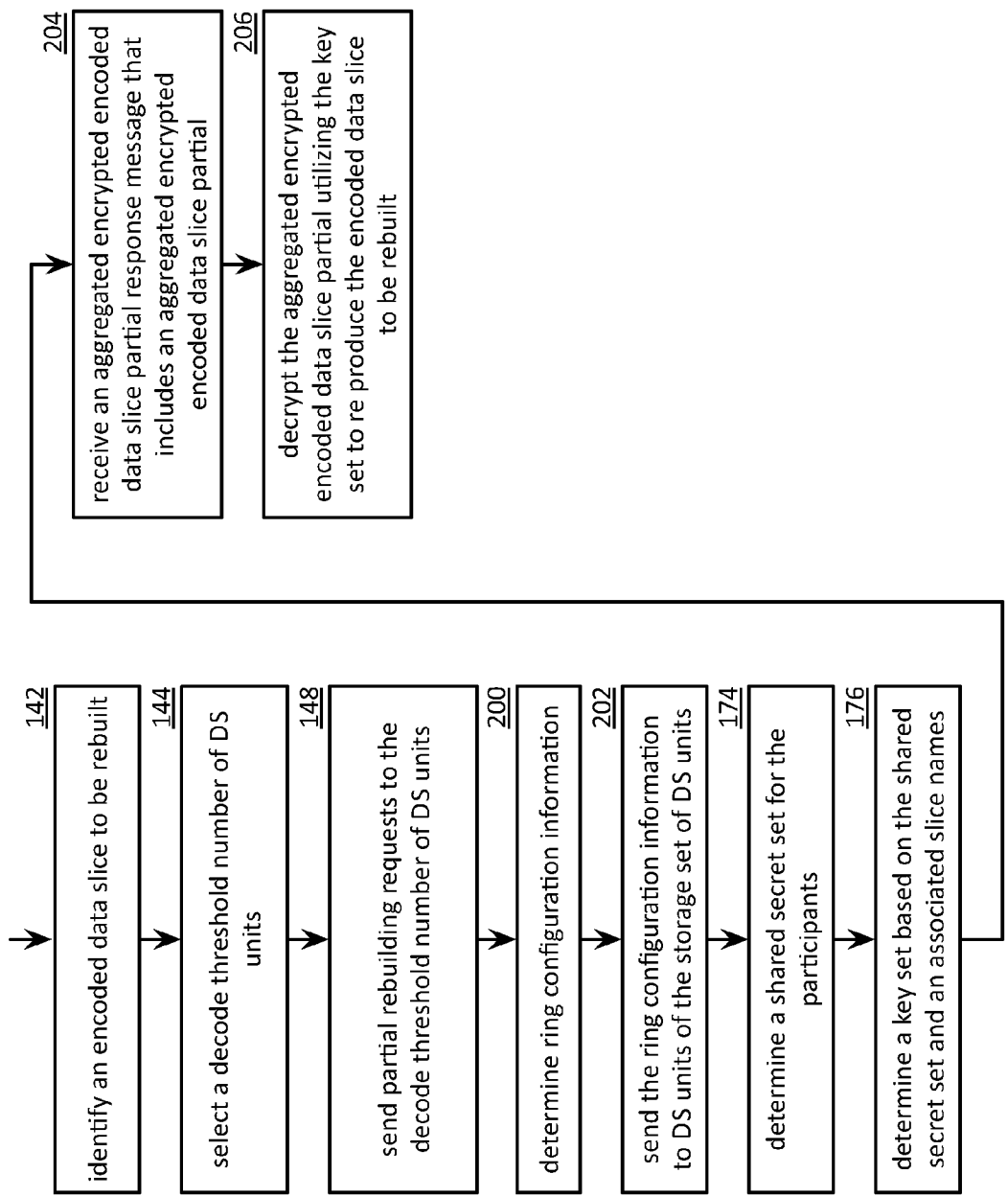
FIG. 11A is a flowchart illustrating another example of rebuilding an encoded data slice in accordance with the invention.

FIG. 11A is a flowchart illustrating another example of rebuilding an encoded data slice, which includes similar steps to FIGS. 9A and 10A. The method begins with steps 142-148 of FIG. 9A where a processing module (e.g. of a dispersed storage (DS) unit initiating a ring structure rebuilding process) identifies an encoded data slice to be rebuilt (e.g., identifies a slice name associated with the encoded data slice), selects a decode threshold number of DS units (e.g., participating DS unit identifiers (IDs) of a participant list), and sends partial rebuilding requests to the decode threshold number of DS units (e.g., to request encrypted encoded data slice partials).

The method continues at step 200 where the processing module determines ring configuration information with reference to determining an encoded data slice partial aggregation scheme for a ring structure example. The method continues at step 202 where the processing module sends the ring configuration information to the selected DS units. The method continues with steps 174-176 of FIG. 10A where the processing module determines a shared secret set for the participant DS units and determines a key set based on the shared secret set. Each key of the key set may include an expanded key to match a length of the encoded data slice.

The method continues at step 204 where the processing module receives an aggregated encrypted encoded data slice partial response message that includes an aggregated encrypted encoded data slice partial. For example, the processing module receives one aggregated encrypted encoded data slice partial response message that includes an encrypted encoded data slice as the aggregated encrypted encoded data slice partial. The method continues at step 206 where the processing module decrypts the aggregated encrypted encoded data slice partial utilizing the key set to reproduce the encoded data slice to be rebuilt. For example, the processing module produces the encoded data slice=(aggregated encrypted encoded data slice partial) XOR key 1 XOR key 2 XOR key 3 etc. for all the keys.

Figure 11B:
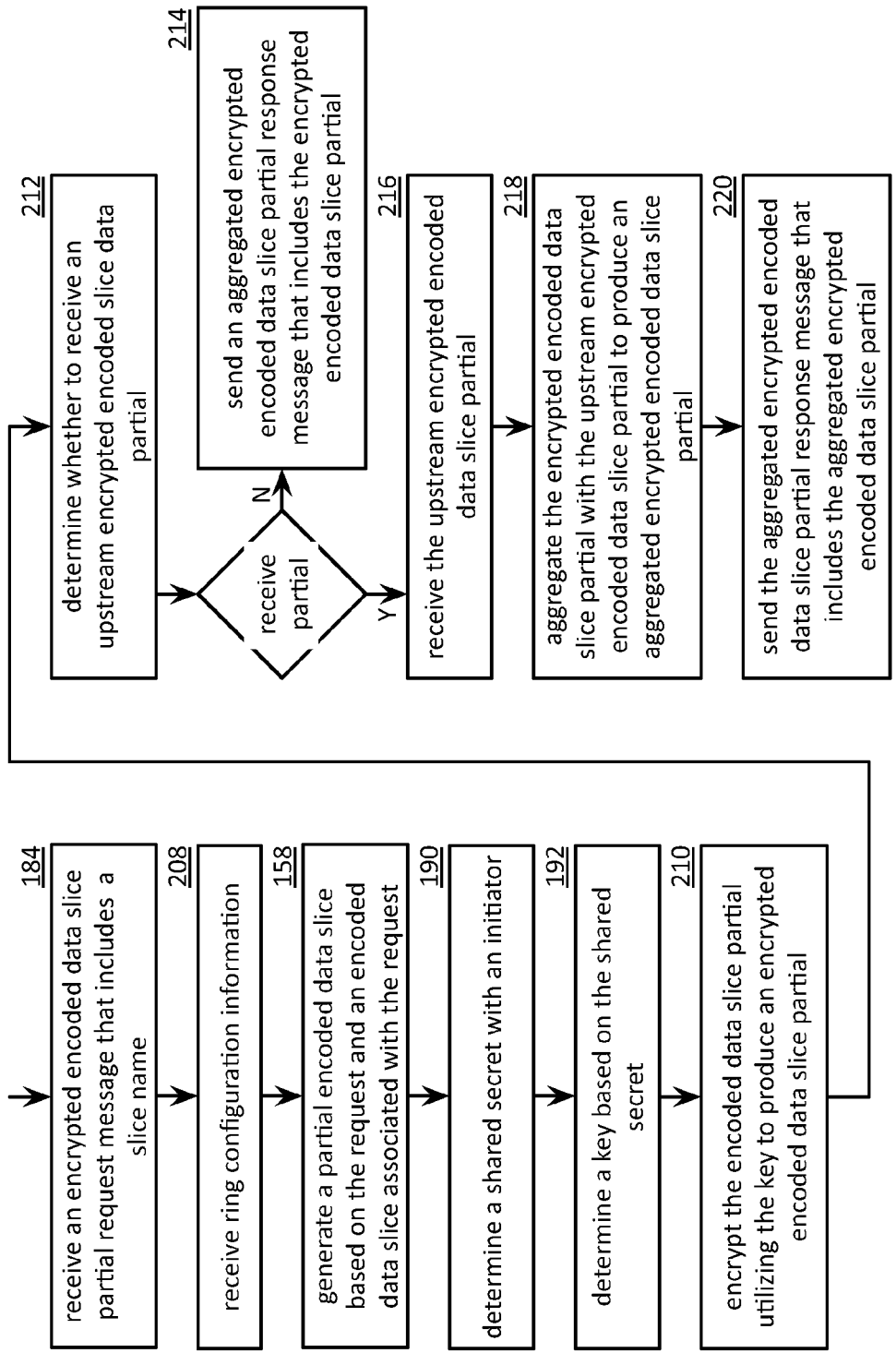
FIG. 11B is another flowchart illustrating another example of encrypting an encoded data slice partial in accordance with the invention.

FIG. 11B is a flowchart illustrating another example of encrypting an encoded data slice partial, that includes similar steps to FIGS. 9B and 10B. The method begins with step 184 of FIG. 10B where a processing module (e.g. of a participating dispersed storage (DS) unit participating a ring structure rebuilding process) receives an encrypted encoded data slice partial request message that includes a slice name. The method continues at step 208 where the processing module receives (e.g., from an initiating DS unit) ring configuration information. The method continues with step 158 of FIG. 9B where the processing module generates an encoded data slice partial of an encoded data slice associated with the slice name. The method continues with steps 190-192 of FIG. 10B where the processing module determines a shared secret with an initiator (e.g., the initiating DS unit) and determines a key based on the shared secret.

The method continues at step 210 where the processing module encrypts the encoded data slice partial utilizing the key to produce an encrypted encoded data slice partial. For example, the processing module produces the encrypted encoded data slice partial=(the encoded data slice partial) XOR (the key).

The method continues at step 212 where the processing module determines whether to receive an upstream encrypted encoded data slice partial. The upstream encrypted encoded data slice partial may include an encrypted encoded data slice from a sending DS unit (e.g., upstream with respect to a ring structure of the ring configuration information). The determination may be based on the ring configuration information. For example, the processing module determines not to receive the upstream encoded data slice partial when the ring configuration information indicates that the participating DS unit is a first DS unit of the ring structure. The method branches to step 216 when the processing module determines to receive the upstream encrypted encoded data slice partial. The method continues to step 214 when the processing module determines to not receive the upstream encrypted encoded data slice partial. The method continues at step 214 where the processing module sends an aggregated encrypted encoded data slice partial response message that includes the encrypted encoded data slice partial in accordance with the ring configuration information (e.g., the processing module sends the message to a downstream DS unit with respect to the ring structure).

The method continues at step 216 where the processing module receives (e.g., from the upstream DS unit with respect to the ring structure) the upstream encrypted encoded data slice partial when the processing module determines to receive the upstream encrypted encoded data slice partial in accordance with the ring configuration information. The method continues at step 218 where the processing module aggregates the encrypted encoded data slice partial with the upstream encrypted encoded data slice partial to produce an aggregated encrypted encoded data slice partial. For example, the processing module produces the aggregated encrypted encoded data slice partial=(the encrypted encoded data slice partial) XOR (the upstream encrypted encoded data slice partial).

The method continues at step 220 where the processing module sends the aggregated encrypted encoded data slice partial response message that includes the aggregated encrypted encoded data slice partial in accordance with the ring configuration information. For example, the processing module sends the aggregated encrypted encoded data slice partial response message to a downstream DS unit with respect to the ring structure.

Figure 12A:
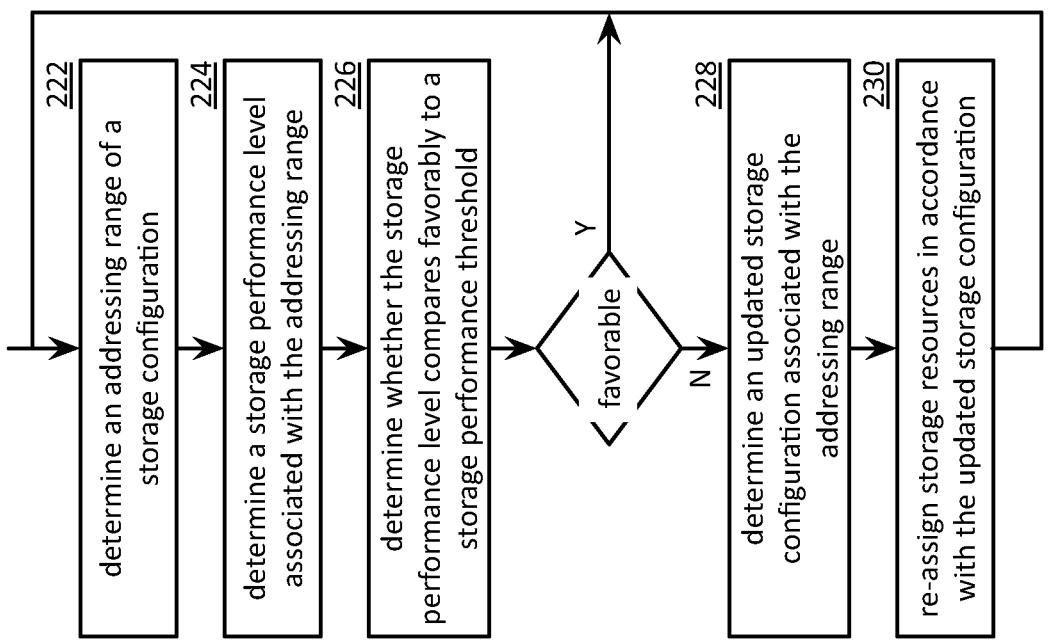
FIG. 12A is a flowchart illustrating an example of assigning storage resources in accordance with the invention.

FIG. 12A is a flowchart illustrating an example of assigning storage resources. The method begins with step 222 where a processing module (e.g., of a dispersed storage (DS) managing unit) determines an addressing range of a storage configuration. The addressing range may include a virtual dispersed storage network (DSN) address range (e.g., a from address, a to address, a number of addresses in the range). The storage configuration may include one or more DS units assigned to the addressing range. For example, two DS units store the same encoded data slices when the two DS units are assigned to the same addressing range. The determination may be based on one or more of a next address range in a list of address ranges to be tested, an error message, a performance indicator, and a system capacity indicator. For example, the processing module determines an addressing range X when receiving a performance indicator that indicates an issue with storage within addressing range X.

The method continues at step 224 where the processing module determines a storage performance level associated with the addressing range. The storage performance level may include one or more of a read latency time, a write latency time, a read data rate, a write data rate, an availability indicator, and a reliability indicator. The determination may be based on one or more of a query, a test, a lookup, retrieval of a historical record, and a message.

The method continues at step 226 where the processing module determines whether the storage performance level compares favorably to a storage performance threshold. For example, the processing module determines that the storage performance level compares favorably to the storage performance threshold when the storage performance level is not over performing or underperforming. The method repeats back to step 222 when the processing module determines that the storage performance level compares favorably to the storage performance threshold. In such a scenario, the processing module may determine a different address range to test. The method continues to step 228 when the processing module determines that the storage performance level compares unfavorably to the storage performance threshold.

The method continues at step 228 where the processing module determines an updated storage configuration associated with the addressing range. For example, the processing module removes DS units from the addressing range when the storage performance level indicates over performing. For instance, the processing module detects over performing when a read data rate is higher than a threshold data rate. As another example, the processing module adds DS units to the addressing range when the storage performance level indicates underperforming. For instance, the processing module detects underperforming when the read data rate is lower than a threshold data rate. The processing module may select DS units in accordance with a selecting method. Such a selecting method is discussed in greater detail with reference to FIG. 12B.

The method continues at step 230 where the processing module re-assigns storage resources in accordance with the updated storage configuration. For example, the processing module updates a virtual DSN address to physical location table to include DS units assigned to the addressing range. As another example, the processing module sends an addressing range assignment message to the DS units assigned to the addressing range. As yet another example, the processing module sends an addressing range de-assignment message to the issuance no longer assigned to the addressing range. The method repeats back to step 222 to potentially analyze a still further addressing range.

Figure 12B:
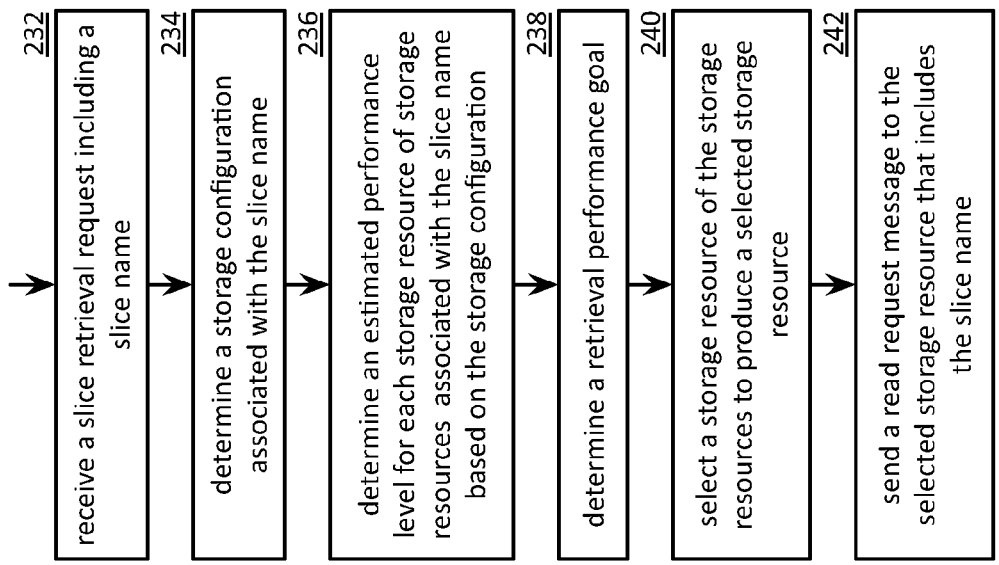
FIG. 12B is a flowchart illustrating an example of selecting storage resources in accordance with the invention.

FIG. 12B is a flowchart illustrating an example of selecting storage resources. The method begins with step 232 where a processing module (e.g., of a dispersed storage (DS) processing unit) receives a slice retrieval request including a slice name. The processing module may receive the slice retrieval request as a result of a data retrieval request. The method continues at step 234 where the processing module determines a storage configuration associated with the slice name. The storage configuration includes a list of which DS units are assigned to a common slice name (e.g., same addressing range). The determination may be based on one or more of a storage configuration lookup, a virtual dispersed storage network (DSN) to physical location table lookup, a query, a message, and a predetermination.

The method continues at step 236 where the processing module determines an estimated performance level for each storage resource of storage resources associated with the slice name based on the storage configuration. The performance level for each storage resource may include one or more of an access latency time, a read data rate, a write data rate, an availability indicator, and a reliability indicator. The determination may be based on one or more of a performance history record, a storage configuration lookup, a query, a message, a predetermination, and information in a retrieval message.

The method continues at step 238 where the processing module determines a retrieval performance goal. The retrieval performance goal may include one or more of a latency time, a read data rate, a write data rate, an availability level, and a reliability level. The determination may be based on one or more of a storage configuration lookup, a query, a message, a predetermination, and information retrieved in a retrieval message.

The method continues at step 240 where the processing module selects a storage resource of the storage resources to produce a selected storage resource. The selection may be based on one or more of the estimated performance levels, the retrieval performance goal, and the storage configuration. For example, the processing module selects a DS unit with an estimated performance level compares favorably (e.g., superior) to the retrieval performance goal. The method continues at step 242 where the processing module sends a read request message to the selected storage resource that includes the slice name.

Figure 13A:
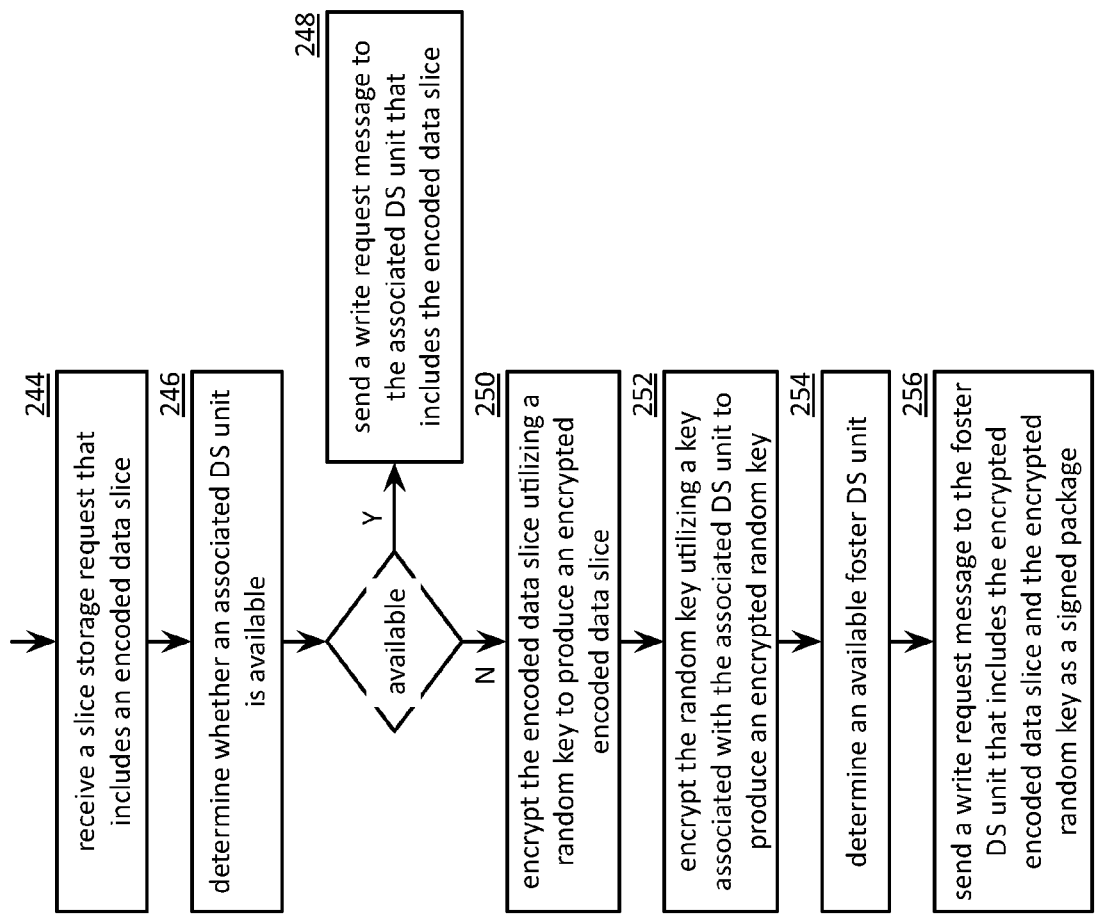
FIG. 13A is a flowchart illustrating an example of storing an encoded data slice in accordance with the invention.

FIG. 13A is a flowchart illustrating an example of storing an encoded data slice. The method begins with step 244 where a processing module (e.g., of a dispersed storage (DS) processing unit) receives a slice storage request that includes an encoded data slice. For example, the processing module receives the slice storage request as a result of a data storage sequence. The method continues at step 246 where the processing module determines whether an associated DS unit is available. The determination may be based on one or more of a virtual dispersed storage network (DSN) address to physical location table lookup (e.g., indicating which DS unit is associated with the encoded data slice based on a slice name), a query, a message, a performance indicator, an available memory indicator. For example, the processing module determines that DS unit 6 is associated with the encoded data slice based on the virtual DSN address to physical location table lookup and that DS unit 6 is presently available based on an available memory indicator associated with DS unit 6. The method branches to step 250 when the processing module determines that the associated DS unit is not available. The method continues to step 248 when the processing module determines that the associated DS unit is available. The method continues at step 248 where the processing module sends a write request message to the associated DS unit that includes the encoded data slice.

The method continues at step 250 where the processing module encrypts the encoded data slice utilizing a random key to produce an encrypted encoded data slice when the processing module determines that the associated DS unit is not available. The processing module may produce the random key based on a random number generator. The method continues at step 252 where the processing module encrypts the random key utilizing a key associated with the associated DS unit to produce an encrypted random key. For example, the processing module encrypts the random key utilizing a public key of a public-key infrastructure (PKI) encryption approach associated with the associated DS unit to produce the encrypted random key.

The method continues at step 254 where the processing module determines an available foster DS unit. The foster DS unit may temporarily store slices on behalf of the DS unit that is not available. The determination may be based on one or more of a foster DS unit list, a query, a message, a performance indicator, and an available memory indicator. For example, the processing module determines that DS unit 6 is the available foster DS unit when the processing module determines that the DS unit 6 is listed in the foster DS unit list and an available memory indicator associated with DS unit 6 indicates that DS unit 6 is available.

The method continues at step 256 where the processing module sends a write request messages to the foster DS unit that includes a signed package wherein the signed package includes the encrypted encoded data slice, the encrypted random key, and a signature over the encrypted encoded data slice and the encrypted random key. The foster DS unit may subsequently send the signed package to the associated DS unit when the associated DS unit is once again available to facilitate storing the encoded data slice in the associated DS unit.

Figure 13B:
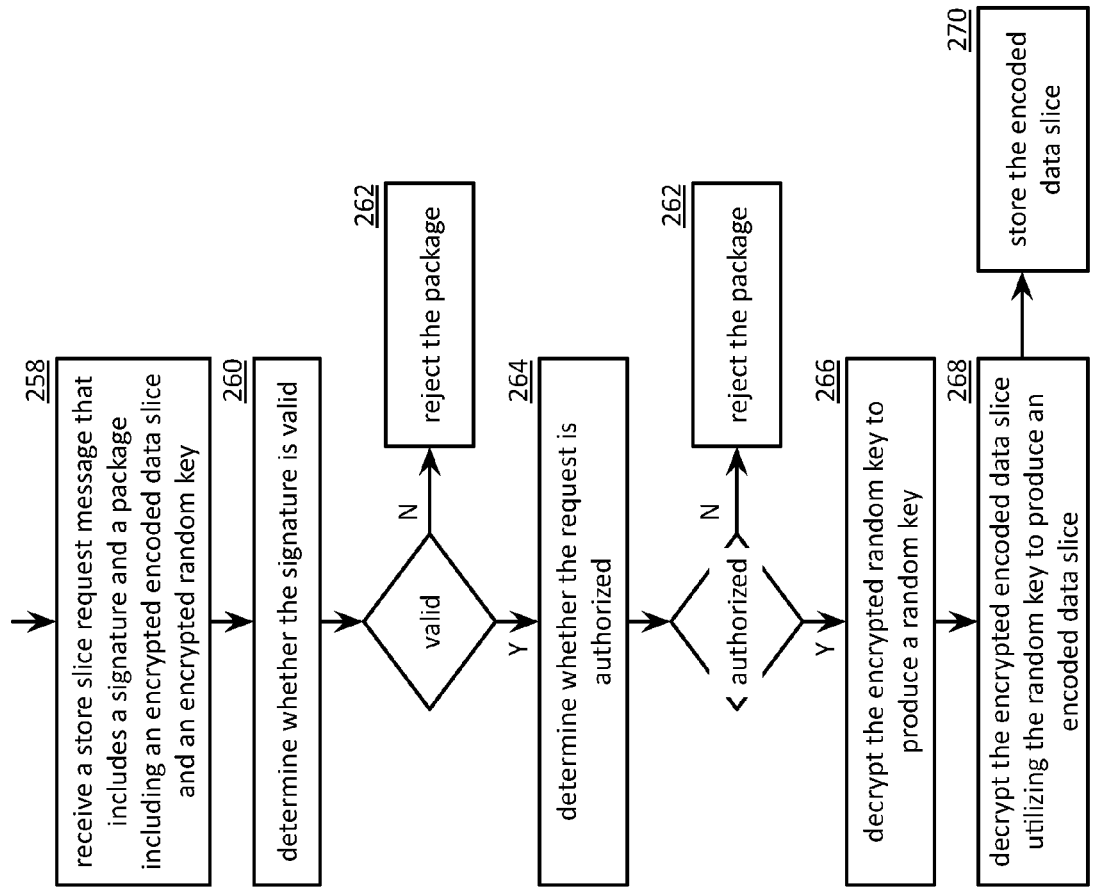
FIG. 13B is a flowchart illustrating another example of storing an encoded data slice in accordance with the invention.

FIG. 13B is a flowchart illustrating another example of storing an encoded data slice. The method begins with a processing module (e.g., of an associated dispersed storage (DS) unit associated with an encoded data slice temporarily stored in a foster DS unit) receives a store slice request message that includes a signed package including one or more of an encrypted encoded data slice, an encrypted random key, and a signature over the encrypted encoded data slice and the encrypted random key. The method continues at step 260 where the processing module determines whether the signature is valid. For example, the processing module compares a calculated hash over the encrypted encoded data slice and the encrypted random key to a decrypted signature utilizing a private key associated with the associated DS unit. For instance, the processing module validates the signature when the processing module determines that the calculated hash over the encrypted encoded data slice and the encrypted random key is substantially the same as the decrypted signature. The method branches to step 264 when the processing module determines that the signature is valid. The method continues to step 262 when the processing module determines that the signature is not valid. The method continues at step 262 where the processing module rejects the package. For example, the processing module sends an error message to a requesting entity to reject the package.

The method continues at step 264 where the processing module determines whether the request is authorized when the processing module determines that the signature is valid. The determination may be based on one or more of an access control list (ACL) query, a user device identifier (ID), a DS processing unit ID, a vault ID, a source name, a slice name, and a data object ID. For example, the processing module determines that the request is authorized when the processing module determines that a user ID associated with the request is identified in the ACL as authorized to access the encoded data slice associated with a slice name of the request. The method branches to step 266 when the processing module determines that the request is authorized. The method continues to step 262 to reject the package when the processing module determines that the request is not authorized.

The method continues at step 266 where the processing module decrypts the encrypted random key to produce a random key. For example, the processing module decrypts the encrypted random key utilizing a private key associated with a private key infrastructure (PKI) encryption approach associated with the associated DS unit to produce the random key. The method continues at step 268 where the processing module decrypts the encrypted encoded data slice utilizing the random key to produce an encoded data slice. The method continues at step 270 where the processing module stores the encoded data slice. For example, the processing module stores the encoded data slice in a memory of the associated DS unit. Alternatively, or in addition to, the processing module may store the signed package in a memory of the associated DS unit wherein the encrypted encoded data slice and the encrypted random key may be subsequently retrieved enabling subsequent decrypting of the encrypted encoded data slice to produce the encoded data slice. In such a scenario, a security improvement may be provided.

Figure 14A:
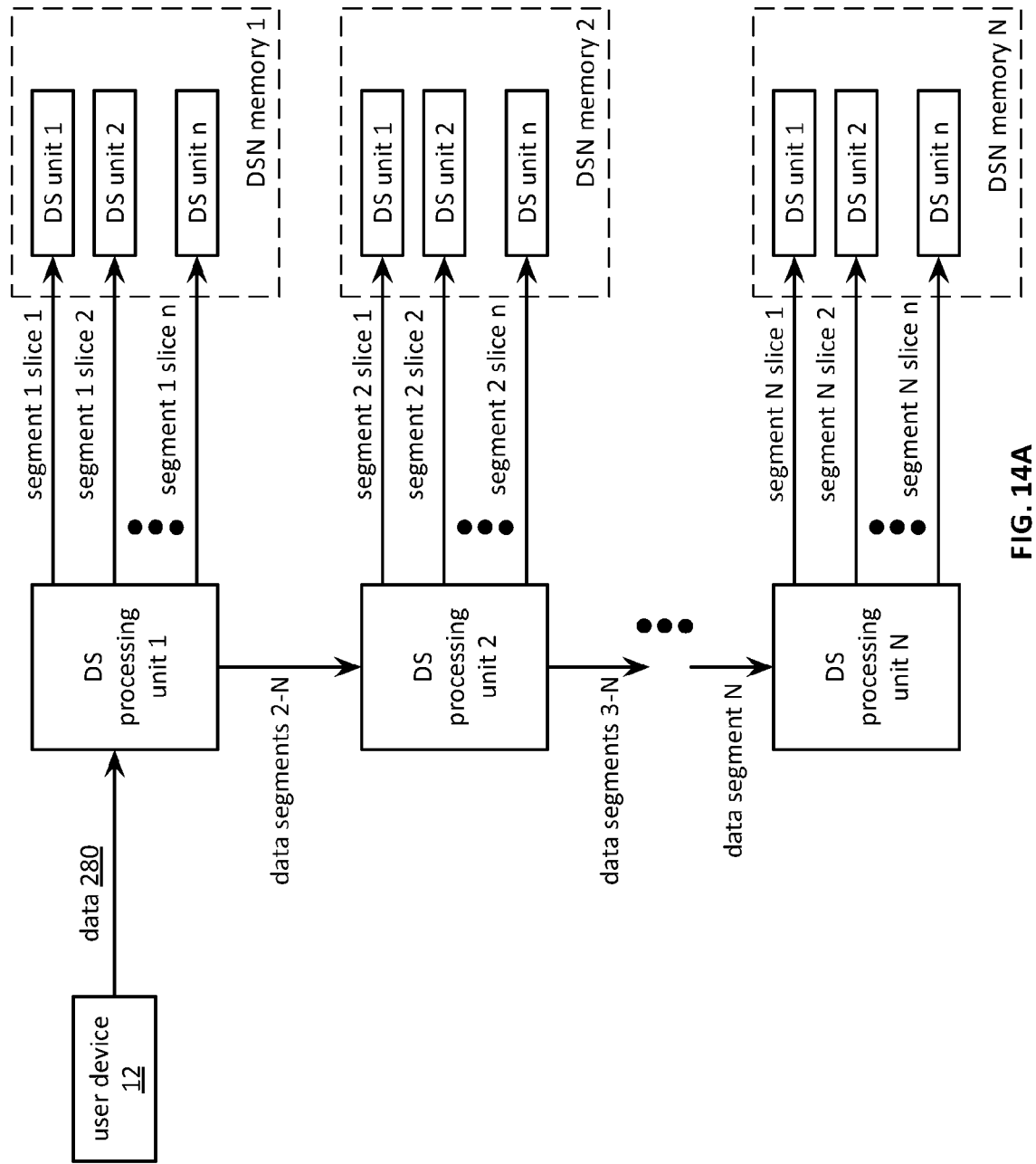
FIG. 14A is a schematic block diagram of another embodiment of a computing system in accordance with the invention.

FIG. 14A is a schematic block diagram of another embodiment of a computing system. The system includes a user device 12, a plurality of dispersed storage (DS) processing units 1-N, a plurality of dispersed storage network (DSN) memories 1-N that each include a plurality of DS units 1-*n*. Alternatively, a plurality of DS processing modules and/or DS modules may be utilized to implement the plurality of DS processing units 1-N. Alternatively, the plurality of DSN memories 1-N may be implemented with one DSN memory. Each DSN memory of the plurality of DSN memories 1-N may include a different number of DS units when more than one DSN memory is utilized.

In an example of operation, the user device 12 sends data 280 to DS processing unit 1 for storage in the plurality of DSN memories 1-N. DS processing unit 1 receives the data 280 and partitions the data 280 into a first portion and a second portion in accordance with a data partitioning dispersed storage scheme (e.g., including segmentation approach). For instance, DS processing unit 1 partitions the data such that the first portion and the second portion overlap wherein the first portion and the second portion share a common section. As another instance, DS processing unit 1 partitions the data into N data segments that includes a data segment 1 as the first portion and data segments 2-N as the second portion. As yet another instance, DS processing unit 1 partitions the data into two data segments that includes data segment 1 as the first portion and data segment 2 as the second portion wherein data segment 1 and data segment 2 do not overlap. Next, DS processing unit 1 encodes (e.g., manipulates) the first portion (e.g. data segment 1) to create local data (e.g., first manipulated data) and sends the local data to DSN memory 1 for storage therein as is further discussed with reference to FIGS. 14A-17F. Next, DS processing unit 1 sends the second portion to DS processing unit 2.

In the example of operation continued, DS processing unit 2 receives the second portion and partitions the second portion into a third portion and a fourth portion in accordance with the data partitioning dispersed storage scheme. For instance, DS processing unit 2 partitions the second data portion such that the third portion and the fourth portion overlap wherein the third portion and the fourth portion share a common section. As another instance, DS processing unit 2 partitions the second portion into N-1 data segments 2-N that includes a data segment 2 as the third portion and data segments 3-N as the fourth portion. As yet another instance, DS processing unit 2 segments the second portion into two data segments that includes data segment 2 as the third portion and data segment 3 as the fourth portion wherein data segment 2 and data segment 3 do not overlap. As a still further instance, DS processing unit 2 receives the second portion as data segments 2-N that include data segment 2 as the third portion and data segments 3-N as the fourth portion. Next, DS processing unit 2 encodes (e.g., manipulates) the third portion (e.g. data segment 2) to create second manipulated data and sends the second manipulated data to DSN memory 2 for storage therein as is further discussed with reference to FIGS. 14A-17F. Next, DS processing unit 2 sends the fourth portion to DS processing unit 3. Note that DS processing units 3-(N-1) may operate in accordance with the method described for DS processing unit 2. In the example of operation continued, DS processing unit N receives data segment N from DS processing unit N-1. Next, DS processing unit N manipulates data segment N to create Nth manipulated data and sends the Nth manipulated data to DSN memory N for storage therein as is further discussed with reference to FIGS. 14A-17F.

Each DS processing unit of the plurality of DS processing units 1-N manipulates (e.g., encodes) a corresponding data segment to create corresponding manipulated data in accordance with a data manipulation approach. For example, DS processing unit 1 manipulates data segment 1 to create first manipulated data. As another example, DS processing unit 4 manipulates data segment 4 to create fourth manipulated data. The data manipulation approach may include encoding the data segment to create one or more of a section of a data segment, a data segment, a replicated data segment, an encoded data slice, and a plurality of encoded data slices.

Next, the DS processing unit sends the manipulated data to one or more DS units of a corresponding DSN memory in accordance with the data manipulation approach. For example, DS processing unit 1 sends a pillar width number of encoded data slices to the pillar width number of corresponding DS units of DSN memory 1. For instance, DS processing unit 1 sends a first slice to DS unit 1, a second slice to DS unit 2, up through an nth slice to DS unit n. As another example, DS processing unit 1 sends data segment 1 to each of the pillar width number of DS units (e.g., DS units 1-*n*) of DSN memory 1. As yet another example, DS processing unit 1 sends a decode threshold number of sections (e.g., sections 1-*k*) of data segment 1 to a corresponding decode threshold number of DS units (e.g., DS units 1-*k*) of DSN memory 1. As a still further example, DS processing unit 1 sends data segment 1 to a decode threshold number of DS units (e.g., DS units 1-*k*) of DSN memory 1. The pillar width n may vary from DS processing unit to DS processing unit in accordance with the data manipulation approach. For example, DS processing unit 2 may utilize a pillar width of 5 when DS processing unit 1 utilizes a pillar width of 16. The decode threshold k may vary from DS processing unit to DS processing unit in accordance with the data manipulation approach. For example, DS processing unit 2 may utilize a decode threshold of 3 when DS processing unit 1 utilizes a decode threshold of 10.

A DS processing unit and/or a DS unit may update a directory and/or a location table subsequent to storing the data in the plurality of DSN memories. For example, DS processing unit N updates a virtual DSN address to physical location table subsequent to confirming that data segment N has been successfully stored in DSN memory N. As another example, DS unit n of DSN memory N updates the virtual DSN address to physical location table subsequent to confirming that data segment N has been successfully stored in DSN memory N. The method of operation of each of the plurality of DS processing units is described in greater detail with reference to FIGS. 14B-17F. The method of operation of each of the DS units of the plurality of DS units is described in greater detail with reference to FIGS. 15C, 16E, and 17E-F. The method of operation of each of the plurality of DS processing units when the data manipulation approach indicates to send manipulated data as the pillar width number of encoded data slices to the pillar width number of DS units of the DSN memory is described in greater detail with reference to FIG. 14B.

In a data retrieval example of operation, each DS processing unit retrieves manipulated data from a corresponding DSN memory in accordance with the data manipulation approach, decodes the manipulated data to produce a corresponding data segment in accordance with the data manipulation approach, sends the data segment to at least one other DS processing unit in accordance with the data segmentation approach, and aggregates data segments to reproduce the data in accordance with the data segmentation approach.

Figure 14B:
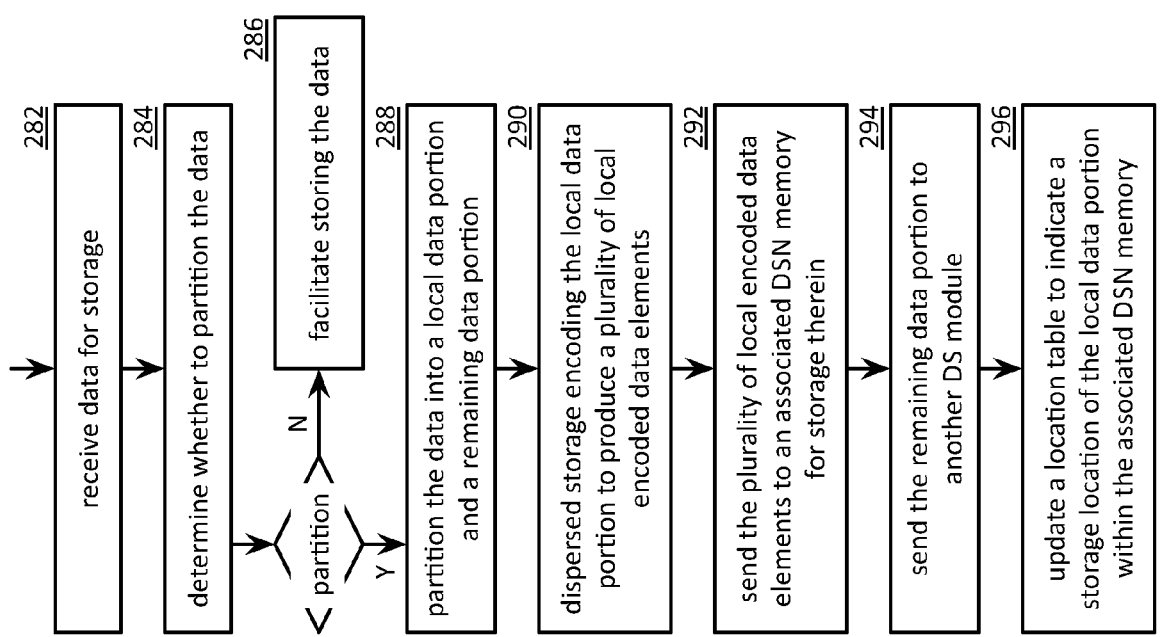
FIG. 14B is a flowchart illustrating an example of storing data in accordance with the invention.

FIG. 14B is a flowchart illustrating an example of storing data. The method begins with step 282 where a processing module (e.g., of a dispersed storage (DS) module) receives (e.g., from a user device, from a DS processing module, from a DS processing unit, from a DS unit) data for storage. The data may include one or more of at least a portion of a data object, at least a portion of a data block, a plurality of data blocks, and one or more data segments. The receiving the data includes receiving the data from a second other DS module and receiving a data partitioning dispersed storage scheme from the second other DS module.

Alternatively, the processing module may determine the data partitioning dispersed storage scheme based on one or more of a memory availability indicator, a data size indicator, a stored portion indicator, a redundancy indicator, a predetermination, and a lookup. The data partitioning dispersed storage scheme may include one or more storage indicators including a first portion and a second portion are to be adjacent, the first portion is to be embedded in the second portion, the second portion is to be embedded in the first portion, the first portion and the second portion overlap, the first portion in the second portion do not overlap, the first portion in the second portion are to be the same size, the first portion is to be smaller than the second portion, the second portion is to be smaller than the first portion, and the second portion is to be zero bytes. In addition, the processing module may receive metadata associated with the data, wherein the metadata includes one or more of a data identifier (ID), a user device ID, a vault ID, a source name, a stored portion indicator, a data size indicator, a data type indicator, a priority indicator, a security indicator, and a performance indicator.

The method continues at step 284 where the processing module determines whether to partition the data in accordance with the data partitioning dispersed storage scheme. The determining whether to partition the data includes interpreting data size of the data, determining whether the data size is of a level that requires partitioning in accordance with the data partitioning dispersed storage scheme, and when the data size is of a level that requires partitioning, indicating partitioning of the data. For example, the processing module determines to partition the data when the data size is 1 megabyte (MB) and the level that requires partitioning is 0.5 MB. The method branches to step 288 when the processing module determines to partition the data. The method continues to step 286 when the processing module determines not to partition the data. The method continues at step 286 where the processing module facilitates storing the data. The facilitating includes one or more of sending the data to a dispersed storage network (DSN) memory for storage therein, dispersed storage encoding the data to produce a plurality of local encoded data elements in accordance with dispersed storage encoding parameters and sending the plurality of local encoded data elements to the DSN memory for storage therein, and sending the data to another DS module.

The method continues at step 288 where the processing module partitions the data into a local data portion and a remaining data portion in accordance with the data partitioning dispersed storage scheme when the data is to be partitioned. The partitioning includes at least one of selecting a portion of the data per a data portion size indication of the data partitioning dispersed storage scheme to produce the local data portion and selecting the local data portion to have a partial overlap of data with the remaining data portion in accordance with the data partitioning dispersed storage scheme.

The method continues at step 290 where the processing module dispersed storage encodes the local data portion to produce a plurality of local encoded data elements in accordance with dispersed storage encoding parameters (e.g., associated with the data partitioning dispersed storage scheme). The dispersed storage encoding includes one or more of dispersed storage error encoding (e.g., to produce a plurality of encoded data slices), slicing the local data portion into a set of slices and encrypting the set of slices (e.g., such slices may be different sizes), slicing the local data portion into a set of slices, and replicating the local data portion.

The method continues at step 292 where the processing module sends the plurality of local encoded data elements to an associated dispersed storage network (DSN) memory for storage therein. The method continues at step 294 where the processing module sends the remaining data portion to another DS module. The sending the remaining data portion to another DS module includes selecting the other DS module based at least one of: the data partitioning dispersed storage scheme, a lookup, a query, and a message. For example, the processing module selects the DS module (e.g., a first DS module in a chain of DS modules) as the other DS module when the data partitioning dispersed storage scheme includes an iterative indicator. As another example, a processing module selects a previous DS module (e.g., source of the data) as the other DS module when the data partitioning dispersed storage scheme includes a previous DS module indicator. The method continues at step 296 where the processing module updates a location table to indicate storage of the local data portion within the associated DSN memory.

Figure 14C:
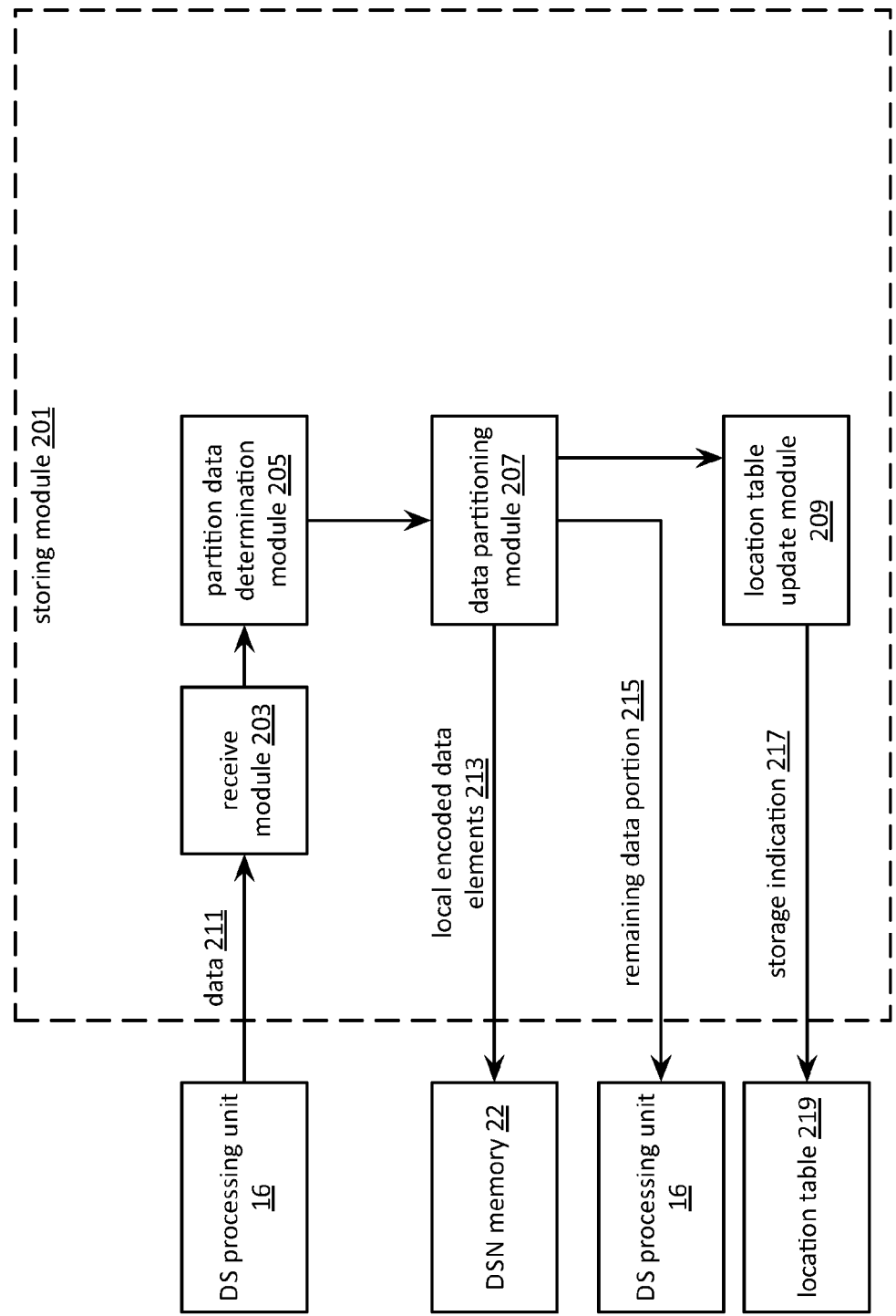
FIG. 14C is a block diagram of a storing module in accordance with the invention.

FIG. 14C is a block diagram of a storing module 201 that operates in accordance with the method described in FIG. 14B. The storing module 201 includes a receive module 203, a partition data determination module 205, a data partitioning module 207, and a location table update module 209. Alternatively, a single module (e.g., a dispersed storage (DS) module) may be implemented to provide functionality of modules 203-209. The receive module 203 facilitates receiving data 211 and data partitioning dispersed storage scheme from a second other DS module (e.g., from a DS processing unit 16). The partition data determination module 205 determines whether to partition data 211 in accordance with the data partitioning dispersed storage scheme, wherein the data is received for storage. The partition data determination module 205 determines whether to partition the data by interpreting data size of the data, determining whether the data size is of a level that requires partitioning in accordance with the data partitioning dispersed storage scheme, and when the data size is of a level that requires partitioning, indicating partitioning of the data.

When the data is to be partitioned, the data partitioning module 207 partitions the data into a local data portion and a remaining data portion 215 in accordance with the data partitioning dispersed storage scheme. The data partitioning module 207 partitions the data by selecting a portion of the data per a data portion size indication of the data partitioning dispersed storage scheme to produce the local data portion. The data partitioning module 207 may partition the data by selecting the local data portion to have a partial overlap of data with the remaining data portion 215 in accordance with the data partitioning dispersed storage scheme.

The data partitioning module 207 dispersed storage encodes the local data portion to produce a plurality of local encoded data elements 213 in accordance with dispersed storage encoding parameters. The dispersed storage encoding includes one or more of dispersed storage error encoding, slicing the local data portion into a set of slices and encrypting the set of slices, slicing the local data portion into a set of slices, and replicating the local data portion.

The data partitioning module 207 sends the plurality of local encoded data elements 213 to an associated dispersed storage network (DSN) memory 22 for storage therein and sends the remaining data portion 215 to another DS module (e.g., a DS processing unit). The data partitioning module 207 sends the remaining data portion 215 to the another DS module by selecting the other DS module based at least one of the data partitioning dispersed storage scheme, a lookup, a query, and a message. The location table update module 209 updates a location table 219 to indicate a storage of the local data portion within the associated DSN memory 22.

Figure 15A:
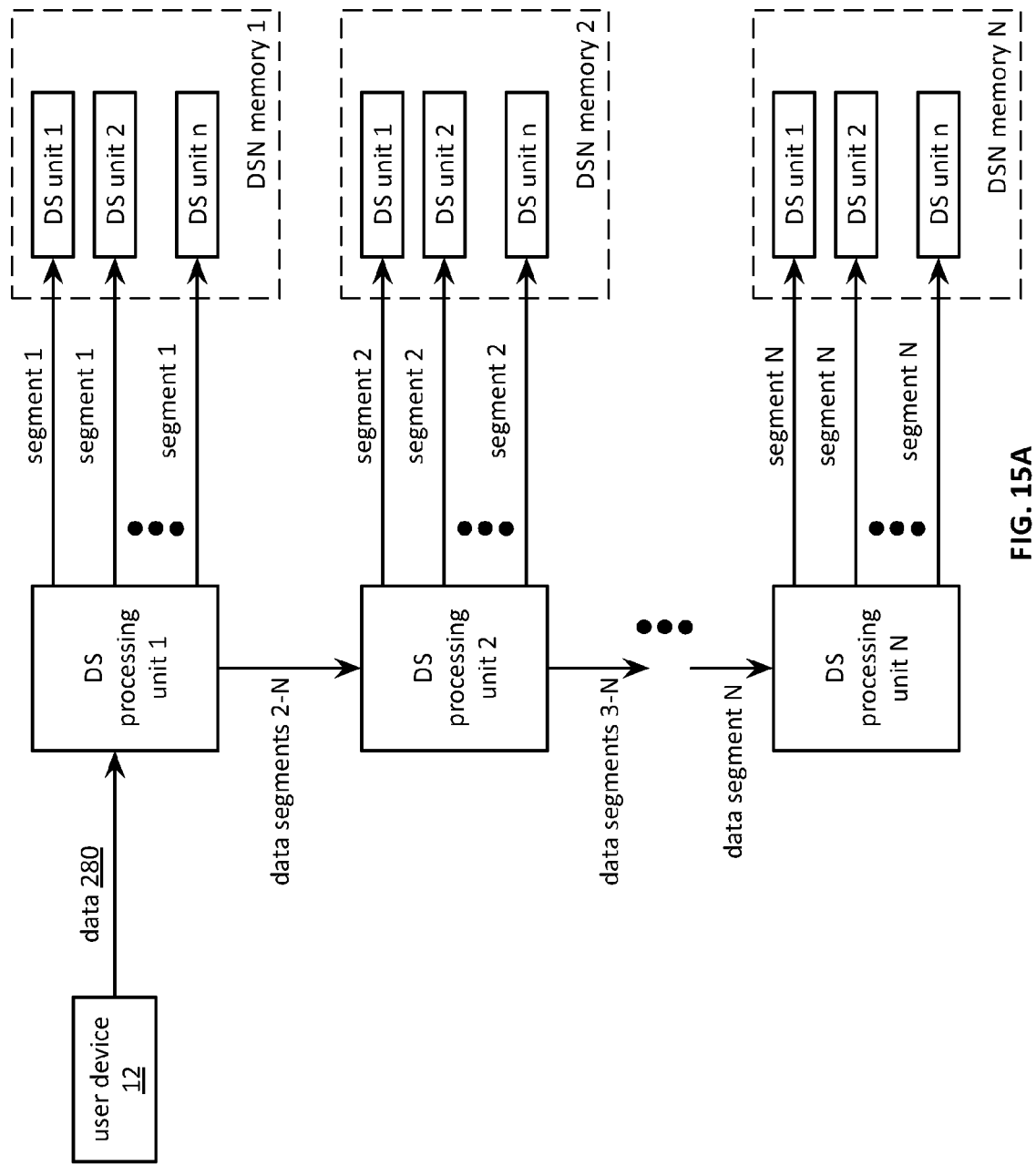
FIG. 15A is a schematic block diagram of another embodiment of a computing system in accordance with the invention.

FIG. 15A is a schematic block diagram of another embodiment of a computing system. The system includes a user device 12, a plurality of dispersed storage (DS) processing units 1-N, a plurality of dispersed storage network (DSN) memories 1-N that each includes a plurality of DS units 1-n. Alternatively, a plurality of DS processing modules and/or DS modules may be utilized to implement the plurality of DS processing units 1-N. Alternatively, the plurality of DSN memories 1-N may be implemented with one DSN memory. Each DSN memory of the plurality of DSN memories 1-N may include a different number of DS units when more than one DSN memory is utilized.

In an example of operation, the user device 12 sends data 280 to DS processing unit 1 for storage in the plurality of DSN memories. DS processing unit 1 receives the data 280 and partitions the data 280 into a first portion and a second portion in accordance with a segmentation approach. DS processing unit 1 manipulates the first portion (e.g. data segment 1) to create first manipulated data and sends the first manipulated data to DSN memory 1 for storage therein. Next, DS processing unit 1 sends the second portion to DS processing unit 2. DS processing unit 2 receives the second portion and partitions the second portion into a third portion and a fourth portion in accordance with the segmentation approach. Next, DS processing unit 2 manipulates the third portion (e.g. data segment 2) to create second manipulated data and sends the second manipulated data to DSN memory 2 for storage therein. Next, DS processing unit 2 sends the fourth portion to DS processing unit 3. DS processing units 3-(N−1) may operate in accordance with the method described for DS processing unit 2. In the example of operation continued, DS processing unit N receives data segment N from DS processing unit N−1. Next, DS processing unit N manipulates data segment N to create Nth manipulated data and sends the Nth manipulated data to DSN memory N for storage therein.

Each DS processing unit of the plurality of DS processing units manipulates a corresponding data segment to create corresponding manipulated data in accordance with a data manipulation approach. Next, the DS processing unit sends the manipulated data to one or more DS units of a corresponding DSN memory in accordance with the data manipulation approach. For example, DS processing unit 1 sends data segment 1 to each of the pillar width number of DS units (e.g., DS units 1-n) of DSN memory 1. The DS processing unit and/or a DS unit may update a directory and/or location table subsequent to storing the data in the plurality of DSN memories. The method of operation of each of the plurality of DS processing units when the data manipulation approach indicates to send a data segment to each of the pillar width number of DS units of the DSN memory is described in greater detail with reference to FIG. 15B. The method of operation of each of the DS units of the plurality of DS units when the data manipulation approach indicates to send the data segment to each of the pillar width number of DS units of the DSN memory is described in greater detail with reference to FIG. 15C.

In a data retrieval example of operation, each DS processing unit retrieves manipulated data from a corresponding DSN memory in accordance with the data manipulation approach, decodes the manipulated data to produce a corresponding data segment in accordance with the data manipulation approach, sends the data segment to at least one other DS processing unit in accordance with a data segmentation approach, and aggregates data segments to produce the data in accordance with the data segmentation approach.

Figure 15B:
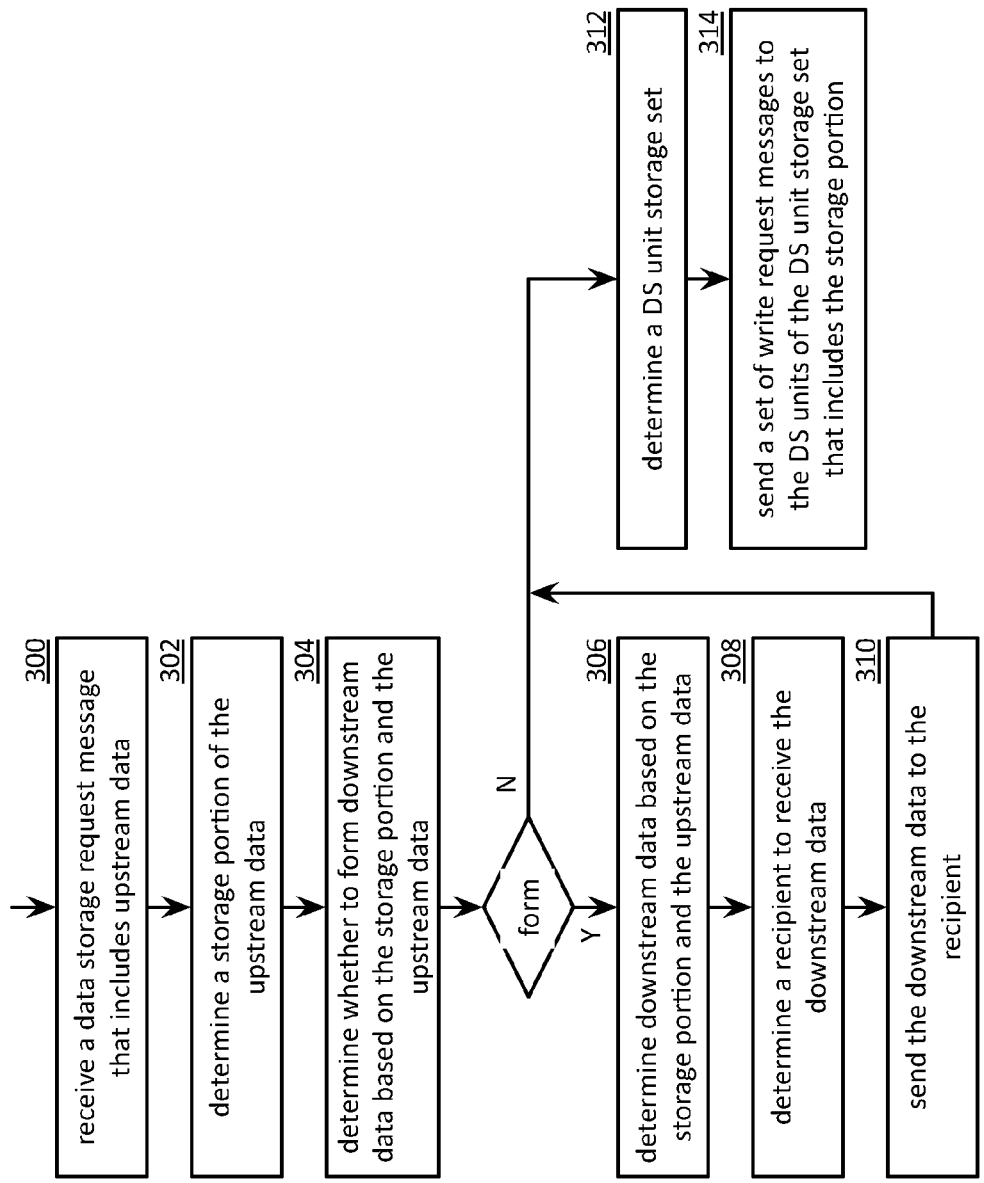
FIG. 15B is a flowchart illustrating another example of storing data in accordance with the invention.

FIG. 15B is a flowchart illustrating another example of storing data. A method begins with step 300 where a processing module (e.g., of a dispersed storage (DS) processing unit) receives (e.g., from a user device, from a DS processing unit, from a DS unit) a data storage request message that includes upstream data. The upstream data may include one or more of a data object, a data block, data, and one or more data segments of data. The data storage request message may include one or more of a data identifier (ID), the upstream data, a user device ID, a vault ID, a source name, a stored portion indicator, a data size indicator, a data type indicator, a priority indicator, a security indicator, and a performance indicator.

The method continues at step 302 where the processing module determines a storage portion of the upstream data. The determination may be based on one or more of a segmentation approach, a memory availability indicator, a memory availability threshold, the data size indicator, the stored portion indicator, a redundancy indicator, a predetermination, and a lookup. For example, the processing module determines the storage portion to be 1 megabyte (MB) when the memory availability indicator is greater than the memory availability threshold and the segmentation approach indicates to determine the storage portion to be 1 MB.

The method continues at step three for where the processing module determines whether to form downstream data based on the storage portion and the upstream data. The determination may be based on one or more of the data size indicator, a stored portion indicator, the storage portion. For example, the processing module determines not to form downstream data when a size of the storage portion is greater than or equal to a size of the upstream data. As another example, the processing module determines to form downstream data when the size of the storage portion is less than the size of the upstream data. The method branches to step 312 when the processing module determines not to form downstream data. The method continues to step 306 when the processing module determines to form downstream data.

The method continues at step 306 where the processing module determines downstream data based on the storage portion and the upstream data. The determination may be based on one or more of the storage portion, the upstream data, the stored portion indicator, and a redundancy indicator. For example, the processing module determines the downstream data to be the upstream data minus the storage portion when the redundancy indicator indicates no redundancy. As another example, the processing module determines the downstream data to be the upstream data minus the storage portion plus at least some of the storage portion. The method continues at step 308 where the processing module determines a recipient to receive the downstream data. The determination may be based on one or more of the segmentation approach, a list, a query, and the message. For example, processing module determines the recipient to be DS unit 3 when the processing modules associated with DS unit 2. The method continues at step 310 where the processing module sends the downstream data to the recipient.

The method continues at step 312 where the processing module determines a DS unit storage set, where the DS unit storage set includes a pillar width number (e.g., n) of DS units. The determination may be based on one or more of the data manipulation approach, a list, a query, a message, a DS unit capability indicator, a DS unit availability indicator, a network traffic indicator, a list, and a predetermination. For example, the processing module determines to utilize DS units that are capable of dispersed storage error encoding the data segment to produce at least one encoded data slice based on the DS unit capability indicator.

The method continues at step 314 where the processing module sends a pillar width number of write request messages to DS units of the DS unit storage set that includes the storage portion (e.g., a data segment corresponding to the processing module). For example, the processing module sends a data segment 1 to each DS unit of DS units 1-n. In addition, the processing module may update directory information and/or a data location table indicating storage locations associated with the data.

Figure 15C:
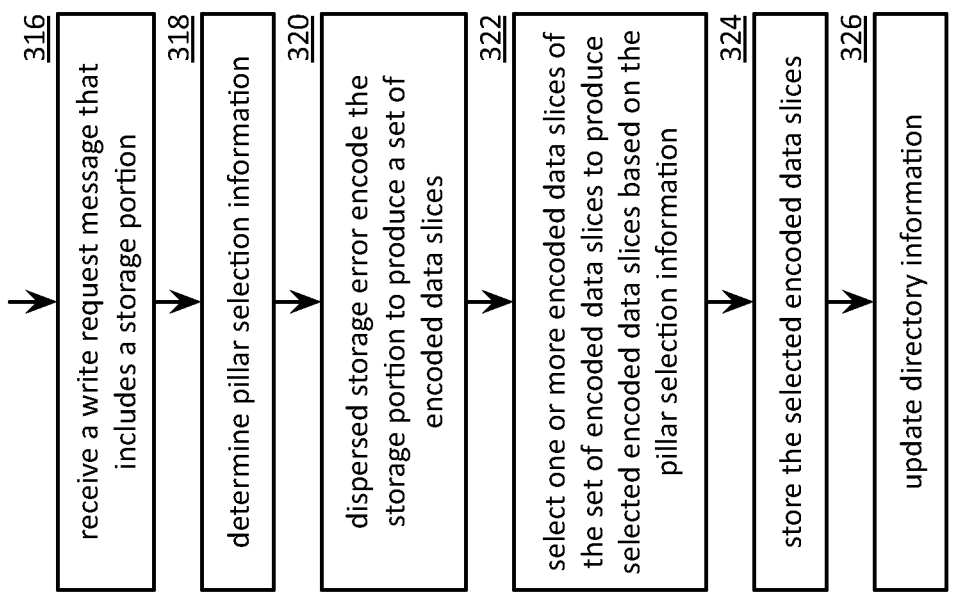
FIG. 15C is a flowchart illustrating another example of storing an encoded data slice in accordance with the invention.

FIG. 15C is a flowchart illustrating another example of storing an encoded data slice. The method begins step 316 where a processing module (e.g., a dispersed storage (DS) unit) receives a write request message that includes a storage portion (e.g., a data segment). The storage portion may include one or more of a data object, a data block, data, and one or more data segments of data. For example, the processing module receives the write request message that includes a data segment. The data storage request message may include one or more of a data identifier (ID), the storage portion, a user device ID, a vault ID, a DS processing unit ID, error coding dispersal storage function parameters, pillar selection information, a data manipulation approach, a source name, a stored portion indicator, a data size indicator, a data type indicator, a priority indicator, a security indicator, and a performance indicator.

The method continues at step 318 where the processing module determines pillar selection information. The pillar selection information may include pillar IDs of one or more pillars associated with the processing module such that the processing module stores or more slices encoded from the storage portion. The determination may be based on one or more of pillar selection information received in the write request message, a performance indicator, and available memory indicator, the storage portion, a predetermination, and a list. For example, the processing module determines the pillar selection information to include pillar 3 when the processing module is associated with DS unit 3 such that encoded at a slices of pillar 3 are typically stored in DS unit 3.

The method continues at step 320 where the processing module dispersed storage error encodes the storage portion to produce a set of encoded data slices in accordance with error coding dispersal storage function parameters. For example, the processing module multiplies an encoding matrix times the data portion to produce the set of encoded data slices. For instance, processing module utilizes an encoding matrix that includes a pillar width number of rows. As another instance, the processing module utilizes an encoding matrix that includes only one row corresponding to a slice number associated with the processing module in accordance with the pillar selection information. In an example of such an instance, the processing module utilizes an encoding matrix that includes row 3 when the processing module determines that the pillar selection information indicates a pillar 3 assignment (e.g., encoded data slice 3).

The method continues at step 322 where the processing module selects one or more encoded data slices of the set of encoded data slices to produce selected encoded data slices based on the pillar selection information. For example, the processing module selects encoded data slice 3 when the pillar selection information includes selecting pillar 3.

The method continues at step 324 where the processing module stores the selected encoded data slices. For example, the processing module stores the selected encoded data slices in a memory associated with the processing module (e.g., within a DS unit associated with the processing module). For instance, the processing module stores encoded data slice 3 in a local memory of DS unit 3. As another example, the processing module stores the selected encoded data slice in another DS unit by sending a write request message to the another DS unit that includes the selected encoded data slice. The method continues at step 326 where the processing module updates directory information and/or a location table.

Figure 16A:
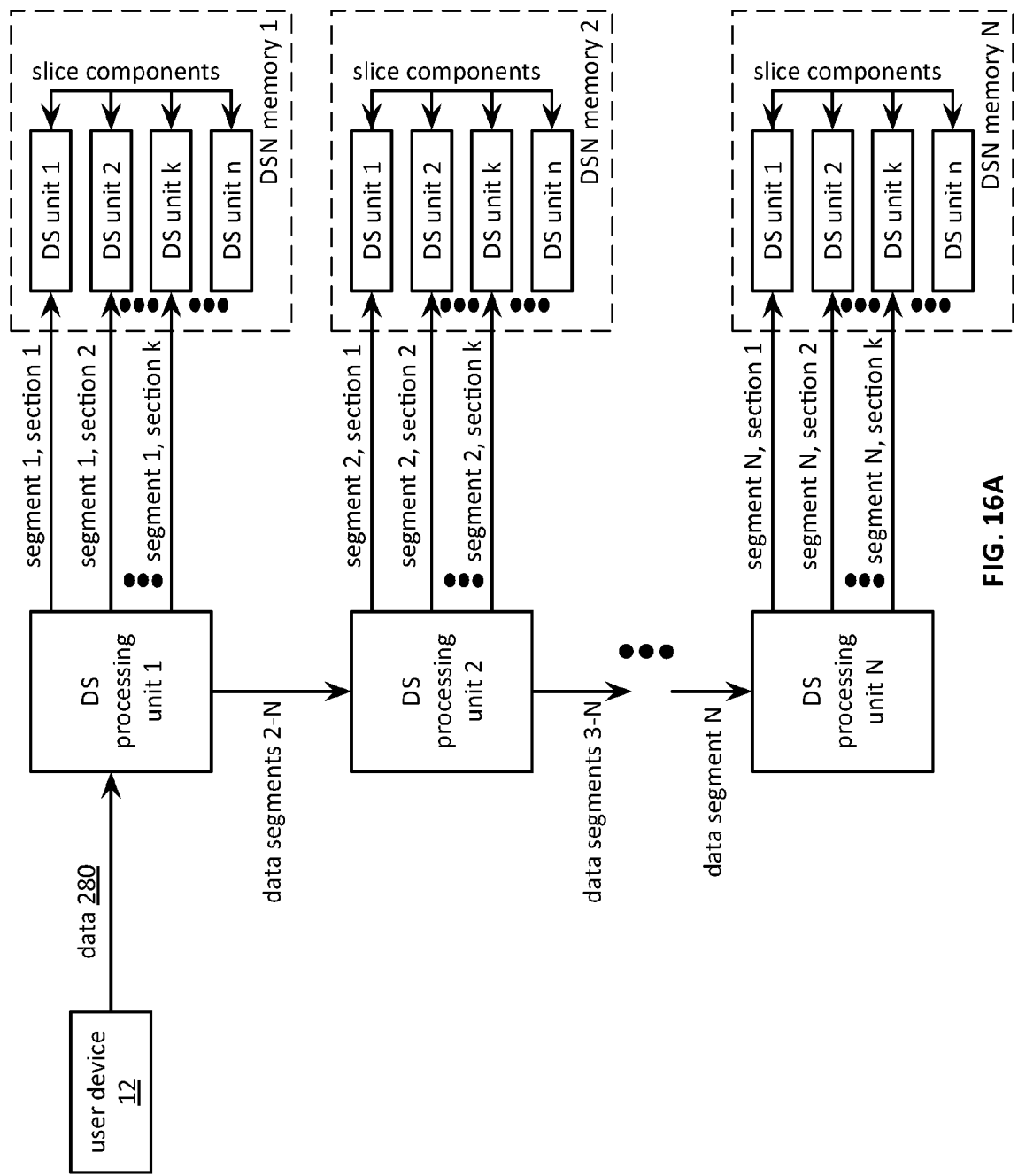
FIG. 16A is a schematic block diagram of another embodiment of a computing system in accordance with the invention.

FIG. 16A is a schematic block diagram of another embodiment of a computing system. The system includes a user device 12, a plurality of dispersed storage (DS) processing units 1-N, a plurality of dispersed storage network (DSN) memories 1-N that each include a plurality of DS units 1-n. Alternatively, a plurality of DS processing modules and/or DS modules may be utilized to implement the plurality of DS processing units 1-N. Alternatively, the plurality of DSN memories 1-N may be implemented with one DSN memory. Each DSN memory of the plurality of DSN memories 1-N may include a different number of DS units when more than one DSN memory is utilized.

In an example of operation, the user device 12 sends data 28 to DS processing unit 1 for storage in the plurality of DSN memories. DS processing unit 1 receives the data 280 and partitions the data 280 into a first portion and a second portion in accordance with a segmentation approach. Next, DS processing unit 1 manipulates the first portion (e.g. data segment 1) to create first manipulated data and sends the first manipulated data to DSN memory 1 for storage therein. Next, DS processing unit 1 sends the second portion to DS processing unit 2. DS processing unit 2 receives the second portion and partitions the second portion into a third portion and a fourth portion in accordance with the segmentation approach. Next, DS processing unit 2 manipulates the third portion (e.g. data segment 2) to create second manipulated data and sends the second manipulated data to DSN memory 2 for storage therein. Next, DS processing unit 2 sends the fourth portion to DS processing unit 3. DS processing units 3-(N-1) may operate in accordance with the method described for DS processing unit 2. In the example of operation continued, DS processing unit N receives data segment N from DS processing unit N-1. Next, DS processing unit N manipulates data segment N to create Nth manipulated data and sends the Nth manipulated data to DSN memory N for storage therein.

Each DS processing unit of the plurality of DS processing units manipulates a corresponding data segment to create corresponding manipulated data in accordance with a data manipulation approach. Next, the DS processing unit sends the manipulated data to one or more DS units of a corresponding DSN memory in accordance with the data manipulation approach. For example, DS processing unit 1 sends a decode threshold number of sections (e.g., sections 1-$k$) of data segment 1 to a corresponding decode threshold number of DS units (e.g., DS units 1-$k$) of DSN memory 1. The DS processing unit and/or a DS unit may update a directory and/or a storage location table subsequent to storing the data in the plurality of DSN memories. The method of operation of each of the plurality of DS processing units when the data manipulation approach indicates to send the decode threshold number of sections (e.g., sections 1-$k$) of data segment 1 to the corresponding decode threshold number of DS units of the DSN memory is described in greater detail with reference to FIG. 16B. A decode threshold number of DS units communicates slice components with each other DS unit of the plurality of DS units associated with a DSN memory to facilitate storing of a pillar width number of encoded data slices in DS units 1-$n$ of each DSN memory of the plurality of DSN memories. The method of operation of each of the DS units of the plurality of DS units when the data manipulation approach indicates to send the decode threshold number of sections (e.g., sections 1-$k$) of data segment 1 to the corresponding decode threshold number of DS units of the DSN memory is described in greater detail with reference to FIG. 16C-E.

In a data retrieval example of operation, each DS processing unit retrieves manipulated data from a corresponding DSN memory in accordance with the data manipulation approach, decodes the manipulated data to produce a corresponding data segment in accordance with the data manipulation approach, sends the data segment to at least one other DS processing unit in accordance with a data segmentation approach, and aggregates data segments to produce the data in accordance with the data segmentation approach.

Figure 16B:
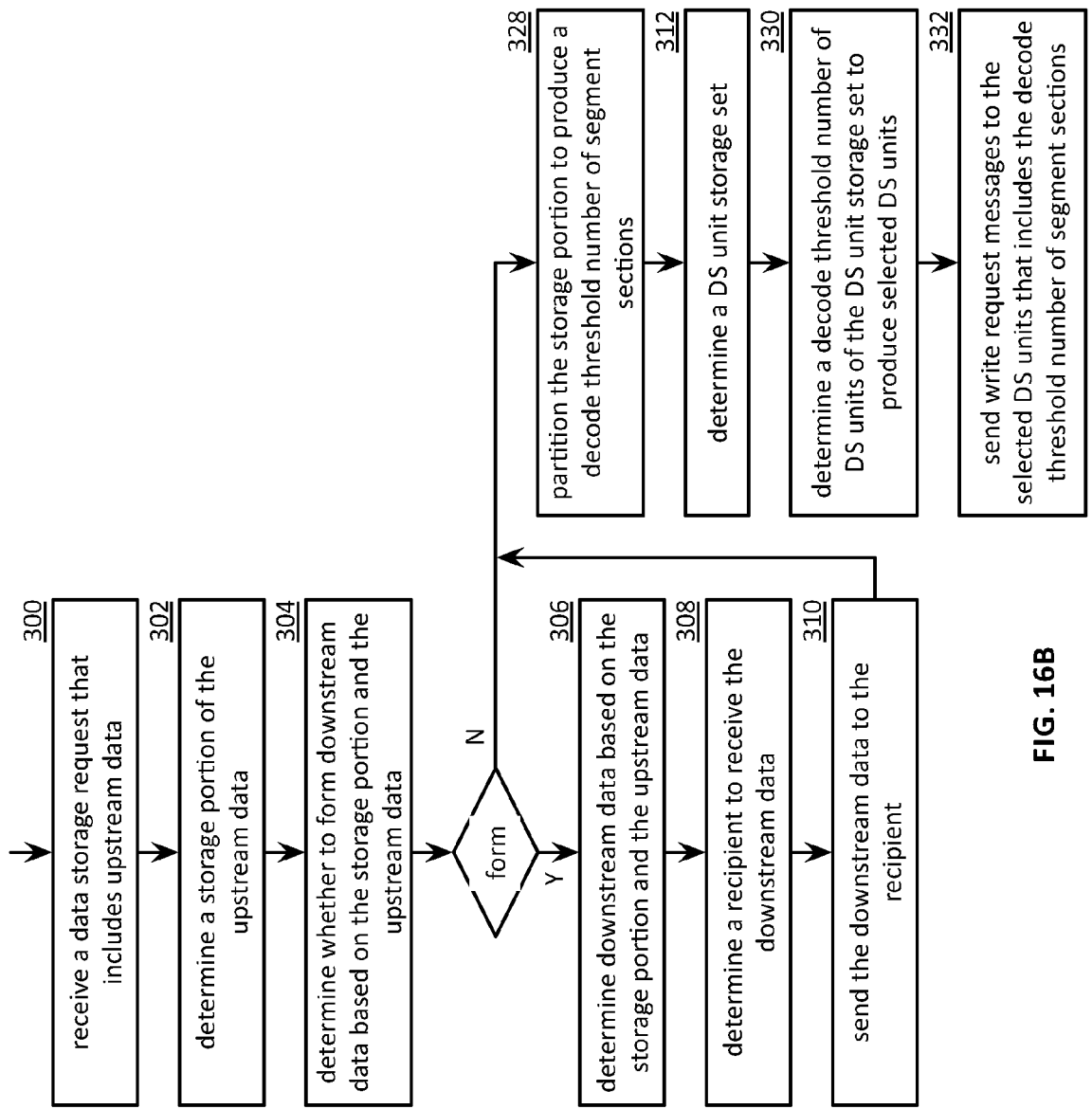
FIG. 16B is a flowchart illustrating another example of storing data in accordance with the invention.

FIG. 16B is a flowchart illustrating another example of storing data, which include similar steps to FIG. 15B. The method begins with steps 300-304 of FIG. 15 B where a processing module (e.g., of a dispersed storage (DS) processing unit) receives (e.g., from a user device, from a DS processing unit, from a DS unit) a data storage request message that includes upstream data, determines a storage portion (e.g., a data segment) of the upstream data, and determines whether to form downstream data based on the storage portion. The method branches to step 328 when the processing module determines to not form downstream data. The method continues to step 306 of FIG. 15B when the processing module determines to form downstream data. The method continues with steps 306-310 of FIG. 15B where the processing module determines downstream data based on the storage portion and the upstream data, determines a recipient to receive the downstream data, and sends the downstream data to the recipient when the processing module determines to form downstream data.

The method continues at step 328 where the processing module partitions the storage portion to produce a decode threshold number of segment sections in accordance with error coded dispersal storage function parameters and based on a data manipulation approach. For example, the processing module partitions the storage portion to produce the decode threshold number of segment sections wherein each of the segment sections is substantially the same size. For instance, the processing module partitions a 3 megabyte (MB) storage portion to produce three segment sections wherein each of the segment sections is 1 MB when the error coded dispersal storage function parameters indicate a decode threshold of 3 and the data manipulation approach includes guidance to create and store the decode number of segment sections. The method continues at step 312 of FIG. 15B where the processing module determines a DS unit storage set.

The method continues at step 330 where the processing module determines a decode threshold number of DS units of the DS unit storage set to produce selected DS units. The determination may be based on one or more of the data manipulation approach, a DS unit capability indicator, a DS unit availability indicator, a list, a message, and a query. The method continues at step 332 where the processing module sends write request messages to the selected DS units that includes the decode threshold number of segment sections. For example, the processing module sends a write request message to DS unit 1 that includes segment section 1. As another example, the processing module sends a write request message to DS unit 2 that includes segment section 2. In addition, the processing module may update directory information and/or a storage location table.

FIG. 16C is an algorithm illustrating an example of encoding data including a 5 by 3 generator matrix 334, a 3 by 1 data matrix 336, and a resulting 5 by 1 matrix 338 of encoded data slices 1-5. Such encoding may be utilized to dispersed storage error encode data (e.g., a segment section, a data segment) to produce a set of encoded data slices. The encoding of each slice of the set includes a plurality of intermediate steps. For example, the 5 by 3 generator matrix 334 is multiplied times the 3 by 1 data matrix 336 to produce the 5 by 1 matrix of encoded data slices 1-5. The example corresponds to error coded dispersal storage function parameters including a pillar width of 5 and a decode threshold of 3. Each slice may be calculated by adding three products of an entry of the generator matrix times an entry of the data matrix. For instance, slice 1 is encoded as ax+by+cz. Note that a system security improvement may be realized by subdividing the execution of the encoding of slices between a plurality of processing modules. For example, note that the encoding of a slice 1 may be accomplished by adding three slice components associated with slice 1 wherein three processing modules multiply a different column of the generator matrix times a different portion of the data. As such, a security improvement may be provided by utilizing a plurality of processing modules to generate slices wherein each processing module only utilizes one column of the generator matrix and one portion of the data.

FIG. 16D is a processing module task map illustrating an example of determining processing module assignments. For example, a processing module assignment to calculate a slice 1 is divided amongst three processing modules. For instance, a processing module 1 associated with a DS unit 1 encodes the "ax" product as a slice component, a processing module 2 associated with a DS unit 2 encodes the "by" product as another slice component, and a processing module 3 associated with a DS unit 3 encodes the "cz" product as another slice component. The processing module 1 may subsequently aggregate the three products (e.g., the three slice components) to produce slice 1. Processing modules 1-3 are also assigned to subsequently encode the "dx", "ey", "fz", "gx", "hy", "iz", "jx", "ky", "lz", "mx", "ny", and "oz" products wherein each processing module utilizes just one column of the generator matrix. A security improvement may be provided by limiting a particular processing module to one column of the encoding matrix.

FIG. 16E is a flowchart illustrating another example of storing an encoded data slice, which include similar steps to FIG. 15B. The method begins with step 340 where a processing module (e.g., of a dispersed storage (DS) unit associated with a decode threshold number of DS units) receives a write request message that includes a segment section. The write storage request message may include one or more of a data identifier (ID), the segment section, a user device ID, a vault ID, a DS processing unit ID, error coding dispersal storage function parameters, pillar selection information, a data manipulation approach, a source name, a stored portion indicator, a data size indicator, a data type indicator, a priority indicator, a security indicator, and a performance indicator.

The method continues at step 342 where the processing module partially dispersed storage error encodes the segment section to produce a set of slice components. For example, the processing module multiplies the segment section times a column of an encoding matrix to produce a pillar width number of slice components. As another instance, as illustrated in FIG. 16D, a processing module 1 associated with a DS unit 1 produces column 1 slice components of ax for slice 1, dx for slice 2, gx for slice 3, jx for slice 4, and mx for slice 5 when the pillar width is 5 and the decode threshold is 3. As yet another instance, a processing module 2 associated with a DS unit 2 produces column 2 slice components of by for slice 1, ey for slice 2, by for slice 3, ky for slice 4, and ny for slice 5 when the pillar width is 5 and the decode threshold is 3. As a still further instance, a processing module 3 associated with a DS unit 3 produces column 3 slice components of cz for slice 1, fz for slice 2, iz for slice 3, lz for slice 4, and oz for slice 5 when the pillar width is 5 and the decode threshold is 3.

The method continues at step 312 FIG. 15B where the processing module determines a DS unit storage set. The method continues at step 344 where the processing module sends a set of write request messages to each DS unit (e.g., a pillar width number of DS units) of the DS unit storage set that includes the slice components (e.g., a pillar width number of slice components). For example, the processing module 1 sends the set of write request message to DS units 2-5 associated with column 1 of an encoding matrix, wherein the write request message to DS unit 2 includes a slice component corresponding to slice 2, the write request message to DS unit 3 includes a slice component corresponding to slice 3, the write request message to DS unit 4 includes a slice component corresponding to slice 4, and the write request message to DS unit 5 includes a slice component corresponding to slice 5. As another example, the processing module 2 sends the set of write request message to DS units 1, 3-5 associated with column 2 of an encoding matrix, wherein the write request message to DS unit 1 includes a slice component corresponding to slice 1, the write request message to DS unit 3 includes a slice component corresponding to slice 3, the write request message to DS unit 4 includes a slice component corresponding to slice 4, and the write request message to DS unit 5 includes a slice component corresponding to slice 5. As yet another example, the processing module 3 sends the set of write request message to DS units 1-2, 4-5 associated with column 3 of an encoding matrix, wherein the write request message to DS unit 1 includes a slice component corresponding to slice 1, the write request message to DS unit 2 includes a slice component corresponding to slice 2, the write request message to DS unit 4 includes a slice component corresponding to slice 4, and the write request message to DS unit 5 includes a slice component corresponding to slice 5.

The method continues at step 346 where the processing module (e.g., associated with each of the DS units of the DS unit storage set) receives write request messages that includes a decode threshold number of slice components corresponding to a common slice. Each DS unit of the decode threshold number of DS units provide at least one of the decode threshold number of slice components to the same DS unit. For example, DS unit 1 receives write request messages from DS unit 2 and DS unit 3 and utilizes an additional slice component with reference to slice 1 created by DS unit 1. The method continues at step 348 where the processing module sums the slice components to produce an encoded data slice. The method continues at step 350 where the processing module stores encoded data slice. Next, the processing module updates directory information and/or a storage location table.

Figure 17A:
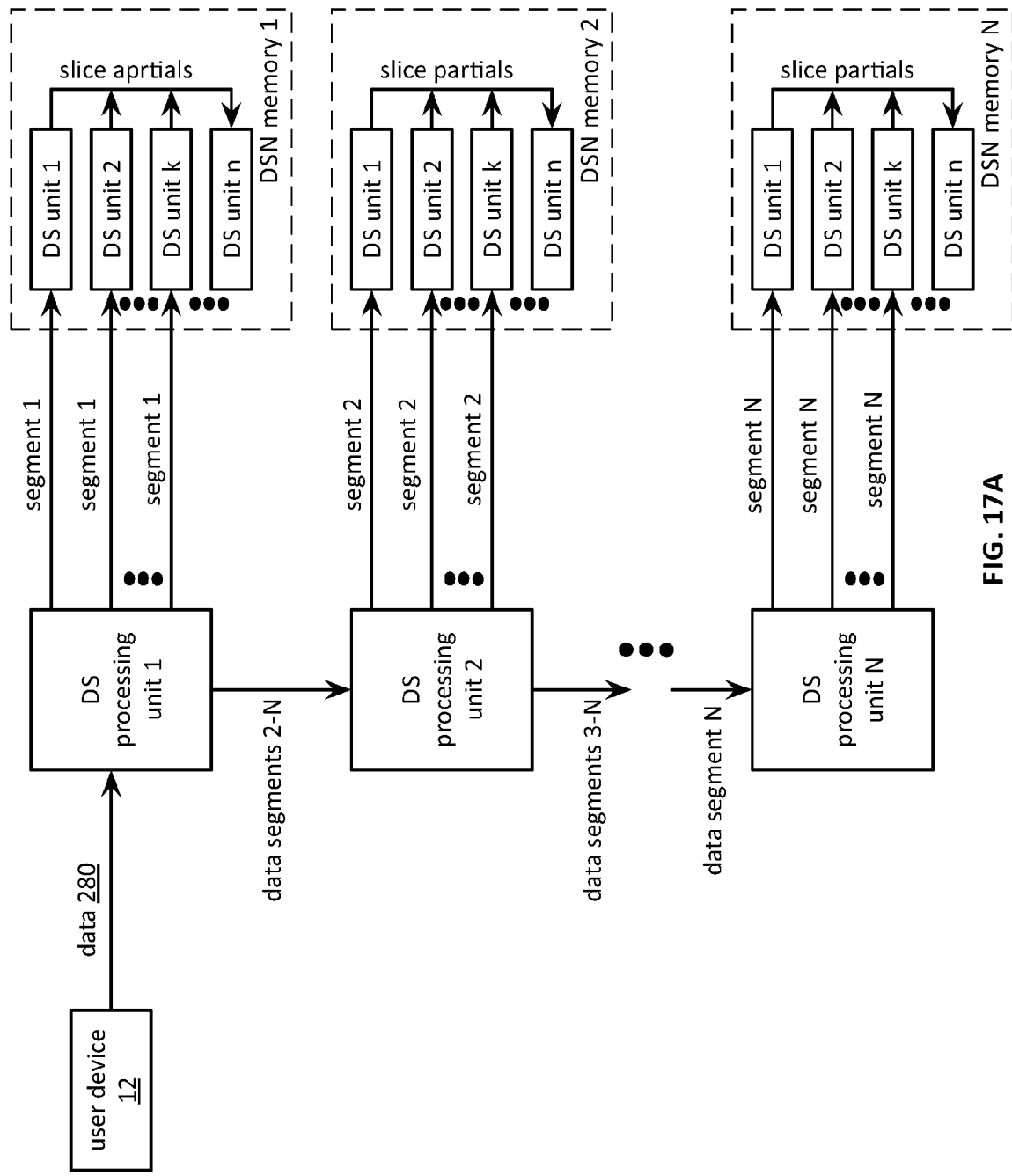
FIG. 17A is a schematic block diagram of another embodiment of a computing system in accordance with the invention.

FIG. 17A is a schematic block diagram of another embodiment of a computing system. The system includes a user device 12, a plurality of dispersed storage (DS) processing units 1-N, a plurality of dispersed storage network (DSN) memories 1-N that each include a plurality of DS units 1-n. Alternatively, a plurality of DS processing modules and/or DS modules may be utilized to implement the plurality of DS processing units 1-N. Alternatively, the plurality of DSN memories 1-N may be implemented with one DSN memory. Each DSN memory of the plurality of DSN memories 1-N may include a different number of DS units when more than one DSN memory is utilized.

In an example of operation, the user device 12 sends data 280 to DS processing unit 1 for storage in the plurality of DSN memories. DS processing unit 1 receives the data 280 and partitions the data 280 into a first portion and a second portion in accordance with a segmentation approach. Next, DS processing unit 1 manipulates the first portion (e.g. data segment 1) to create first manipulated data and sends the first manipulated data to DSN memory 1 for storage therein. Next, DS processing unit 1 sends the second portion to DS processing unit 2. DS processing unit 2 receives the second portion and partitions the second portion into a third portion and a fourth portion in accordance with the segmentation approach. Next, DS processing unit 2 manipulates the third portion (e.g. data segment 2) to create second manipulated data and sends the second manipulated data to DSN memory 2 for storage therein. Next, DS processing unit 2 sends the fourth portion to DS processing unit 3. DS processing units 3-(N−1) may operate in accordance with the method described for DS processing unit 2. In the example of operation continued, DS processing unit N receives data segment N from DS processing unit N−1. Next, DS processing unit N manipulates data segment N to create Nth manipulated data and sends the Nth manipulated data to DSN memory N for storage therein.

Each DS processing unit of the plurality of DS processing units manipulates a corresponding data segment to create corresponding manipulated data in accordance with a data manipulation approach. Next, the DS processing unit sends the manipulated data to one or more DS units of a corresponding DSN memory in accordance with the data manipulation approach. For example, DS processing unit 1 sends data segment 1 to a decode threshold number of DS units (e.g., DS units 1-k) of DSN memory 1. The DS processing unit and/or a DS unit may update a directory and/or a storage location table subsequent to storing the data in the plurality of DSN memories. The method of operation of each of the plurality of DS processing units when the data manipulation approach indicates to send the data segment to the decode threshold number of DS units of the DSN memory is described in greater detail with reference to FIG. 17B. Note that decode threshold number of DS units produce and send slice partials to other DS unit (e.g., not of the decode threshold number of DS units) of the plurality of DS units associated with a DSN memory to facilitate storing of a pillar width number of encoded data slices in DS units 1-n of each DSN memory of the plurality of DSN memories. The method of operation of each of the DS units of the plurality of DS units when the data manipulation approach indicates to send the data segment to the decode threshold number of DS units of the DSN memory is described in greater detail with reference to FIGS. 17C-F.

In a data retrieval example of operation, each DS processing unit retrieves manipulated data from a corresponding DSN memory in accordance with the data manipulation approach, decodes the manipulated data to produce a corresponding data segment in accordance with the data manipulation approach, sends the data segment to at least one other DS processing unit in accordance with a data segmentation approach, and aggregates data segments to produce the data in accordance with the data segmentation approach.

Figure 17B:
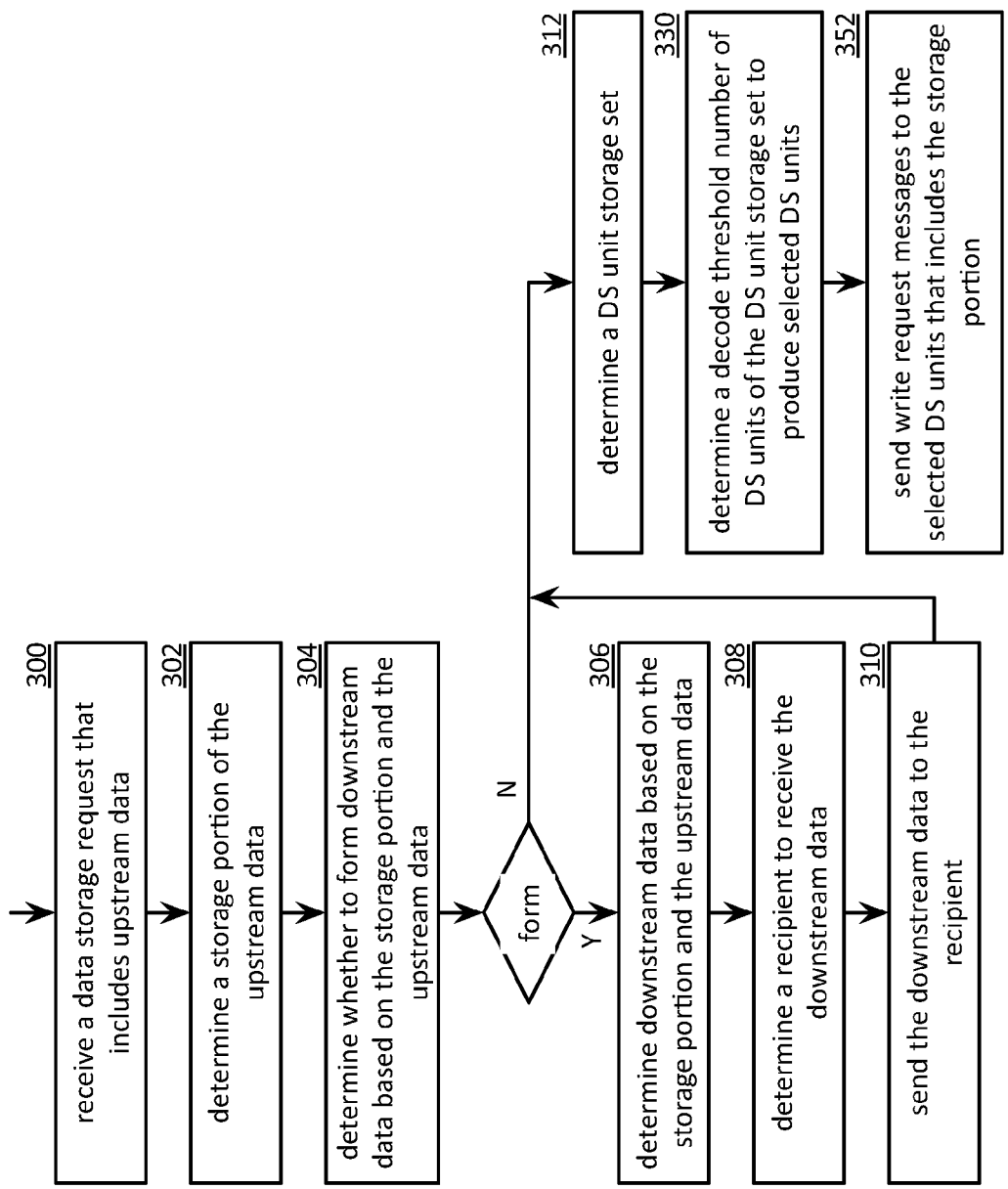
FIG. 17B is a flowchart illustrating another example of storing data in accordance with the invention.

FIG. 17B is a flowchart illustrating another example of storing data, which include similar steps to FIG. 15B. The method begins with steps 300-304 of FIG. 15B where a processing module (e.g., of a dispersed storage (DS) processing unit) receives (e.g., from a user device, from a DS processing unit, from a DS unit) a data storage request message that includes upstream data, determines a storage portion (e.g., a data segment) of the upstream data, and determines whether to form downstream data based on the storage portion. The method branches to step 312 of FIG. 15B when the processing module determines to not form downstream data. The method continues to step 306 of FIG. 15B when the processing module determines to form downstream data. The method continues with steps 306-310 of FIG. 15B where the processing module determines downstream data based on the storage portion and the upstream data, determines a recipient to receive the downstream data, and sends the downstream data to the recipient when the processing module determines to form downstream data.

The method continues with step 312 of FIG. 15B where the processing module determines a DS unit storage set. The method continues with step 330 of FIG. 16B where the processing module determines a decode threshold number of DS units of the DS unit storage set to produce selected DS units. The method continues at step 352 where the processing module sends write request messages to the selected DS units that includes the storage portion (e.g., a data segment corresponding to the processing module). For example, a processing module 1 of a dispersed storage processing unit 1 sends a write request message to DS units 1-3 that includes a data segment 1 as the storage portion when the decode threshold is 3. In addition, the processing module may update directory information and/or a storage location table.

FIG. 17C is an algorithm illustrating another example of encoding data including a 5 by 3 generator matrix 334, a 3 by 1 data matrix 336, and a resulting 5 by 1 matrix 338 of encoded data slices 1-5. Such encoding may be utilized to dispersed storage error encode data (e.g., a segment section, a data segment) to produce a set of encoded data slices. The encoding of each slice of the set includes a plurality of intermediate steps. For example, the 5 by 3 generator matrix 334 is multiplied times the 3 by 1 data matrix 336 to produce the 5 by 1 matrix of encoded data slices 1-5. The example corresponds to error coded dispersal storage function parameters including a pillar width of 5 and a decode threshold of 3. Each slice may be calculated by adding three products of an entry of the generator matrix times an entry of the data matrix. For instance, slice 1 is encoded as ax+by+cz. A system security improvement may be realized by subdividing the execution of the encoding of slices between a plurality of processing modules. For example, the encoding of a slice 1 requires multiplying row one of a generator matrix times the data. As such, a security improvement may be provided by utilizing a plurality of processing modules to generate slices wherein each processing module only utilizes one row of the generator matrix and the data.

FIG. 17D is a dispersed storage (DS) unit task map illustrating another example of determining DS unit assignments. For example, a processing module assignment to calculate a slice 1 is assigned to processing module 1. For instance, processing module 1 associated with a DS unit 1 encodes data by multiplying a first row of an encoding matrix times the data to produce an "ax" product, a "by" product, and a "cz" product. The processing module 1 may subsequently aggregate the three products (e.g., the three slice components) to produce slice 1. Processing module 2 associated with a DS unit 2 is assigned to create a slice 2, and a processing module 3 associated with a DS unit 3 is assigned to create a slice 3. Processing module 1 is assigned to create a slice partial 4_1 (e.g., to reproduce slice 4 utilizing information from slice 1), processing module 1 is assigned to create a slice partial 5_1 (e.g., to reproduce slice 5 utilizing information from slice 1), processing module 2 is assigned to create a slice partial 4_2 (e.g., to reproduce slice 4 utilizing information from slice 2), processing module 2 is assigned to create a slice partial 5_2 (e.g., to reproduce slice 5 utilizing information from slice 2), and processing module 3 is assigned to create a slice partial 4_3 (e.g., to reproduce slice 4 utilizing information from slice 3), processing module 3 is assigned to create a slice partial 5_3 (e.g., to reproduce slice 5 utilizing information from slice 3). In an example of operation, processing modules 1-3 send their two slice partials to processing modules 4-5 associated with DS units 4-5. Next, processing module 4 decodes three received slice partials to produce slice 4 and processing module 5 decodes three received slice partials to produce slice 5.

FIG. 17E is a flowchart illustrating another example of storing an encoded data slice, which include similar steps to FIG. 16E. The method begins with step 340 of FIG. 16E where a processing module (e.g., of a dispersed storage (DS) unit) receives a write request message that includes a segment. The method continues at step 354 where the processing module partially dispersed storage error encodes the segment to produce an encoded data slice. For example, the processing module multiplies a row of an encoding matrix times the segment to produce the encoded data slice. The method continues at step 356 where the processing module determines remaining DS units. The remaining DS units may be outside of a decode threshold number of DS units of a DS unit storage set. The determination may be based on one or more of a message, a query, and a predetermination. The method continues at step 358 where the processing module generates a slice partial for each of the remaining DS units. The method continues at step 360 where the processing module sends the slice partials to the remaining DS units.

FIG. 17F is a flowchart illustrating another example of storing an encoded data slice. The method begins with step 362 where a processing module receives a decode threshold number of slice partials (e.g., from a decode threshold number of dispersed storage (DS) units). The method continues at step 364 where the processing module decodes the decode threshold number of slice partials to produce an encoded data slice. For example, the processing module utilizes the logical XOR function to produce the encoded data slice=slice partial 1 XOR slice partial 2 XOR slice partial 3 etc. The method continues at step 366 where the processing module stores encoded data slice and updates directory information and/or a storage location table.

Figure 18B:
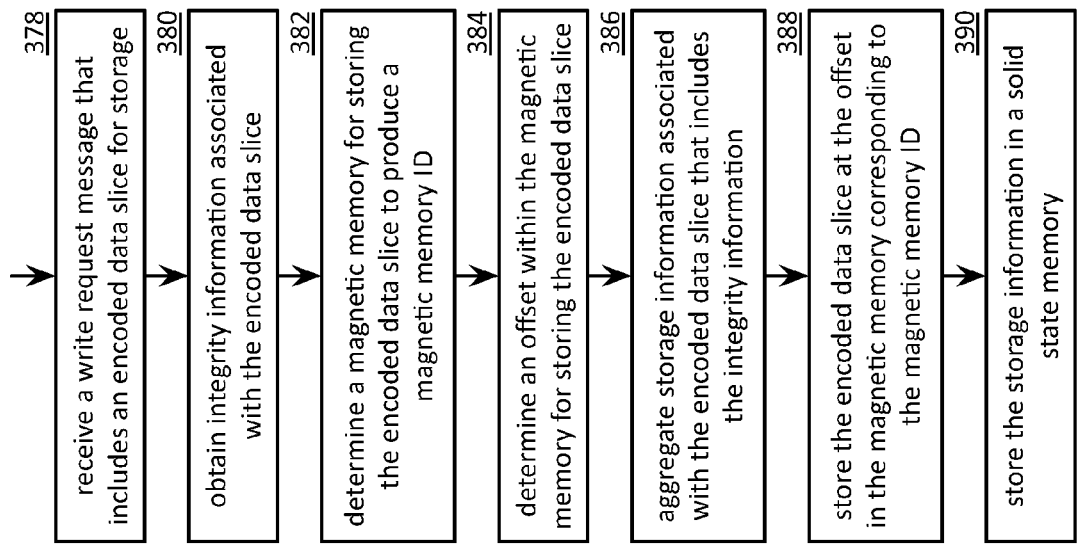
FIG. 18B is a flowchart illustrating another example of storing an encoded data slice in accordance with the invention.
Figure 18A:
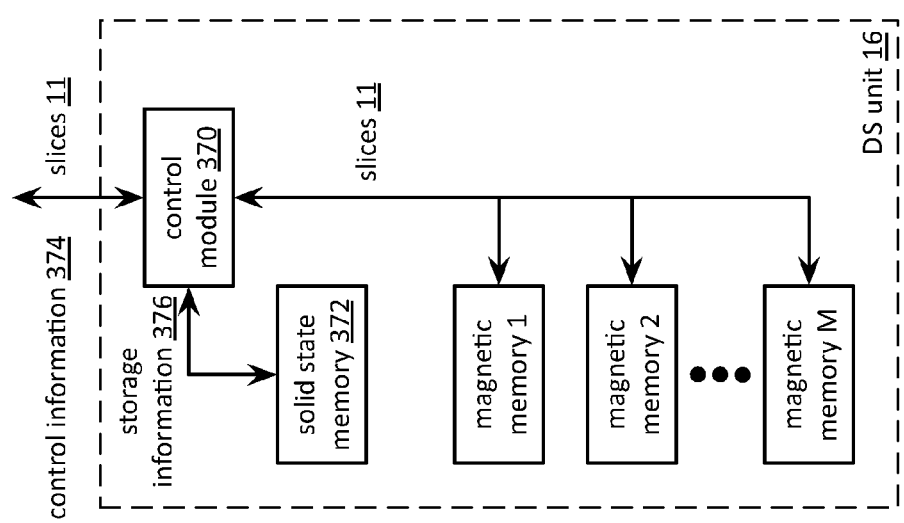
FIG. 18A is a schematic block diagram of an embodiment of a dispersed storage (DS) unit in accordance with the invention.

FIG. 18A is a schematic block diagram of an embodiment of a dispersed storage (DS) unit 16 that includes a control module 370, a solid state memory 372, and a plurality of magnetic memories 1-M. The control module 370 may be implemented utilizing a computing core 26. The solid-state memory may be implemented utilizing one or more memory devices utilizing one or more memory technologies including NAND Flash technology, static random access memory (RAM), dynamic random access memory (DRAM), or any other memory technology that provides low access latency with respect to magnetic memory technology. The plurality of magnetic memories 1-N may be implemented utilizing a hard disk drive magnetic media to provide high capacity memory for slice storage and retrieval at a lower cost than the solid-state memory. Alternatively, optically based storage may be utilized as the magnetic memories 1-M.

The control module 370 is operably coupled to the solid-state memory 372 to facilitate reading and writing of storage information 376. The storage information 376 may include one or more of a slice name, slice integrity information, a magnetic memory identifier (ID), an offset, an encoded data slice, and metadata. The control module 370 is operably coupled to the plurality of magnetic memories 1-M to facilitate reading and writing of encoded data slices.

In an example of operation, the control module 270 receives control information 374 that includes one or more of a request opcode, a slice name, integrity information, and an encoded data slice 11. The control module 370 obtains integrity information associated with the encoded data slice (e.g., calculating a cyclic redundancy check over the encoded data slice; receiving the integrity information as part of the control information 374). The control module 270 determines a magnetic memory ID associated with at least one of the magnetic memories of the plurality of the magnetic memories 1-M to store the encoded data slice. Next, the control module 370 stores the slice name, the integrity information and the magnetic memory ID as storage information 376 in the solid-state memory. The control module 370 stores the encoded data slice 11 in the magnetic memory corresponding to the magnetic memory ID.

As another example of operation, the control module 270 receives control information 374 indicating a read request from a requester that includes a slice name corresponding to an encoded data slice to be read. The control module 370 accesses the solid-state memory utilizing the slice name to retrieve integrity information associated with the encoded data slice and a magnetic memory ID associated with storage of the encoded data slice. The control module 370 retrieves the encoded data slice from the magnetic memory corresponding to the magnetic memory ID to produce a retrieved encoded data slice. The control module 370 generates integrity information of the retrieved encoded data slice (e.g., calculating a cyclic redundancy check over the retrieved encoded data slice). The control module 270 determines whether the generated integrity information compares favorably to the retrieved integrity information (e.g., favorable when substantially the same). The control module 370 sends the retrieved encoded data slice 11 to the requester as the encoded data slice 11 when the comparison is favorable. The method of operation is discussed in greater detail with reference to FIGS. 18B-19D.

FIG. 18B is a flowchart illustrating another example of storing an encoded data slice. The method begins with step 378 where a processing module (e.g., of a dispersed storage (DS) unit) receives a write request message that includes an encoded data slice for storage. The write request message may include one or more of the encoded data slice, a slice name, a source name, a user device identifier (ID), a data ID, a performance indicator, and slice integrity information. The method continues at step three where the processing module obtains integrity information associated with the encoded data slice. Such obtaining may include one or more of receiving the slice integrity information as the integrity information and calculating the integrity information (e.g., utilizing a hash in function to compute a hash over the encoded data slice).

The method continues at step 382 where the processing module determines a magnetic memory for storing the encoded data slice to produce a magnetic memory ID. The determination may be based on one or more of a magnetic memory available capacity indicator, a magnetic memory performance indicator, a slice size indicator, and the performance indicator. For example, the processing module determines to utilize magnetic memory 3 when a magnetic memory performance indicator associated with memory 3 compares favorably with the performance indicator. As another example, the processing module determines to utilize magnetic memory 5 when a magnetic memory available capacity indicator associated with memory 5 compares favorably to the slice size indicator.

The method continues at step 384 where the processing module determines an offset within the magnetic memory for storing the encoded data slice. The determination may be based on one or more of a magnetic memory available capacity indicator associated with the magnetic memory, a magnetic memory performance indicator associated with the magnetic memory, the slice size indicator, and a current offset associated with the magnetic memory. For example, the processing module determines to store the entire encoded data slice at an offset of 100 within magnetic memory 6 when the magnetic memory available capacity indicator associated with the magnetic memory 6 compares favorably to the slice size indicator. As another example, the processing module determines to store a first portion of the encoded data slice at an offset of 300 within magnetic memory 6 and a remaining portion of the encoded data slice at an offset of 4300 when the magnetic memory available capacity indicator associated with the magnetic memory 6 compares favorably to the slice size indicator for two data blocks at offsets 300 and 4300.

The method continues at step 36 where the processing module aggregates storage information associated with the encoded data slice that includes the integrity information. The method continues at step 388 where the processing module stores the encoded data slice at the offset in the magnetic memory corresponding to the magnetic memory ID. The method continues at step 390 where the processing module stores the storage information in a solid-state memory.

Figure 18C:
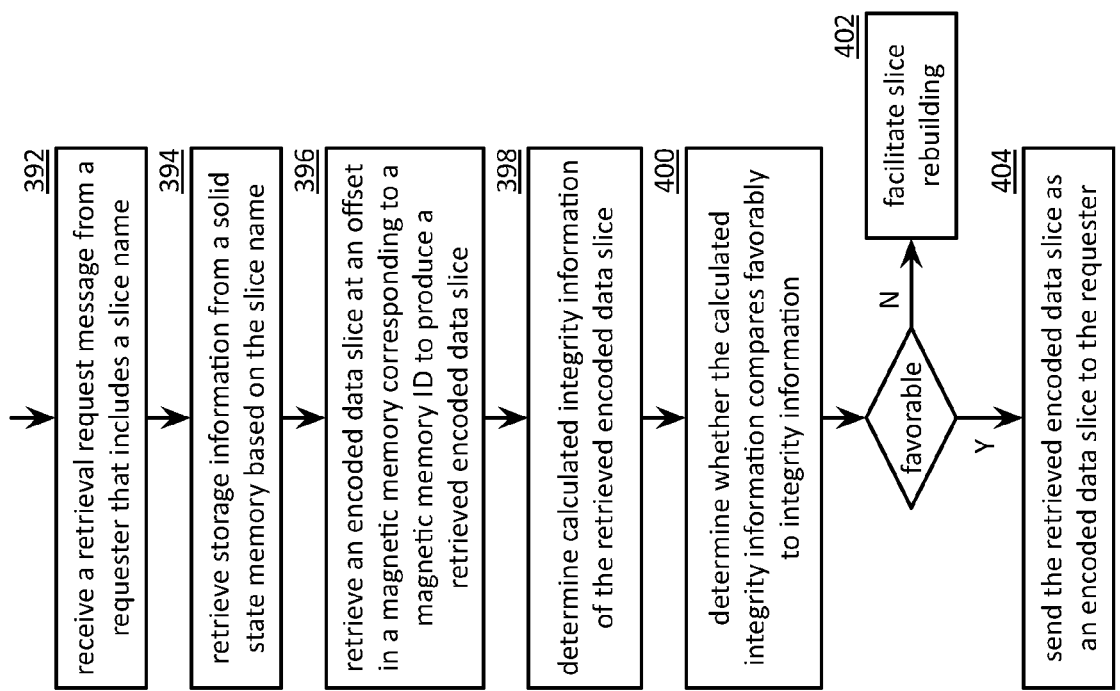
FIG. 18C is a flowchart illustrating an example of retrieving an encoded data slice in accordance with the invention.

FIG. 18C is a flowchart illustrating an example of retrieving an encoded data slice. The method begins with step 392 where a processing module (e.g., of a dispersed storage (DS) unit) receives a retrieval request message from a requester to retrieve an encoded data slice associated with a slice name of the request. The retrieval request message may include one or more of the slice name, a source name, a user device identifier (ID), a data ID, a performance indicator, and slice integrity information. The method continues at step 394 where the processing module retrieves storage information from a solid-state memory based on the slice name. For example, the processing module utilizes the slice name as an index into a table structure of storage information to retrieve the storage information.

The method continues at step 396 where the processing module extracts an offset and a magnetic memory ID from the storage information. Next, the processing module retrieves an encoded data slice at the offset in a magnetic memory corresponding to the magnetic memory ID to produce a retrieved encoded data slice. The method continues at step 398 where the processing module determines calculated integrity information corresponding to the retrieved encoded data slice. For example, the processing module calculates a hash over the retrieved encoded data slice to produce the calculated integrity information.

The method continues at step 400 where the processing module extracts integrity information from the storage information. Next, the processing module determines whether the calculated integrity information compares favorably to the integrity information. For example, the processing module determines that the calculated integrity information compares favorably to the integrity information when the calculated integrity information is substantially the same as the integrity information. The method branches to step 404 when the processing module determines that the calculated integrity information compares favorably to the integrity information. The method continues to step 402 when the processing module determines that the calculated integrity information compares unfavorably to the integrity information.

The method continues at step 402 where the processing module facilitates slice rebuilding when the calculated integrity information compares unfavorably to the integrity information. For example, the processing module sends a rebuilding message to a storage integrity processing unit that includes the slice name. As another example, the processing module sends (e.g., to the requester and/or to a dispersed storage managing unit) an error message that includes the slice name. The method continues at step 404 where the processing module sends the retrieved encoded data slice as the encoded data slice to the requester when the calculated integrity information compares favorably to the integrity information.

Figure 19A:
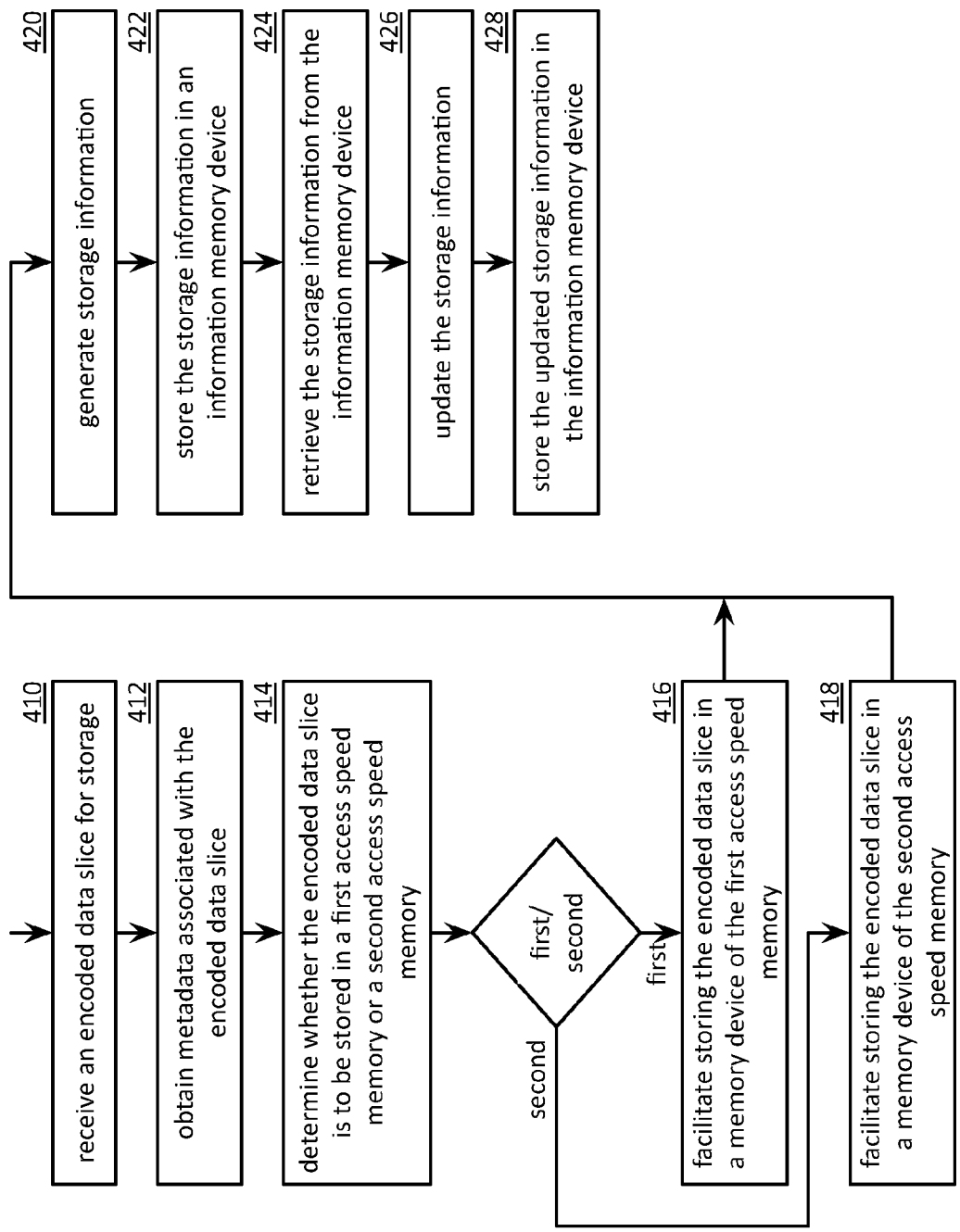
FIG. 19A is a flowchart illustrating another example of storing an encoded data slice in accordance with the invention.

FIG. 19A is a flowchart illustrating another example of storing an encoded data slice. The method begins with step 410 where a processing module (e.g., of a dispersed storage (DS) module, of a DS unit) receives (e.g., from a user device, from a DS processing module, from a DS processing unit, from a DS unit) an encoded data slice for storage. The method continues at step 412 where the processing module obtains metadata associated with the encoded data slice. The metadata includes one or more of a slice name, an encoded data slice size indicator, integrity information, a data type, an estimated access frequency, a priority requirement, a performance requirement, and a user identifier (ID). The obtaining includes at least one of receiving the metadata (e.g., with the encoded data slice), generating at least a portion of the metadata based on the encoded data slice, retrieving the metadata, outputting a query to request the metadata, and receiving a message that includes the metadata.

The method continues at step 414 where the processing module interprets the metadata to determine whether the encoded data slice is to be stored in a first access speed memory or a second access speed memory, wherein the first access speed memory has a higher data access rate than the second access speed memory. For example, the first access speed memory includes a plurality of solid-state memory devices and the second access speed memory includes one or more hard drive memory devices.

The interpreting the metadata includes at least one of interpreting the metadata to determine an estimated access frequency of the encoded data slice, wherein, when the estimated access frequency compares favorably to an access frequency threshold (e.g., favorable when the estimated access frequency is greater than the access frequency threshold), indicating that the encoded data slice is to be stored in the first access speed memory, interpreting the metadata to determine a data type of the encoded data slice, wherein, when the data type is a first data type, indicating that the encoded data slice is to be stored in the first access speed memory, interpreting the metadata to determine a user identifier of the encoded data slice, wherein, when the user identifier is a first user type, indicating that the encoded data slice is to be stored in the first access speed memory, interpreting the metadata to determine a priority requirement of the encoded data slice, wherein, when the priority requirement is a first priority type, indicating that the encoded data slice is to be stored in the first access speed memory, and interpreting the metadata to determine a performance requirement of the encoded data slice, wherein, when the performance requirement is a first performance type (e.g., above average performance), indicating that the encoded data slice is to be stored in the first access speed memory.

Alternatively, or in addition to, the processing module interprets the metadata to determine whether the encoded data slice is to be stored in the first access speed memory, the second access speed memory, or a third access speed memory, wherein the second access speed memory has a higher data access rate than the third access speed memory and stores the encoded data slice in a memory device of the third access speed memory when the encoded data slice is to be stored in the third access speed memory.

The method branches to step 418 when the processing module determines that the encoded data slice is to be stored in the second access speed memory. The method continues to step 416 when the processing module determines that the encoded data slice is to be stored in the first access speed memory. The method continues at step 416 where the processing module facilitates storing the encoded data slice in a memory device of the first access speed memory when the encoded data slice is to be stored in the first access speed memory. The facilitating includes at least one of storing the encoded data slice in the memory device of the first access speed memory, sending the encoded data slice to the memory device of the first access speed memory, and outputting the encoded data slice to intermediary processing module for storage in the memory device of the first access speed memory. Such facilitating may apply to one or more of storing, sending, receiving, transferring, and retrieving.

The method continues at step 418 where the processing module facilitates storing the encoded data slice in a memory device of the second access speed memory when the encoded data slice is to be stored in the second access speed memory. The method continues at step 420 where the processing module generates storage information to include one or more of a slice name associated with the encoded data slice, a memory device identifier (ID) of the memory device of the first or the second access speed memory, a memory device storage location associated with the storing of the encoded data slice (e.g., an offset), and at least some of the metadata. The method continues at step 422 where the processing module stores the storage information in an information memory device of the first access speed memory. For sample, the processing module stores the storage information in the memory device of the first access speed memory.

The method continues at step 424 where the processing module retrieves the storage information from the information memory device. The retrieving may include at least one of determining to retrieve the storage information (e.g., based on one or more of a timer expiration, access of the encoded data slice, a request), outputting a request for the storage information to the information memory device, and receiving the storage information from the information memory device. The method continues at step 426 where the processing module updates the storage information based on one or more of historical access information, a reprioritization message, and updated metadata to produce updated storage information. For example, the processing module updates the storage information to include historical access information that includes an actual data access frequency. As another example, the processing module updates to storage information to include an elevation of a priority level based on receiving the reprioritization message. The method continues at step 428 where the processing module stores the updated storage information in the information memory device. The updated storage information may be subsequently utilized to determine whether to transfer the encoded data slice between the memory device of the first access speed memory and the memory device of the second access speed memory. A method to determine whether to transfer the encoded data slice is discussed in greater detail with reference to FIG. 19B.

Figure 19B:
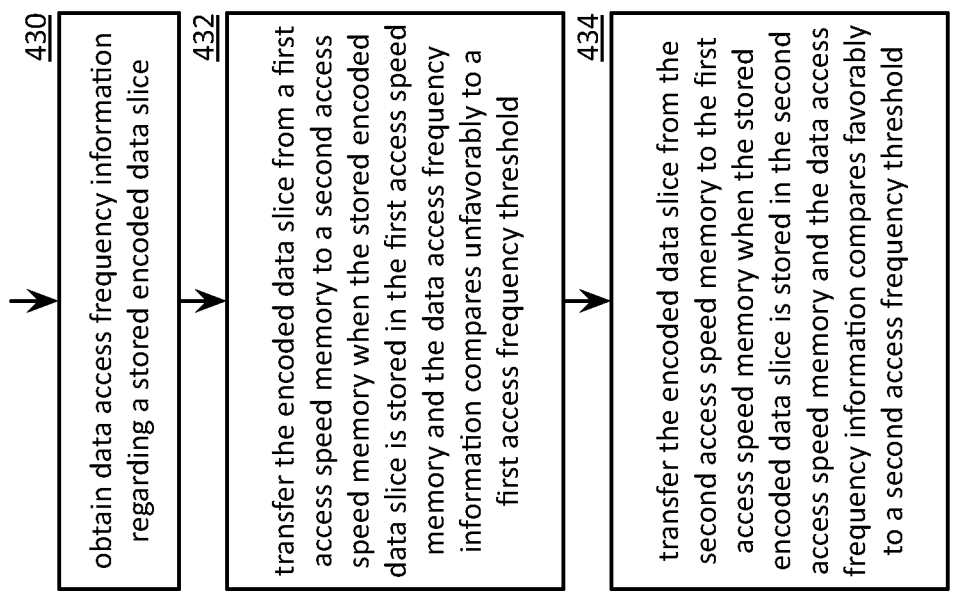
FIG. 19B is a flowchart illustrating an example of transferring an encoded data slice in accordance with the invention.

FIG. 19B is a flowchart illustrating an example of transferring an encoded data slice. The method begins with step 430 where a processing module (e.g., of a dispersed storage (DS) module, of a DS unit) obtains data access frequency information regarding a stored encoded data slice. The data access frequency information includes one or more of read requests regarding the stored encoded data slice within a given time period, write requests regarding the stored encoded data slice within a time frame, duration of storage of the stored encoded data slice, data size of the stored encoded data slice, and memory availability.

The method continues at step 432 where the processing module transfers the stored encoded data slice from a first access speed memory to a second access speed memory when the stored encoded data slice is stored in the first access speed memory and the data access frequency information compares unfavorably to a first access frequency threshold wherein the first access speed memory has a higher data access rate than the second access speed memory. The data access frequency information comparing unfavorably to the first access frequency threshold includes one or more of quantity of read requests regarding the stored encoded data slice within a given time period compares unfavorably to a read request threshold (e.g., unfavorable when read requests regarding the stored encoded data slice within the given time period is less than the first read request threshold of the first access frequency threshold), quantity of write requests regarding the stored encoded data slice within a time frame compares unfavorably to a read request threshold, duration of storage of the stored encoded data slice in the first access speed memory compares unfavorably to a storage duration threshold, and data size of the stored encoded data slice and memory availability of the first access speed memory compares unfavorably to a storage availability threshold.

The method continues at step 432 where the processing module transfers the stored encoded data slice from the second access speed memory to the first access speed memory when the stored encoded data slice is stored in the second access speed memory and the data access frequency information compares favorably to a second access frequency threshold. The data access frequency information comparing favorably to the second access frequency threshold includes one or more of quantity of read requests regarding the stored encoded data slice within a given time period compares favorably to a read request threshold (e.g., favorable when read requests regarding the stored encoded data slice within the given time period is greater than the read request threshold of the second access frequency threshold), and quantity of write requests regarding the stored encoded data slice within a time frame compares favorably to a read request threshold.

Figure 19C:
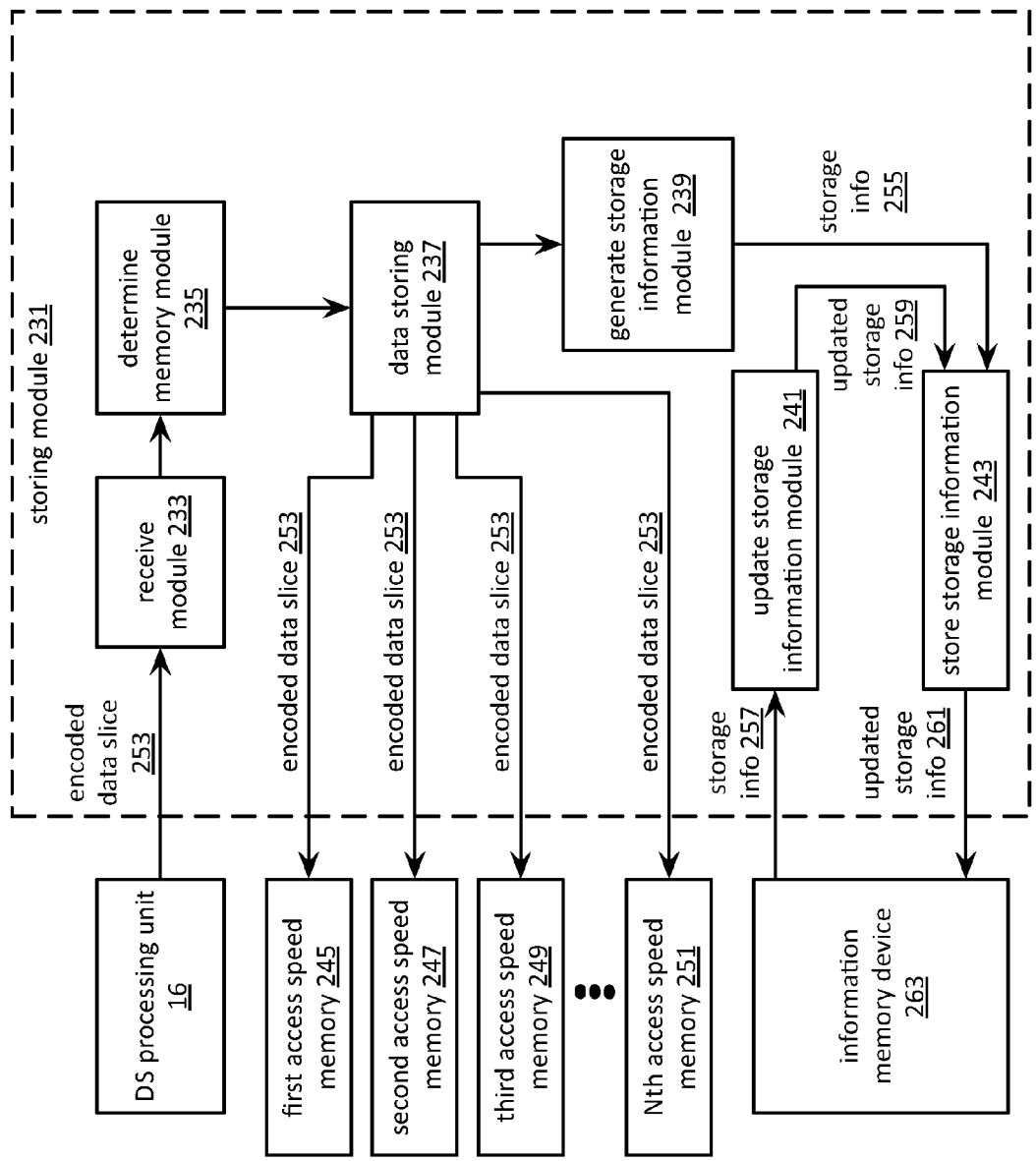
FIG. 19C is a block diagram of another storing module in accordance with the invention.

FIG. 19C is a block diagram of another storing module 231 that operates in accordance with the method described in FIG. 19A. The storing module 231 is a module that includes one or more sub-modules, which include a receive module 233, a determine memory module 235, a data storing module 237, a generate storage information module 239, an update storage information module 241, and a store storage information module 243.

The receive module 233 facilitates receiving (e.g., from a dispersed storage (DS) processing unit 16) an encoded data slice 253 for storage. The determine memory module 235 obtains metadata associated with the encoded data slice 253. The determine memory module 235 interprets the metadata to determine whether the encoded data slice 253 is to be stored in a first access speed memory 245 (e.g., the first access speed memory may include a plurality of solid-state memory devices) or a second access speed memory 247 (e.g., the second access speed memory includes one or more hard drive memory devices), wherein the first access speed memory has a higher data access rate than the second access speed memory. Alternatively, the determine memory module 235 module interprets the metadata to determine whether the encoded data slice is to be stored in the first access speed memory 245, the second access speed memory 247, a third access speed memory 249, or up through an Nth access speed memory 251, wherein the second access speed memory 247 has a higher data access rate than the third access speed memory 249.

The determine memory module 235 interprets the metadata by one or more of interpreting the metadata to determine an estimated access frequency of the encoded data slice 253, wherein, when the estimated access frequency compares favorably to an access frequency threshold, indicating that the encoded data slice is to be stored in the first access speed memory 245; interpreting the metadata to determine a data type of the encoded data slice 253, wherein, when the data type is a first data type, indicating that the encoded data slice is to be stored in the first access speed memory 245; interpreting the metadata to determine a user identifier of the encoded data slice, wherein, when the user identifier is a first user type, indicating that the encoded data slice 253 is to be stored in the first access speed memory 245; interpreting the metadata to determine a priority requirement of the encoded data slice, wherein, when the priority requirement is a first priority type, indicating that the encoded data slice 253 is to be stored in the first access speed memory 245; and interpreting the metadata to determine a performance requirement of the encoded data slice, wherein, when the performance requirement is a first performance type, indicating that the encoded data slice 253 is to be stored in the first access speed memory 245.

The data storing module 237 facilitates storing the encoded data slice 253 in a memory device of the first access speed memory 245 when the encoded data slice 253 is to be stored in the first access speed memory 245 and facilitates storing the encoded data slice in a memory device of the second access speed memory 247 when the encoded data slice 253 is to be stored in the second access speed memory 247. Alternatively, the data storing module 237 facilitates storing the encoded data slice 253 in a memory device of the third access speed memory 249 when the encoded data slice 253 is to be stored in the third access speed memory 249.

The generate storage information module 239 generates storage information 255 to include one or more of a slice name associated with the encoded data slice 253, a memory device identifier (ID) of the memory device of the first or the second access speed memory, a memory device storage location associated with the storing of the encoded data slice, and at least some of the metadata. The update storage information module 241 retrieves the storage information 257 (e.g. previously stored), from an information memory device 263 and updates the storage information 257 based on one or more of historical access information, a reprioritization message, and updated metadata to produce updated storage information 259. The information memory device 263 may be implemented as a separate memory device and/or as any one of the first access speed memory 245 through the Nth access speed memory 251. The store storage information module 243 facilitates storing the storage information to 255 in the information memory device 263. For example, the store storage information module 243 stores for storage information 255 in the first access speed memory 245 when the first access speed memory 245 serves as the information memory device 263. Alternatively, the store storage information module 243 stores the updated storage information 259 in the information memory device 263 as updated storage information 261.

Figure 19D:
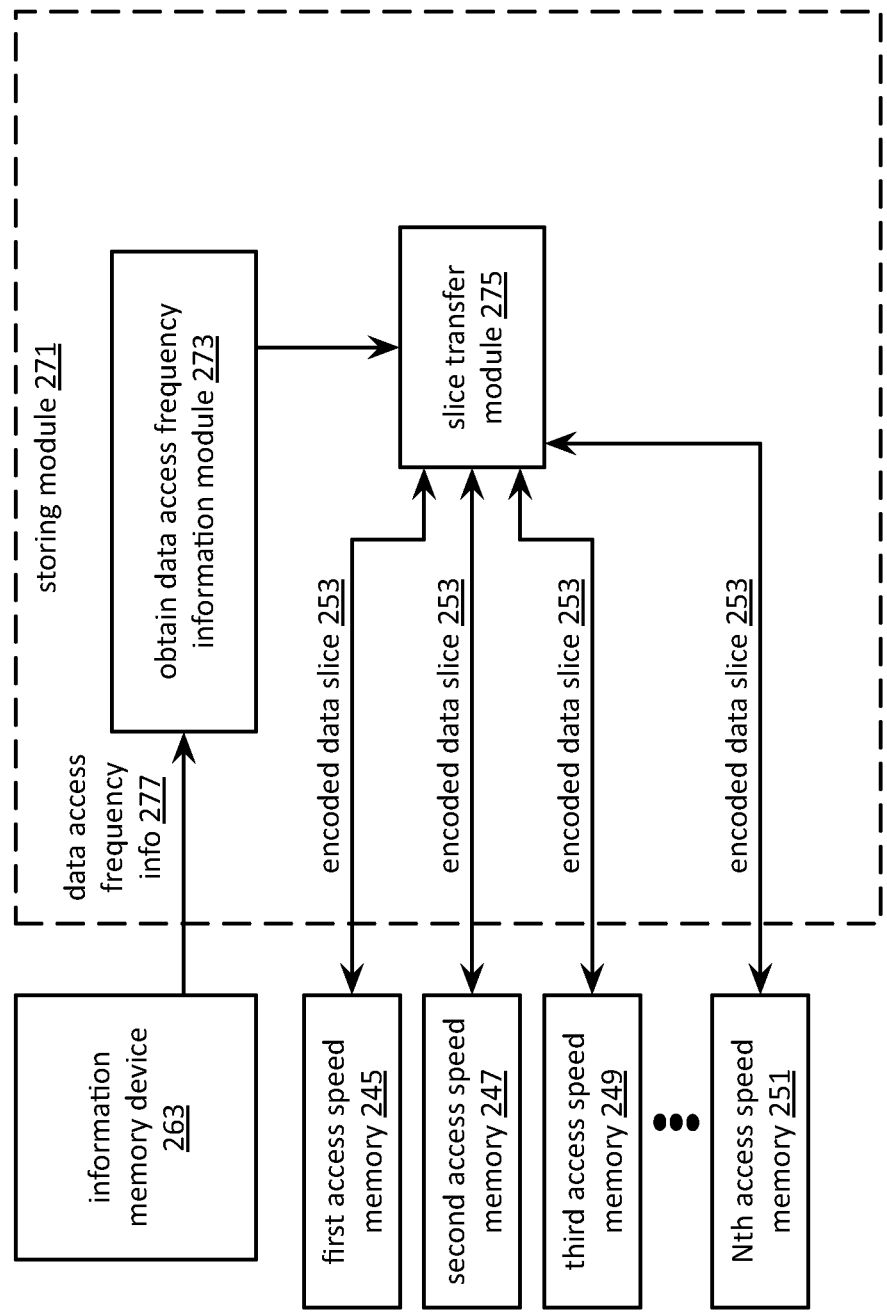
FIG. 19D is a block diagram of another storing module in accordance with the invention.

FIG. 19D is a block diagram of another storing module 271 that operates in accordance with the method described in FIG. 19B. The storing module 271 is a module that includes one or more sub-modules, which include an obtain data access frequency information module 273 and a slice transfer module 275.

The obtain data access frequency information module 273 contains data access frequency information regarding a stored encoded data slice 253. The data access frequency information includes one or more of read requests regarding the stored encoded data slice within a given time period, write requests regarding the stored encoded data slice within a time frame, duration of storage of the stored encoded data slice, data size of the stored encoded data slice, and memory availability.

The slice transfer module 275 facilitates transferring the stored encoded data slice 253 from a memory of a first access speed memory to 245, a second access speed memory 247, a third access speed memory 249, through an Nth access speed memory 251 to a different memory of the memories 245-251. For example, the slice transfer module 275 facilitates transferring of the encoded data slice 253 from the first access speed memory 245 to the second access speed memory 247 when the stored encoded data slice 253 is stored in the first access speed memory 245 and the data access frequency information 277 compares unfavorably to a first access frequency threshold, wherein the first access speed memory 245 has a higher data access rate than the second access speed memory 247. As another example, the slice transfer module 275 facilitates transferring of the encoded data slice 253 the stored encoded data slice 253 from the second access speed memory 247 to the first access speed memory to 45 when the stored encoded data slice 253 is stored in the second access speed memory 247 and the data access frequency information 277 compares favorably to a second access frequency threshold.

The data access frequency information 277 comparing unfavorably to the first access frequency threshold includes one or more of quantity of read requests regarding the stored encoded data slice 253 within a given time period compares unfavorably to a read request threshold, quantity of write requests regarding the stored encoded data slice 253 within a time frame compares unfavorably to a read request threshold, duration of storage of the stored encoded data slice 253 in the first access speed memory 245 compares unfavorably to a storage duration threshold, and data size of the stored encoded data slice 253 and memory availability of the first access speed memory 245 compares unfavorably to a storage availability threshold. The data access frequency information 277 comparing favorably to the second access frequency threshold includes one or more of quantity of read requests regarding the stored encoded data slice within a given time period compares favorably to a read request threshold and quantity of write requests regarding the stored encoded data slice within a time frame compares favorably to a read request threshold.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a storage unit of a dispersed storage network, the method comprises:
  receiving an encoded data slice for storage;
  determining whether to store the encoded data slice in a first access speed memory or a second access speed memory, wherein the first access speed memory has a higher data access rate than the second access speed memory, by:
    determining an access frequency indicator based on access requests of other encoded data slices of a plurality of first encoded data slices stored by the storage unit for which access requests for the other encoded data slices were included in a decode threshold number of access request, wherein a plurality of data objects are dispersed storage error encoded into pluralities of sets of encoded data slices, wherein, for each set of encoded data slice of the pluralities of sets of encoded data slices, the decode threshold number of encoded data slices is needed to recover a corresponding data segment of one of the plurality of data objects, and wherein the plurality of first encoded data slices includes a first encoded data slice from each of at least some of the sets of encoded data slices of the pluralities of sets of encoded data slices;
when the access frequency indicator is less than or equal to an access frequency threshold, storing the encoded data slice in the second access speed memory; and
when the access frequency indicator is greater than the access frequency threshold, storing the encoded data slice in the first access speed memory.

2. The method of claim 1, wherein determining the access frequency indicator further comprises at least one of:
determining a data type of the encoded data slice, wherein, when the data type is a first data type, increasing the access frequency indicator such that the encoded data slice is to be stored in the first access speed memory;
determining a user identifier of the encoded data slice, wherein, when the user identifier is a first user type, increasing the access frequency indicator such that the encoded data slice is to be stored in the first access speed memory;
determining a priority requirement of the encoded data slice, wherein, when the priority requirement is a first priority type, increasing the access frequency indicator such that the encoded data slice is to be stored in the first access speed memory; and
determining a performance requirement of the encoded data slice, wherein, when the performance requirement is a first performance type, increasing the access frequency indicator such that the encoded data slice is to be stored in the first access speed memory.

3. The method of claim 1 further comprises:
the first access speed memory includes a plurality of solid-state memory devices; and
the second access speed memory includes one or more hard drive memory devices.

4. The method of claim 1 further comprises:
generating storage information to include one or more of:
a slice name associated with the encoded data slice;
a memory device identifier (ID) of a memory device of the first or the second access speed memory;
a memory device storage location associated with the storing of the encoded data slice; and
at least some metadata; and
storing the storage information in an information memory device of the first access speed memory.

5. The method of claim 1 further comprises:
determining that the access frequency indicator is less than or equal to the access frequency threshold when the other encoded data slices were included in the decode threshold number of access requests less than or equal to a value representing the access frequency threshold.

6. The method of claim 1 further comprises:
when the access frequency indicator is less than or equal to a second access frequency threshold, storing the encoded data slice in a third access speed memory, wherein the second access frequency threshold is less than the access frequency threshold, and the second access speed memory has a higher data access rate than the third access speed memory.

7. A computing device comprises:
a first module that, when operable in the computing device, causes the computing device to:
determine whether to store the encoded data slice in a first access speed memory of a second access speed memory, wherein the first access speed memory has a higher data access rate than the second access speed memory, by:
determining an access frequency indicator based on access requests of other encoded data slices of a plurality of first encoded data slices stored by a storage unit for which access requests for the other encoded data slices were included in a decode threshold number of access requests, wherein a plurality of data objects are dispersed storage error encoded into pluralities of sets of encoded data slices, wherein for each set of encoded data slices of the pluralities of sets of encoded data slices, the decode threshold number of encoded data slices is needed to recover a corresponding data segment of one of the plurality of data objects, and wherein the plurality of first encoded data slices includes a first encoded data slice from each of at least some of the sets of encoded data slices of the pluralities of sets of encoded data slices;
when the access frequency indicator is less than or equal to an access frequency threshold, storing the encoded data slice in the second access speed memory; and
when the access frequency indicator is greater than the access frequency threshold, storing the encoded data slice in the first access speed memory.

8. The computing device of claim 7, wherein the second module further causes the computing device to determine the access frequency indicator by one or more of:
determining a data type of the encoded data slice, wherein, when the data type is a first data type, increasing the access frequency indicator such that the encoded data slice is to be stored in the first access speed memory;
determining a user identifier of the encoded data slice, wherein, when the user identifier is a first user type, increasing the access frequency indicator such that the encoded data slice is to be stored in the first access speed memory;
determining a priority requirement of the encoded data slice, wherein, when the priority requirement is a first priority type, increasing the access frequency indicator such that the encoded data slice is to be stored in the first access speed memory; and
determining a performance requirement of the encoded data slice, wherein, when the performance requirement is a first performance type, increasing the access frequency indicator such that the encoded data slice is to be stored in the first access speed memory.

9. The computing device of claim 7 further comprises:
the first access speed memory includes a plurality of solid-state memory devices; and
the second access speed memory includes one or more hard drive memory devices.

10. The computing device of claim 7 further comprises:
a fourth module that, when operable in the computing device, causes the computing device to generate storage information to include one or more of:
a slice name associated with the encoded data slice;
a memory device identifier (ID) of a memory device of the first or the second access speed memory;
a memory device storage location associated with the storing of the encoded data slice; and
at least some metadata; and
a fifth module that, when operable in the computing device, causes the computing device to facilitate storing the storage information in an information memory device of the first access speed memory.

11. The computing device of claim 7, wherein the second module further includes operational instructions that, when executed by the computing device, causes the computing device to:
  determine that the access frequency indicator is less than or equal to the access frequency threshold when the other encoded data slices were included in the decode threshold number of access requests less than or equal to a value representing the access frequency threshold.

12. The computing device of claim 7, wherein the second module further includes operational instructions that, when executed by the computing device, causes the computing device to:
  when the access frequency indicator is less than or equal to a second access frequency threshold, storing the encoded data slice in a third access speed memory, wherein the second access frequency threshold is less than the access frequency threshold and the second access speed memory has a higher data access rate than the third access speed memory.

* * * * *